US009647731B2

(12) United States Patent
Ardalan

(10) Patent No.: US 9,647,731 B2
(45) Date of Patent: May 9, 2017

(54) RECONFIGURABLE NETWORK ON A CHIP (NOC) RADIO THROUGH REDUCED INSTRUCTION SET COMPUTER (RISC) AGENTS BY OVERWRITING PROGRAM STORE FOR DIFFERENT PHASES OF DEMODULATION

(71) Applicant: MICROELECTRONICS RESEARCH DEVELOPMENT CORP., Colorado Springs, CO (US)

(72) Inventor: Sasan Ardalan, Albuquerque, NM (US)

(73) Assignee: Microelectronics Research & Development Corp., Colorado Springs, CO (US)

(*) Notice: Subject to any disclaimer, the term of this patent is extended or adjusted under 35 U.S.C. 154(b) by 132 days.

(21) Appl. No.: 13/657,858

(22) Filed: Oct. 22, 2012

(65) Prior Publication Data

US 2016/0373158 A1     Dec. 22, 2016

Related U.S. Application Data

(60) Provisional application No. 61/549,543, filed on Oct. 20, 2011.

(51) Int. Cl.
| | |
|---|---|
| H04B 7/04 | (2006.01) |
| H04B 7/08 | (2006.01) |
| H04B 7/0413 | (2017.01) |

(52) U.S. Cl.
CPC .......... H04B 7/0413 (2013.01); H04B 7/043 (2013.01); H04B 7/08 (2013.01)

(58) Field of Classification Search
CPC .......... H04B 7/02; H04B 7/04; H04B 7/0413; H04B 7/043; H04B 7/0456; H04B 7/0408; H04B 7/0452; H04B 7/08; H04B 7/084; H04B 7/0842; H04B 7/0845; H04L 1/02; H04L 1/0625; H04L 1/0631; H04L 5/24; H04L 25/03891; H04L 25/03898; H04L 27/2601; H04L 27/2628; H04L 27/265; H04L 27/2666; H04J 11/00
USPC ....... 375/259, 260, 262, 265, 267, 299, 340, 375/341, 347; 370/208, 210
See application file for complete search history.

(56) References Cited

U.S. PATENT DOCUMENTS

| | | | |
|---|---|---|---|
| 8,223,872 B1* | 7/2012 | Zhang .................. | H04B 7/0417 375/267 |
| 8,442,141 B1* | 5/2013 | Zhang .................. | H04B 7/0417 370/334 |
| 2006/0105767 A1* | 5/2006 | Kim ..................... | H04B 7/0626 455/434 |

(Continued)

*Primary Examiner* — Young T Tse
(74) *Attorney, Agent, or Firm* — Juneau & Mitchell; Todd L. Juneau

(57) ABSTRACT

The invention relates to devices and methods which implement a reconfigurable network-on-a-chip (NoC) multiple-input-multiple-output (MIMO) orthogonal frequency division multiplexing (OFDM) application specific integrated circuit (ASIC) architecture which fully implements a 4×4 MIMO OFDM receiver and transmitter, which has a radiation hardened phase-locked loop (PLL) that provides a 1 GHz or 500 MHz clock to a NoC switch fabric, and at least two NoC Clusters on said NoC switch fabric, an Up/Down conversion cluster and a main MIMO OFDM and Single Carrier system cluster.

19 Claims, 57 Drawing Sheets

(56) References Cited

U.S. PATENT DOCUMENTS

2007/0258536 A1* 11/2007 Kim .................... H04B 7/0426
                                                        375/267
2008/0266176 A1* 10/2008 Nabar .................. H03G 3/3042
                                                        342/373

* cited by examiner

RECONFIGURABLE NETWORK ON A CHIP (NOC) RADIO THROUGH REDUCED INSTRUCTION SET COMPUTER (RISC) AGENTS BY OVERWRITING PROGRAM STORE FOR DIFFERENT PHASES OF DEMODULATION

BACKGROUND

Field of the Invention

The invention relates to a reconfigurable radio chip architecture and system, and in particular, without being limited hereby, to devices, methods, and related inventions of a network on a chip (NoC) multiple-input-multiple-output (MIMO) orthogonal frequency division multiplexing (OFDM) application specific integrated circuit (ASIC) which fully implements a 4×4 MIMO OFDM receiver and transmitter.

Background of the Invention

To support a wide range of throughputs over a variety of adverse conditions requires reconfigurability of the baseband processing of advanced radio communications systems. The system must reconfigure for trading off long range for throughput, or lower power versus throughput. Some communication links require adaptation to the presence of jammers or noise sources. Communication systems based on MIMO OFDM can be reconfigured to meet a wide variety of requirements for range and throughput. OFDM in particular has proven to be a robust system in the presence of multi-path fading, Doppler shift due to vehicle motion or variations in the channel. OFDM is also robust against system issues such as carrier offset between the transmitter and receiver, receiver phase noise offset and timing drift. With MIMO OFDM, the system can be trained to support multiple Modulation Coding Schemes (MCS) that tradeoff throughput for range and enhanced diversity.

It would be desirable to have a 4×2 MIMO OFDM system in which the transmitter has 4 transmit chains and the receiver has 2 receive chains which can be configured into a 2×2 system, a 4×1 system or even a 1×1 system depending in the throughput and power requirements. Depending on the communication environment, it would also be desirable to provide feedback between the base station and the subscribing station (for example between a rover and a fixed location lander) or low orbit satellite. In these cases, MIMO Beamforming would be desirable to achieve very high though-put at lower power or longer range compared to open loop MIMO systems.

Accordingly, there is a need for an architecture that can support both beamforming using Singular Value Decomposition (SVD) and at the same time space time coding and open loop MIMO systems. It is also desirable to support most of the advanced equalizers that are needed when dealing with not only adverse environments but also compatibility with other radio standards, and to provide a system that can be reconfigured for both closed loop beamforming and open loop MIMO systems.

A Reconfigurable Radio system must be able to support both high throughput and for power saving or long range, lower throughput. In the current IEEE 802.16e standard, scalable OFDMA is employed to support multiple rates but in a way to maintain robustness as the size of the FFT is increased to support higher throughput. The receiver chain of MIMO OFDM systems reveals areas for improvements to computational resources re-use, area optimization, and for reconfigurability for variable FFT sizes and MIMO configurations.

SUMMARY

In a preferred embodiment, there is provided a Reconfigurable NoC MIMO OFDM ASIC which fully implements a 4×4 MIMO OFDM receiver and transmitter, comprising:

a host interface that is a 1 Gbps LVDS SERDES interface, a primary 32 bit RISC, a 2×2 Singular Value Decomposition (SVD) computation engine that supports four receive chains at IF or Zero-IF (with I and Q interleaved) using four off-chip Analog to Digital Converters (ADCs) and supports four transmit channels, with at least one Digital to Analog Converter per transmit chain, a radiation hardened phase-locked loop (PLL) that provides a 1 GHz or 500 MHz clock to a NoC switch fabric, at least two NoC Clusters on said NoC switch fabric, an Up/Down conversion cluster and a main MIMO OFDM and Single Carrier system cluster, wherein separation of the two clusters is driven by at least one factor selected from Up/Down conversion cluster agents that are always active during receive or transmit, wherein there is no orthogonality between operation modes, wherein the cluster agent types are tuned to the Up/Down conversion process, wherein the Up/Down conversion cluster agents include numerically Controlled Oscillators and Mixers, CIC Filters and FIR Filter agents, and wherein RISC Agents in the Up/Down conversion cluster deal with the reprogrammable FIR filters and AGC among other tasks and are always busy, wherein the MIMO OFDM cluster has many operations that are orthogonal and unlike the Up/Down Conversion cluster many tasks are idle between reception of radio packets, wherein the Up/Down Conversion cluster feeds samples into the MIMO OFDM cluster during radio packet reception and during radio packet transmission the MIMO OFDM cluster feeds data into the Up/Down conversion cluster, wherein the Primary 32-bit RISC is responsible for host interface processing and MAC operations and is responsible for downloading code segments into the RISC agents in the clusters to reconfigure the Radio, the Primary 32-bit RISC interfaces into the high speed SERDES host interface using the 8b/10b and 10b/8b with Disparity Encoders and Decoders, the Decoder also aligns the SERDES data in conjunction with K28.5 characters and receives overflow and under flow signals, wherein a primary RISC 32-bit Wishbone BUS Interface is provided to provide maximum flexibility in the programming of the Primary RISC and provides the RISC for off-chip and on-chip interfacing, including to firmware stored in Rad Hard parallel EEPROMS, for access to Rad Hard Volatile RAM, and optionally for interfacing the Wishbone bus to an FPGA to provide stimulus or to further process the received streams, wherein each NoC cluster has a dedicated SPI agent with an off chip SPI slave interface, wherein the SPI agents support the transmission and reception of arbitrary 128 bit packets into the switch fabric to any agent within the NoC cluster to allow for the individual testing of all agents within a cluster and to test any agent by the Primary RISC and by extension through the SERDES host interface, the Primary RISC having independent access to the NoC clusters.

In another preferred embodiment, there is provided a Reconfigurable NoC MIMO OFDM ASIC, further comprising a high performance FPGA to further process demodulated receive streams to recover transmitted digital data, and wherein the FPGA provides digital stimulus through the ADC interfaces for testing the MIMO OFDM Receiver.

In another preferred embodiment, there is provided a Reconfigurable NoC MIMO OFDM ASIC, further comprising wherein the FPGA implements a high speed Viterbi decoder in a 2×3 open loop MIMO system, wherein there are three receive chains and two demodulated data streams, wherein the high speed transfer between the demodulated data streams and the FPGA, where they are decoded, combined and then processed by a Viterbi decoder, is accomplished using the offchip Wishbone bus and wherein the FPGA provides digital stimulus through the ADC interfaces for testing the MIMO OFDM Receiver.

In another preferred embodiment, there is provided a Reconfigurable NoC MIMO OFDM ASIC, further comprising a SpaceWire Interface for interfacing to a SpaceWire network.

In another preferred embodiment, there is provided a Reconfigurable NoC MIMO OFDM ASIC, further comprising wherein the LVDS SERDES interface is a Radiation Hardened SERDES hard macro that supports a mode where the SERDES LVDS drivers are directly accessed through the LSB of the transmit and receive digital signals, wherein the SERDES PLL and clock data recovery are turned off and the host interface is through two SpaceWire CODECs implemented on the ASIC, wherein an external pin switches between the SERDES interface or the SpaceWire interface.

In another preferred embodiment, there is provided a Reconfigurable NoC MIMO OFDM ASIC, further comprising wherein the MIMO OFDM cluster in the prototype chip supports a 4 receive chain system to provide a MIMO system selected from a 4×4, 3×4, 4×2, 2×3, 2×2 and 1×4, 1×3, 1×2 and 1×1 MIMO systems, wherein each receive chain has an independent Fast Fourier Transform (FFT) agent that receives baseband samples from the Up/Down Conversion cluster, the FFT agents independently process each receive chain in parallel and each FFT agent is implemented in the RISC agent.

In another preferred embodiment, there is provided a Reconfigurable NoC MIMO OFDM ASIC, further comprising at least four Single Value Decomposition (SVD) Agents that run in parallel and are not tied to a receive chain, each SVD agent processes an orthogonal carrier set to compute the 2×2 SVD per carrier.

In another preferred embodiment, there is provided a Reconfigurable NoC MIMO OFDM ASIC, further comprising wherein, after each SVD agent processes an orthogonal carrier set to compute the 2×2 SVD per carrier, the SVD agent is used computes the pseudo-inverse for open loop systems, or supplies the U, C and V matrices per carrier for beam forming, wherein the code in each SVD agent is replaced with code for computing the MIMO equalization of the receive chains using complex matrix multiply and to support Pilot Tracking and other operations.

In another preferred embodiment, there is provided a Reconfigurable NoC MIMO OFDM ASIC, further comprising wherein primitive agents are placed near the RISC agents for SVD or FET to minimize the latency.

In another preferred embodiment, there is provided a Reconfigurable NoC MIMO OFDM ASIC, further comprising a complex SRAM Agent sized to support MIMO OFDM systems with 1024 carriers for very high throughput, wherein the Complex RAM agent stores complex samples arranged as 32 bit words using 16 bits for the real part and 16 bits for the imaginary part, wherein the Complex RAM agent is implemented as a 2048×32 Radiation Hardened SRAM having a state machine to interpret commands, and supports read and write to individual locations and specialized operations including high speed shifting of data.

In another preferred embodiment, there is provided a Reconfigurable NoC MIMO OFDM ASIC, further comprising wherein key operations are orthogonal, including:
operations in packet detection (excluding CFO correction) and the FFT are orthogonal;
computation of the MIMO equalization matrix W and the equalization of the received streams are orthogonal;
computation of the Equalizer matrix W and the FFT are orthogonal; and
Automatic Gain Control (AGC) operations are orthogonal with the FFT.

In another preferred embodiment, there is provided a Reconfigurable NoC MIMO OFDM ASIC, further comprising wherein primitive computational elements from Macro blocks including FFT's, Autocorrelators, Matched Filters, and Matrix inversion etc. are reused between blocks and are available for any computational tasks that are non-overlapping, wherein the RISC agent operates on a single cycle basis and controls the data processing flow through the primitive computational blocks, and wherein the primitive computational elements and the RISC controllers are connected by a specific NoC architecture optimized for MIMO OFDM operation.

In another preferred embodiment, there is provided a Reconfigurable NoC MIMO OFDM ASIC, further comprising wherein the NoC switch fabric includes grid networks formed by interconnecting the compute agents and digital controllers through the 5-port routing switches, wherein each routing switch uses a 96 bit packet length and supports high precision for fixed point operations.

In another preferred embodiment, there is provided a Reconfigurable NoC MIMO OFDM ASIC, further comprising a 1024 point FFT.

In another preferred embodiment, there is provided a Reconfigurable NoC MIMO OFDM ASIC, further a Radix 2 FFT on the NOC architecture and includes a Rotation CORDIC agent to compute the Twiddle factors based on the size of the FFT, a Complex Multiply Agent containing three multipliers and adders, a Complex RAM agent for storing the Twiddle factors, for storing a block of complex samples that are the input to the FFT, and also for storing results.

In another preferred embodiment, there is provided a Reconfigurable NoC MIMO OFDM ASIC, further comprising 64 Point FFT In another preferred embodiment, there is provided a Reconfigurable NoC MIMO OFDM ASIC, further comprising a 256 point FFT.

In another preferred embodiment, there is provided a Reconfigurable NoC MIMO OFDM ASIC, further comprising a list of requirements for the RISC agent for processing complex multiplication results or implementing two real FIR filters in a single agent, comprising:
Dual 40 bit Accumulators with Clear for computing complex matrix Row×Columns, complex matched filter operations, and dual real FIR filtering (I and Q channels);
16 bit ALU operations;
Register File with 32 Registers each 32 bits wide and addressable as 16 bit real and 16 bit imaginary part;
Registers in Register file used as addresses for Complex RAM Agents;
Programmable Demux of received packet fields into Registers in Register file or inputs to Accumulator;
Dual Barrel Shifter;
Rounding unit per Accumulator;
Bit addressable logic;

Dual status registers for Dual/Quad ALU results;
Bit Reverse Address Generation;
Modulo M Address Generation;
Programmable Routing of Registers in Register File or Accumulators to Output Packet Fields;
Optimized for "C" Switch Case Statements;
Support for Viterbi Compare, Select, and Store Unit (CSSU) for the Add/Compare Selection of the Viterbi Operator (per TI TMS320C54);
Specialized Hardware support for Interleaver and De-interlever algorithms;
Reed Solomon Decoding Optimization Hardware; and
Convolutional Turbo Coding Acceleration.

In another preferred embodiment, there is provided a Reconfigurable NoC MIMO OFDM ASIC, further comprising SET hardening using special RHBD circuit techniques, comprising at least one of the following:

temporal sampling latch technology for accumulators, integrators, comb filters, and XY coordinates in the routing switches associated with each cluster Tag;

for memory, conventional unhardened 4-transistor memory cells, placing each bit of a word in a separate memory block (to achieve large separations), and using an inexpensive error detect and correct (EDAC) scheme, such as a Hamming code with periodic scrubbing, to reduce the error rate to an acceptable level;

combinational logic is hardened by using radiation hardened standard cell library; and code in the RISC agents can be scrubbed by the Primary RISC on a periodic schedule.

DETAILED DESCRIPTION OF THE INVENTION

1. Introduction

As previously stated, to support a wide range of throughputs over a variety of adverse conditions requires reconfigurability of the baseband processing of advanced radio communications systems. The system must reconfigure for trading off long range for throughput, or lower power versus throughput. Some communication links require adaptation to the presence of jammers or noise sources. Communication systems based on MIMO OFDM can be reconfigured to meet a wide variety of requirements for range and throughput. OFDM in particular has proven to be a robust system in the presence of multi-path fading, Doppler shift due to vehicle motion or variations in the channel. OFDM is also robust against system issues such as carrier offset between the transmitter and receiver, receiver phase noise offset and timing drift. With MIMO OFDM, the system can be trained to support multiple Modulation Coding Schemes (MCS) that tradeoff throughput for range and enhanced diversity.

Figure 1:
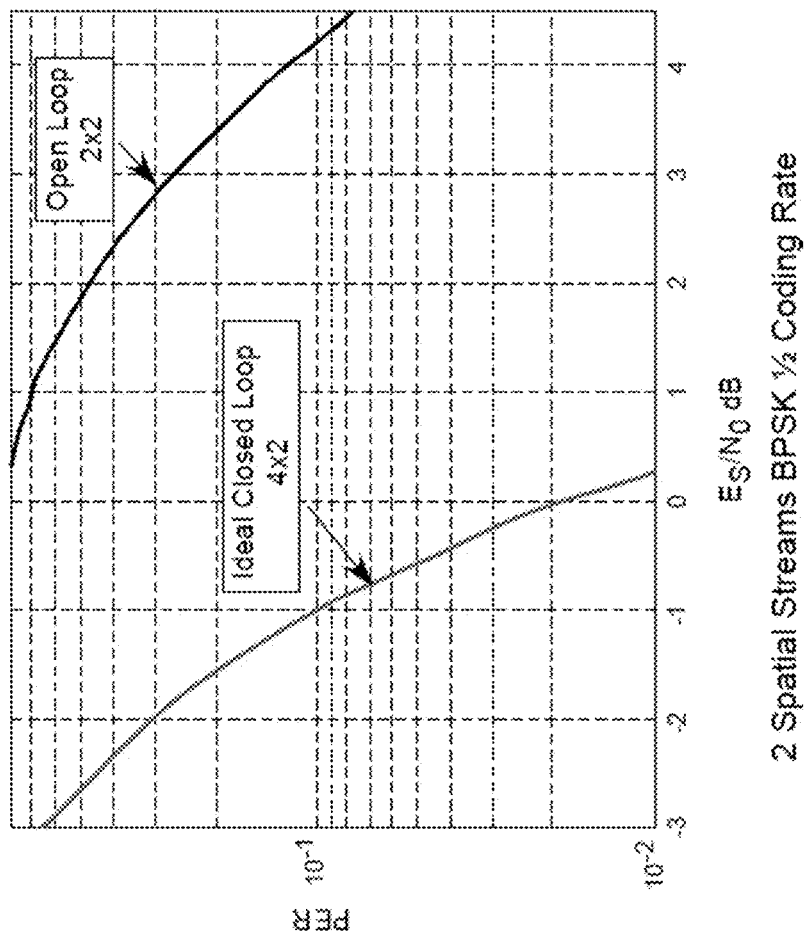
FIG. 1 is a graph and shows an ideal closed loop 4×2 compared to an open loop 2×2 for 2 spatial streams BPSK 1/2 coding rate as published by Li and Lin from 2005.

A 4×2 MIMO OFDM system in which the transmitter has 4 transmit chains and the receiver has 2 receive chains can be configured into a 2×2 system, a 4×1 system or even a 1×1 system depending in the throughput and power requirements. Depending on the communication environment, feedback may be possible between the base station and the subscribing station (for example between a rover and a fixed location lander) or low orbit satellite. In these cases MIMO Beamforming can be used to achieve very high through-put at lower power or longer range compared to open loop MIMO systems. To illustrate this point consider the results shown in FIG. 1. The key point is that for lower power and complexity the rover uses two antennas but the base station uses 4. In the 4×2 system the gain is 5 dB compared to an open loop 2×2 system. This system requires feedback and the amount of feedback can be traded off with performance. Nevertheless, through more complex digital signal processing tremendous gains in throughput or range can be achieved.

Figure 2:
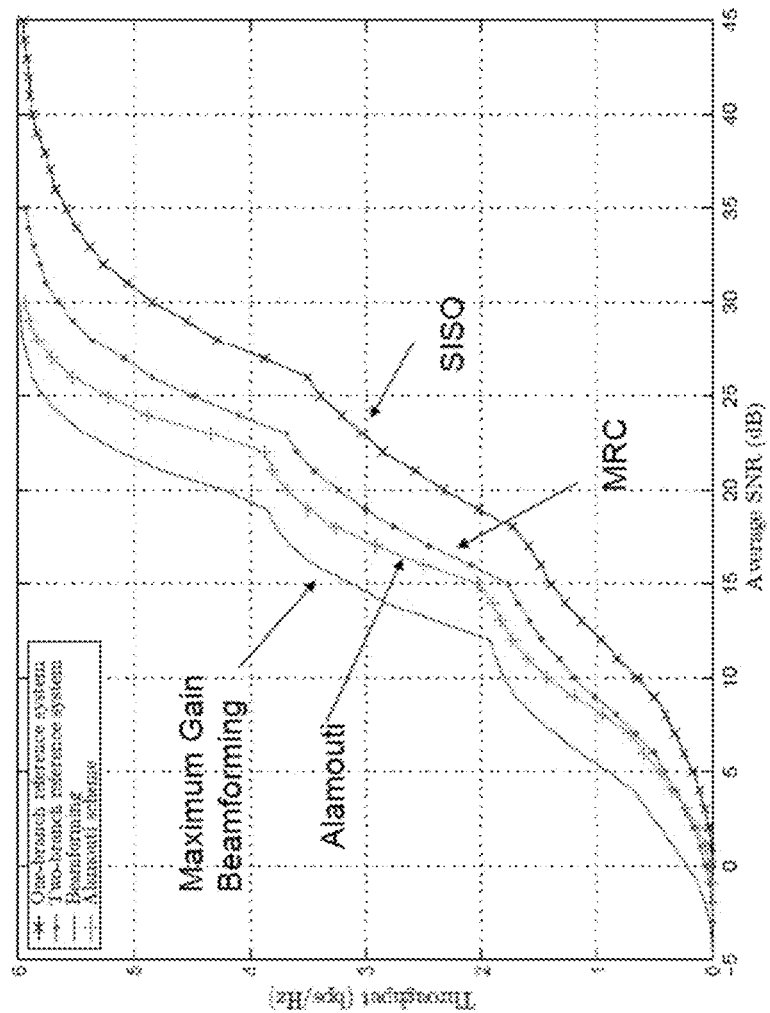
FIG. 2 is a graph and shows throughput vs. average SNR for Alamouti, MRC and SISO as published by Fredriksson in 2004.

With the densities of 90 nm processes and lower this is a good tradeoff especially if more receive chains can be eliminated to save power (or turned off). It is also worth highlighting the maximum gain beam forming technique versus other diversity schemes such as Alamouti and MRC schemes as shown in FIG. 2. It is clear that huge gains can be achieved with beam forming with a reduction in receive chains from two to one. The architecture claimed and disclosed herein shows that it can support both beamforming using Singular Value Decomposition (SVD) and at the same time space time coding and open loop MIMO systems. In particular, it is shown that a 2×2 SVD computation engine can support both beam forming and open loop zero forcing MIMO equalizers. By implementing a 2×2 SVD computational kernel, support is provided for most of the advanced equalizers that need to deal with not only adverse environments but also compatibility with other radio standards. The system disclosed and claimed herein can be reconfigured for both closed loop beamforming and open loop MIMO systems.

A Reconfigurable Radio system must be able to support both high throughput and for power saving or long range, lower throughput. In the current IEEE 802.16e standard, scalable OFDMA is employed to support multiple rates but in a way to maintain robustness as the size of the FFT is increased to support higher throughput. In the inventive reconfigurable communication system, the support of variable length FFT's is a key requirement.

A brief overview of the receiver chain of a MIMO OFDM system reveals areas for both computational resources re-use, for area optimization, and for reconfigurability for variable FFT sizes and MIMO configurations. After this brief review, a reconfigurable Network on a Chip (NoC) architecture is presented that meets the requirements for reconfiguring for throughput versus power, throughput versus range, robustness, fault tolerance, and trading off damaged computational units against throughput in adverse conditions.

2. Summary

The present invention provides results on mapping complex matrix multiply, variable length fixed point FFT's, and fixed point CORDIC based SVD computations to a Network on a Chip. Results of MIMO OFDM systems simulation in a "C" block diagram environment using the fixed point CORDIC implementation of the SVD algorithm in multi-path fading channel environments will be presented. The fixed point CORDIC SVD tracks the LAPACK based floating point calculations over all carriers with slight deviation for ill conditioned channels.

The architecture of a multi-cluster NoC Reconfigurable Radio architecture that supports 4×4 Beamforming MIMO OFDM systems and that is reconfigurable to support 4×2, 2×3 and 2×2 and 1×2 systems is provided herein. The toplevel block diagram of a prototype Radiation Hardened Reconfigurable Radio ASIC Chip is also provided. In this research special attention has been paid to the design and custom layout of the routing switch in the NoC. By using custom layout and hand optimizations very high speed operation are achieved through the pipelined NoC Grid network and at the same time reduce area and power consumption.

3. Brief Overview of MIMO OFDM Communication Receiver

3.1 MIMO Communication Channel

Figure 3:
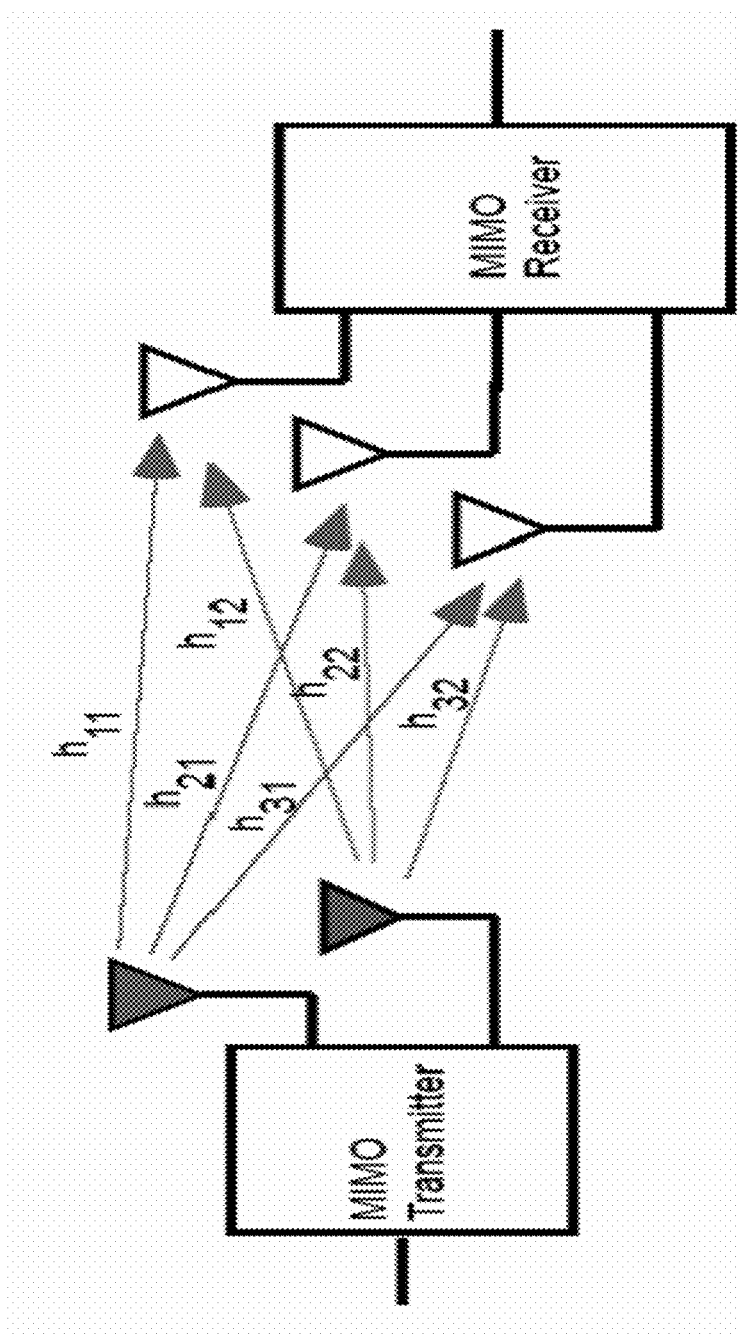
FIG. 3 is a drawing of a 2×3 MIMO channel.

A MIMO communication channel is shown in FIG. 3. The figure shows the complex frequency response for a single carrier in a MIMO OFDM system from each transmit antenna to each receive antenna. The complex elements hjk (j=1, 2, 3) and (k=1, 2) form a complex matrix H. To implement a MIMO OFDM system, the receiver needs to estimate the channel per carrier in order to perform equalization and separate the multiplexed streams (or to generate a single stream in diversity schemes). To do this, each transmitted packet contains high throughput training symbols. The receiver processes these training symbols and estimates the channel. There are beamforming schemes that can eliminate the need for training for the channel but assume that the transmitter also receives packets from the receiver. See [Jafarian, 2005] and [Dahl, 2002]. In an open loop zero forcing MIMO system, in order to separate and equalize the received channels, the Pseudoinverse [Weisstein] of the channel is computed for reach carrier's H channel matrix.

Thus the matrix W is computed per carrier as follows:

$$W = H^+ = (H^\dagger H)^{-1} H^\dagger$$

The vector y contains the received complex carrier per receive antenna chain. Multiplying W by y yields the estimated transmitted complex carrier. In a 2×2 system, in effect, the two streams which were mixed in the multipath fading channel are now separated and can be demodulated independently and combined to get twice the throughput of a Single Input Single Output System (SISO).

$$\hat{x} = Wy = x + Wn$$

Where x is the vector of transmitted streams and n is the frequency domain additive white Gaussian noise.

3.2 Overview of an IEEE 802.11n MIMO Systems

The architecture of a 2×2 MIMO OFDM system adopted from the IEEE 802.11n standard is explained below.

Figure 4:
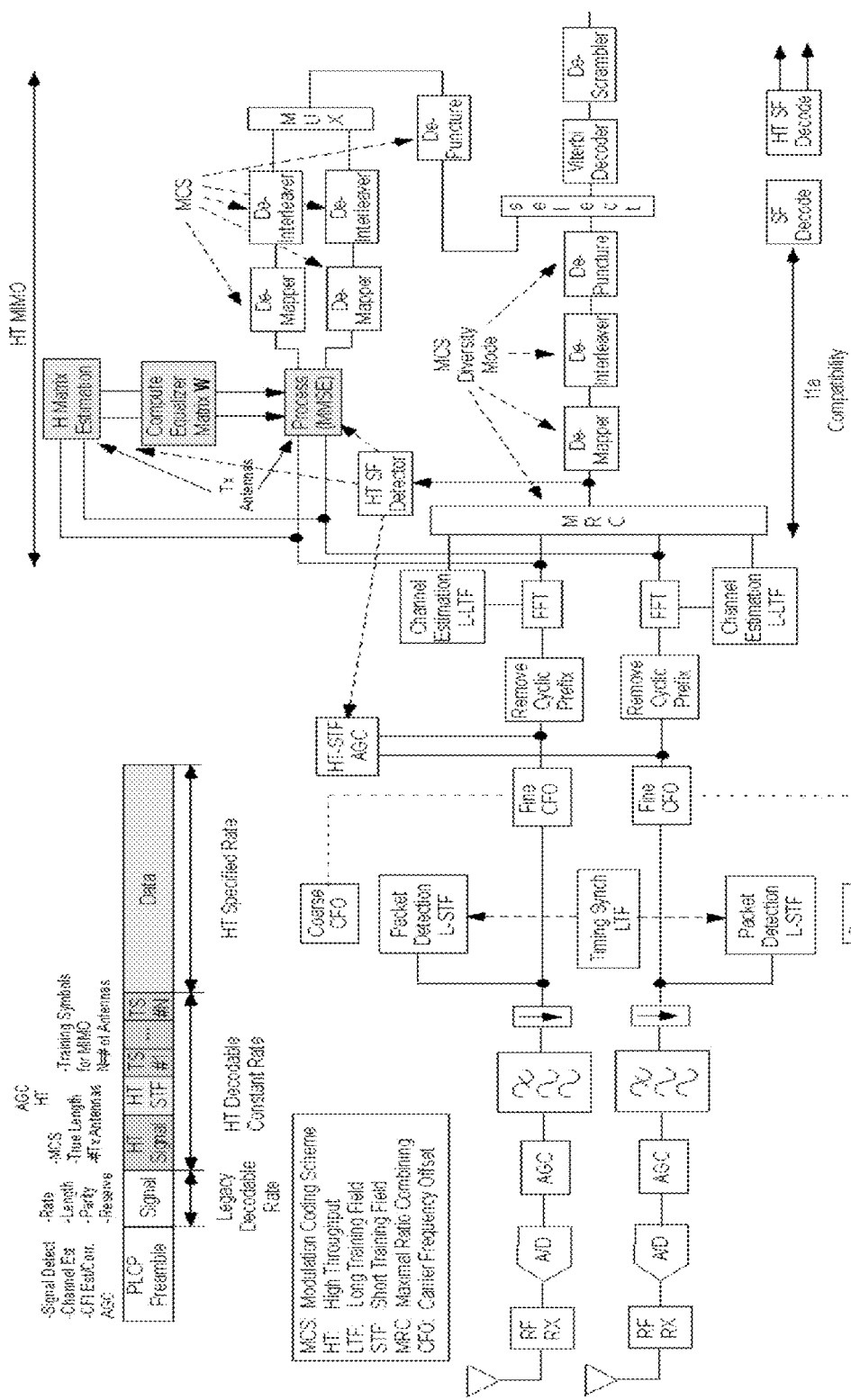
FIG. 4 is a drawing and shows a IEEE 802.11n 2×2 MIMO Receiver Block Diagram.

The block diagram of a 2×2 MIMO OFDM receiver based on the IEEE 802.11n standard is shown in FIG. 4. The RF receiver front end can be implemented with either a direct conversion architecture or an IF architecture. Assuming an IF architecture the Analog to Digital converters operate at a high rate. The key point is that the RF front end performs filtering of alternative channels and some filtering on adjacent channels. The rejection of jammers is carried out using a multistage approach using cascaded ideal integrator stages operating at a high sampling rate and an equal number of comb stages operating at a low sampling rate [Hogenauer, 1981]. This combination is referred to as the CIC and after this stage the samples are decimated to a lower rate. This lower rate is such that sharp filtering can be done by a high order FIR filter that uses multipliers and accumulators but at the lower rate. The FIR filter rejects the adjacent channel and jammer. Another decimation of the samples reduces the sampling rate to the baseband sampling rate for the MIMO OFDM system. For 11n this is 20 MHz.

Figure 5:
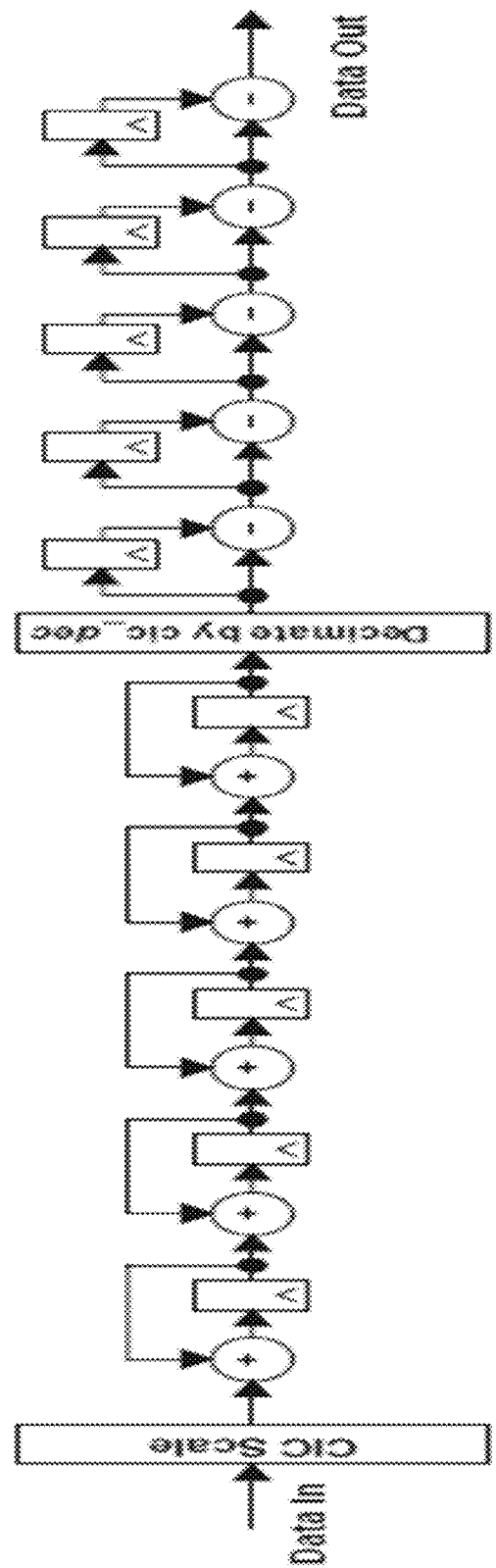
FIG. 5 is a drawing and shows a Stage CIC Decimate Filter (GC5016).
Figure 6:
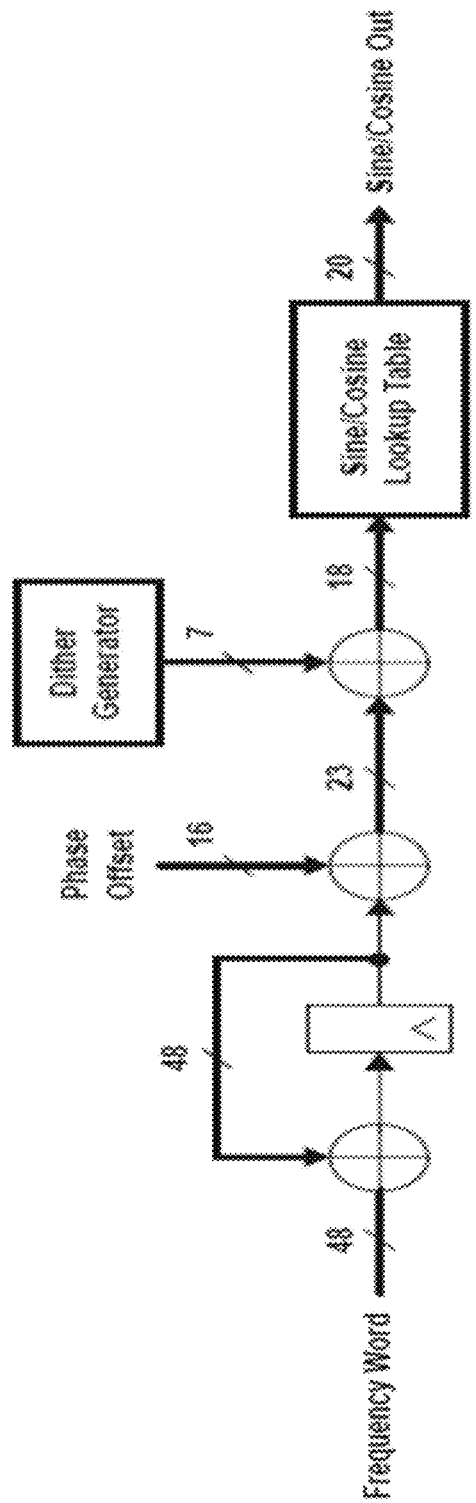
FIG. 6 is a drawing and shows a Numerically Control Oscillator (NCO) Circuit (GC5016).
Figure 7:
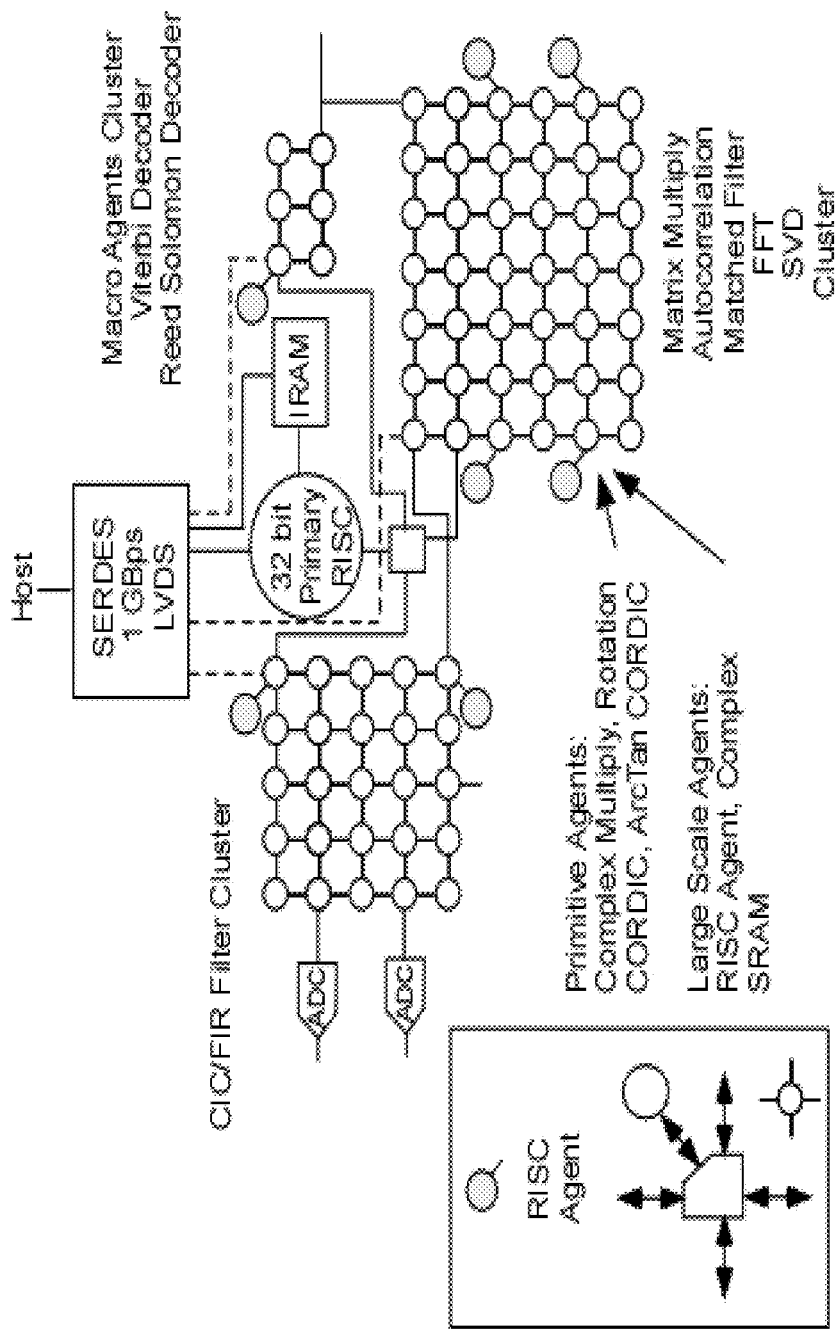
FIG. 7 is a drawing and shows a Multi-Cluster NoC Reconfigurable Radio.

For the design of a reconfigurable radio, the CIC/FIR filter combination is programmable and the decimation rates and FIR filter taps are also programmable. The Texas instruments GC5016 is an example of this approach. The GC5016 CIC filter is shown in FIG. 5. In addition to the programmability for the CIC and FIR filter, a quadrature Numerically Control Oscillator (NCO) is also available in the G5016 (see FIG. 6). The NCO is required to convert the sampled IF to an in-Phase and Quadrature phase stream. In MIMO systems multiple CIC/FIR filter combinations are used per receive chain.

The received samples at baseband are processed by the packet detection and frequency offset correction blocks. These blocks include complex matched filter and auto correlation and CORDIC arctangent and Rotation blocks for the CFO estimation and correction. The packet preamble also contains long training symbols or fields used in both fine CFO estimation and correction and for channel estimation and correction. In 11n, the preamble also contains high throughput long training symbols to estimate the MIMO channel H. Space does not allow us to cover all aspects of the MIMO OFDM receiver but we will focus on the MIMO equalizer. After packet detection and CFO correction and guard interval removal, the FFT operation results in aggregate carriers for either the H matrix frequency response per carrier during training or the data and pilot carriers during data demodulation (steady state operation). For each carrier (data or pilot) there is an H matrix. The shaded areas in the block diagram in FIG. 4 show the processing for MIMO equalization. These blocks involve a high level of computational complexity.

3.3 NoC Concept from Analysis of MIMO OFDM Packet Receiver Flow

The following described features are of great significance to the NoC architecture that is provided for the Reconfigurable Radio:

Key operations are orthogonal. That is they do not overlap. The operations in packet detection (excluding CFO correction) and the FFT are orthogonal. The computation of the MIMO equalization matrix W and the equalization of the received streams are orthogonal. The computation of the Equalizer matrix W and the FFT are orthogonal.

Decimation and filtering of the IF (or Zero IF) samples from the Analog to Digital converters are continuous and are not orthogonal to down stream processing.

Automatic Gain Control (AGC) operations are orthogonal with the FFT. Also AGC algorithms are most appropriately handled with a programmable RISC controller to adapt to different environmental conditions and modulation schemes.

Based on these observations we can reuse the complex multiply and addition operations between the packet detection processing and the FFT. Also we re-use the multiply and addition operations between MIMO training and computation of the equalizer matrix and the steady state equalization of the streams. The benefits of re-use are: (1) to lower area requirements by a substantial amount, (2) fine grain control over primitive computational elements including adders and multipliers. The control includes turning them off for low power operation or disabling their use in case of faults in the logic.

A key aspect of this work is to un-bundle primitive computational elements from Macro blocks (FFT's, Autocorrelators, Matched Filters, Matrix inversion etc) and reuse them between blocks. The unbundled primitive computation blocks are "freed" from the Macro block "prison" and are available for any computational tasks that are non-overlapping. We also propose to introduce lean and mean RISC machines that operate on a single cycle basis and control the data processing flow through the primitive computational blocks. For this approach to be viable the "primitive" computational blocks and the multiple RISC controllers have to be "networked" together. That is, the primitive elements and the RISC controllers are connected by a specific NoC architecture optimized for MIMO OFDM and by extension even SISO operation (not even excluding single carrier modulation schemes).

4. Multi-Cluster NoC Architecture for MIMO OFDM and Single Carrier Systems

The multi-cluster NoC architecture is optimized for the MIMO OFDM communication system. The agents that impact throughput such as the multipliers and accumulators are placed close together reducing the hops between the agents and the FSM's. The communication between clusters that involve multiple hops are constrained to operations that only add latency to packet demodulation but do not decrease throughput. For example after CIC/FIR filtering, the removal of carrier offset via the rotation CORDIC only adds a few cycles to the latency of packet demodulation by communicating between clusters but does not impact throughput.

The 1 GBps SERDES LVDS Interface allows the Host to connect to any agent in any cluster. Thus the Host can test each individual agent and interact with it.

The 32 bit Primary RISC processor controls the operation of the system. The individual RISC agents in each cluster are configured through the high speed SERDES host interface. But overall scheduling is performed by the Primary RISC machine.

Since clusters communicate with other clusters, each routing switch has entries for the Tag of a cluster. Associated with each Tag is the (y,x) address of the routing switch that is connected to the cluster associated with the Tag. If a packet is received at a routing switch, and if the Tag is native to the cluster normal XY routing takes place. If the Tag is not native, the XY address of the routing switch connected to the cluster is looked up and the packet is routed to that switch using normal XY routing (since it is a native switch). Since each cluster is connected to a limited subset of the total number of clusters the number of entries for each Tag per switch is limited. The Tag tables in each switch are configured by the RISC processor. Note this allows for reconfiguring the connections between clusters.

Operations such as AGC, Demapping and possibly De-interleaving are appropriately handled by the RISC agents. This is for maximum flexibility in handling various modulation schemes and to adapt to different radios (IF, Direct Conversion, different specifications on coarse and fine AGC etc). The RISC agents can also handle calibration, DC cancellation and IQ imbalance correction using the primitive agents and flexibility added by the programmability of the RISC agents.

5. Review of the Literature

The literature forecast Giga bps wireless operation in 2004 [Paulraj, 2004] and a 600 Mbps MIMO OFDM system was implemented in FPGA in [Teramoto, 2008] with higher rates expected to appear in commercial products. MIMO OFDM is key to achieving both high throughput and range. Software defined radios offer many advantages for reconfigurability as shown in [Kiessling, 2002], [Wiesler, 2002] and [Lin, 2007] among many others. A very successful reconfigurable baseband radio has been the PicoArray in which over 300 processors (3-way VLIW, Harvard architecture with local memory) and 14 co-processors are used [Duller, 2005]. The Network on a Chip concept has advanced considerably especially to take advantage of progress in very deep submicron technologies [Owens, 2007]. In this invention, a multi-cluster of NoC's is provided that is fine tuned to the data flow and scheduling of MIMO OFDM systems. Since operations are resolved down to primitive computational agents that are networked, a unique architecture is provided that allows the maximum flexibility and simplification of the network links and protocols. The work in [Manohar, 2001], the hybrid ring/mesh network in [Bourduas, 2007] and many other approaches to NoC are also worth considering.

The recent Speedster offering from Achronix is a 1.5 GHz non-traditional FPGA, but is not currently rad-hard and consumes approximately 50 W at nominal voltage. The XPP-III from PactXPP is a reconfigurable NoC that incorporates a large array of ALUs and general processors. A version of the design is being developed for a German aerospace company. The design targets video processing. See also iWarp in [Borkar, 1988].

6. Implementation of Complex Matrix Multiply on the Grid Network

Figure 8:
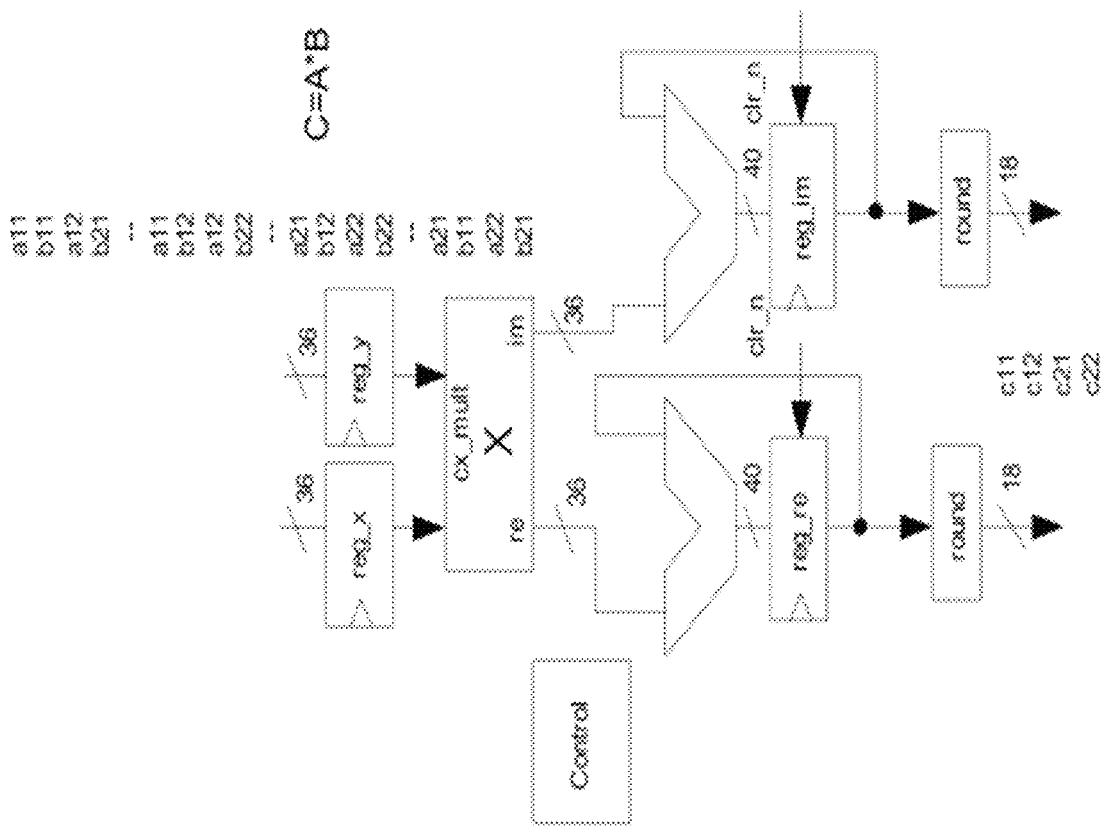
FIG. 8 is a drawing and shows a Matrix Multiply Flow.

An important operation in implementing MIMO OFDM systems on the NoC architecture is the complex matrix multiply of two matrices. In this section, the operation of complex matrix multiply on the network is shown using three agents. In the actual implementation, only two agents are used as the complex multiply itself is the primitive. However, by using a single real multiply as the primitive agent the computation flow using the NoC Grid network is illustrated. The first agent, cx_matrixmpy, has the stored A and B 2×2 complex matrices and performs the complex matrix multiply using the two agents "agent_cxmpy" and "agent_mpy". The operation also illustrates the use of a primitive real multiply. Also the complex matrix multiply agent performs full precision accumulation before rounding. The data flow is shown in FIG. 8.

Figure 9:
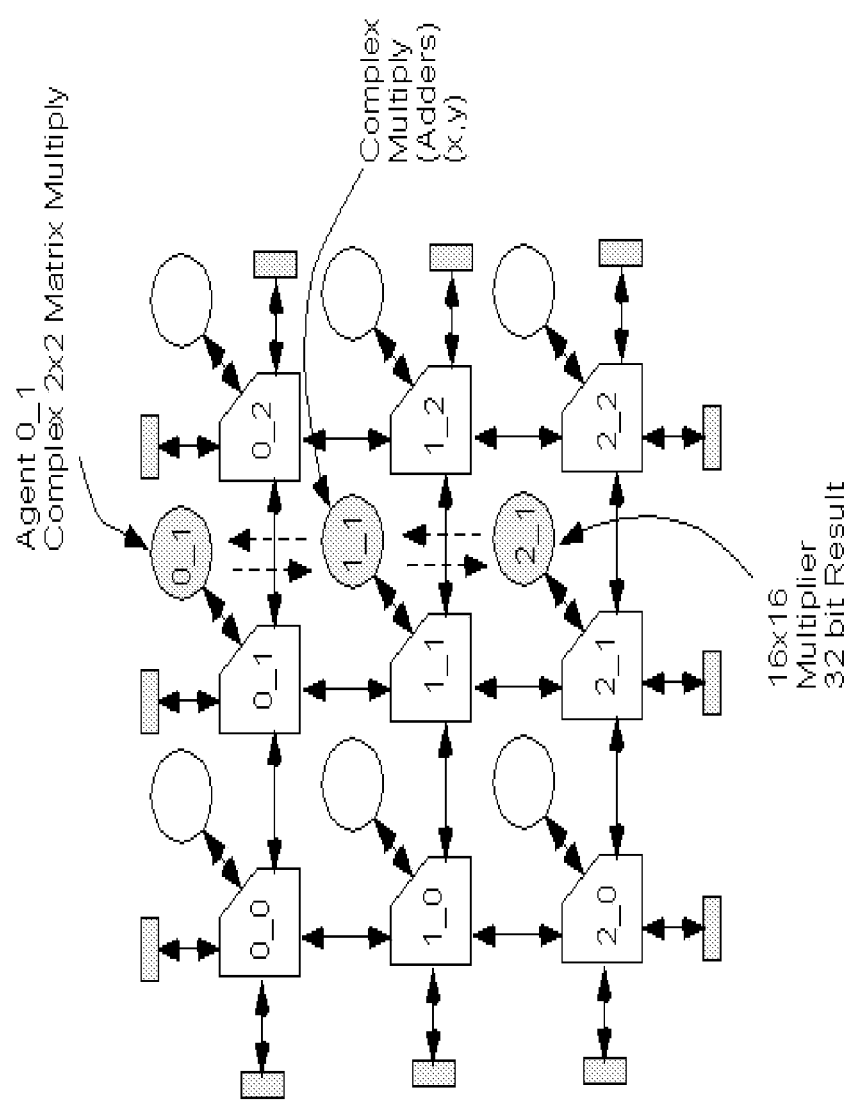
FIG. 9 is a drawing and shows a Complex Matrix Multiply with Real Multiply Agent.

FIG. 9 shows a 3×3 network and the traffic between the agents. The simulation was actually done using an 8×4 network.

Figure 10:
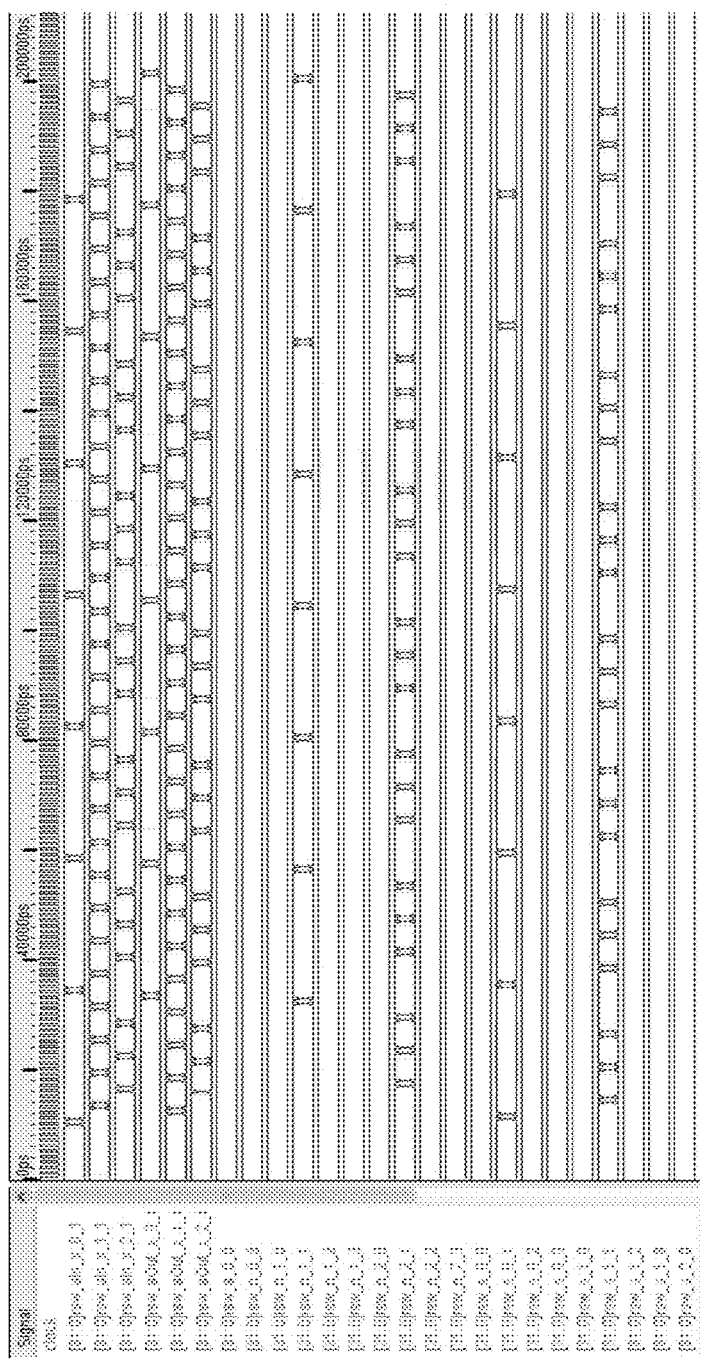
FIG. 10 is a drawing and shows a Timing Diagram 2×2 Complex Matrix Multiply on 8×4 Grid.

The timing diagram generated by the SystemC simulation of the complex matrix multiply operation is shown in FIG. 10. Note the routing of the packets from the agents. The matrix multiply operation shows how multiple parallel matrix multiplies can be carried out over the network. Adding more real agent multiplies can reduce computational latency. By examining the mapping of FFT algorithms and SVD, the synchronization and interlacing of operations through the network so that clashes do not occur can be accomplished. In the matrix multiply all multiplies were carried out using 16×16 multiplies and 32 bit accumulation, (40 bit accumulation as needed is available through SystemC's fixed point classes).

7. Synthesis and Layout of Routing Switch and Agents Using IBM 9LP 90 nm Process The key to the success of the multi cluster NoC Reconfigurable Radio is the switch fabric for networking the primitive and RISC based agents. Through extensive design and custom layout of the base routing switch for the network, the goal of supporting very high speed clocking rates to minimize the hop latency between switches is achieved and the reduction of power through clock frequency scaling (trading throughput for power) is demonstrated. Through a detailed analysis of the traffic of packets through the network between agents, the size of the switch is cut by a factor of 5 while having no negative impact on the functionality of the NoC. In fact, there are many areas of optimization that have been identified based on the fact that the multiple clusters of NoC implement DSP and Communication algorithms. For example, through detailed SystemC RTL level simulations, algorithms may be scheduled to avoid packet collisions and therefore eliminate the need for FIFOs in the switch.

Since the NoC Grid networks are formed by interconnecting the compute agents and digital controllers through the 5-port routing switches, in this section the initial work towards the development of the routing switch layout will be presented. The routing switch has to operate at high clock speeds so that the hop latency is minimized. To support very high throughput or range, the switch clock speed is at its peak. For very low power and/or very harsh radiation environments the switch clock speeds is dramatically reduced saving power and mitigating SEE.

Figure 11:
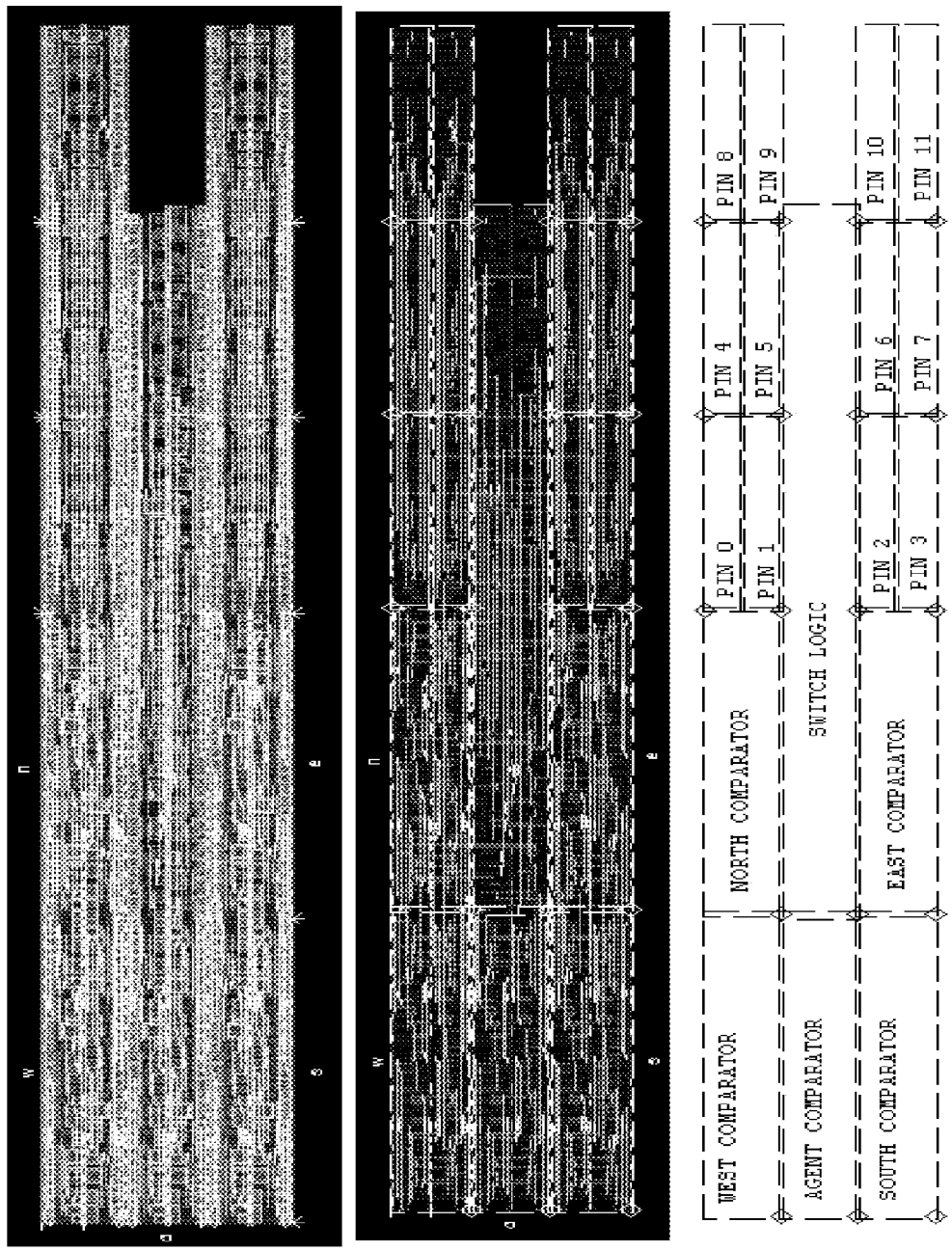
FIG. 11 is a graphic and drawing and shows a Custom Layout of the Switch with 12 bit Packet with 8 bit Send Address (4 bit X, 4 bit Y) and 4 bit Payload. RHBD IBM 90 nm 9LP Process. Top is Full Layout, Middle is Interconnect (Showing Metal 1, 2 and 3). The Bottom Shows the Logic Blocks (Note Comparators are for both X and Y).
Figure 12:
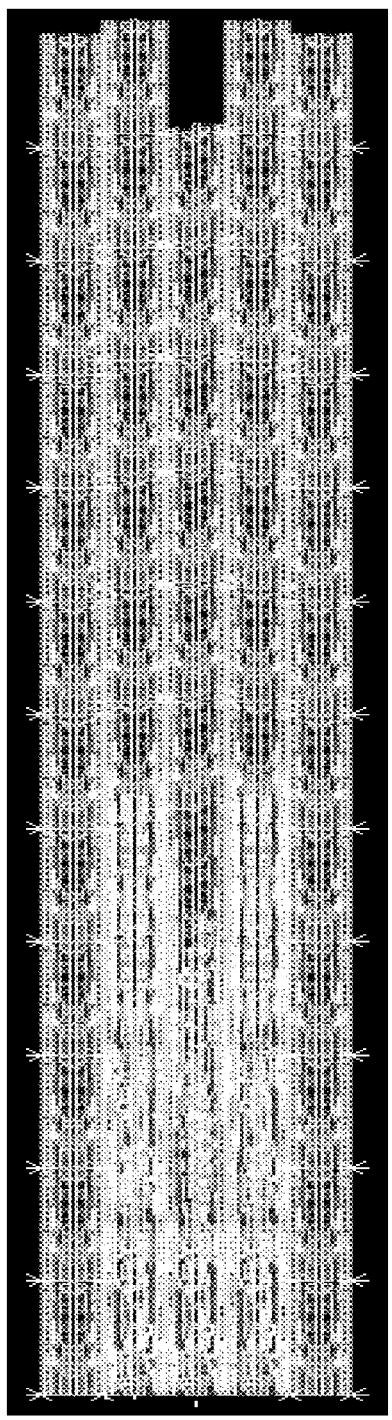
FIG. 12 is a graphic and shows a RHBD Custom Layout for the Switch with 96 bit Packet.

The custom layout of the Switch with full interconnect is shown in FIG. 11. The purpose for laying out a 12 bit packet is to facilitate Spice simulations including parasitic extraction with Caliber xRC. The 12 bit packet also demonstrates the operation of the core logic. The layout for a switch with a 96 bit packet size is shown in FIG. 12. The dimensions and area for the switches are presented in Table 7.4.

TABLE 7.3

| 96 Bit Packet Field Organization | | | | | | | | | | |
|---|---|---|---|---|---|---|---|---|---|---|
| x_dst | y_dst | x_fwd | y_fwd | cmd | fwdCmd | reserved | Data | | | |
| (2,4) | (2,2) | (2,4) | (2,2) | 5 | 5 | 2 | 16 | 16 | 16 | 16 |
|  |  |  |  |  | Complex Multiply Result |  | zr(32) |  | zr(32) | |
|  |  |  |  |  | Complex Pair |  | x1r | x2r | y1r | y2r |
|  |  |  |  |  | CORDIC Rotation, Arctan/Modulus |  | xin | yin | xout | yout |
|  |  |  |  |  | CORDIC Arctan/Modulus |  | x | y | theta | rho |

Note:
(m,k) m tag bits, k address bits

To get an idea on the area/speed tradeoffs for agents that perform multiplies, Table 7.1 shows the results for the synthesis of various multipliers at different speeds. The IBM 9LP 90 nm process was used in the synthesis.

TABLE 7.1

| Multiplier Synthesis Results | | | | | |
|---|---|---|---|---|---|
| Speed | x,y | z | Area | Gate Count | Max, MHz |
| 50 MHz | 16 | 32 | 3,837 | 1,398 | 84 |
| 200 MHz | 16 | 32 | 4,779 | 1,742 | 203.7 |
| 200 MHz | 18 | 36 | 5,853 | 2,133 | 203.8 |
| 500 MHz | 18 | 36 | 18,107 | 6,599 | 504 |

For a complex multiply agent, the complex multiply is achieved with three real multiplies and adders. Table 7.2 below shows the results of synthesis with the IBM 90 nm 9SF process (similar in area to 9LP).

TABLE 7.2

| Synthesis Complex Multiply IBM 9SF | | | |
|---|---|---|---|
| Freq, MHz | Area | Gate Count | Prec.bits |
| 200 | 21943 | 7776 | 16 |
| 100 | 18155 | 6433 | 16 |
| 100 | 10248 | 3631 | 12 |

Although the standard cells in this case were not RHBD, the data shown in Table 7.1 is very informative. The RTL was developed and tested for the routing switch using a 96 bit packet length. The proposed fields for the 96 bit packet is shown in Table 7.3. This packet size supports high precision for fixed point operations. The address fields for x and y addressing in the grid also show 2-bit tag field which allows for the routing of packets between a Grid and three other Grids in the NoC Clusters.

Table 7.3 shows that the x dimension is greater than the y dimension. This is designed to facilitate the algorithms requirements and to increase throughput depending on the operations required. Obviously the switch area increases with packet size and it is preferable to keep the packet size as small as possible but still support the precision and flexibility for the communication system requirements.

TABLE 7.4

| Dimensions and Area for RHBD Custom Layout of Switch (µm and µm²) | | | | |
|---|---|---|---|---|
| Switch | X | Y | Area | Gate Count |
| 12 Bit Packet | 268.2 | 36 | 9655 | 670 |
| 96 Bit Packet | 531 | 60 | 31860 | 2212 |

To perform a custom layout of the Switch, automation scripts are combined (written in PERL and C) and manual layout using Catena's Layed advanced layout tool. Furthermore, the basic switch operations are simulated in Spice for the IBM 9LP process and operation at 1 GHz clocking speed has been confirmed. The tools that generate the layout from Verilog RTL gate level descriptions, also generate the Spice circuit (used both for simulation and also LVS).

8. Mapping the Radix 2 FFT to the NoC Architecture 8.1 Introduction

The Radix 2 FFT algorithm was mapped to the NOC architecture. The architecture supported variable FFT sizes by specifying only the FFT size and data block size (equal to FFT size). Both the 64 point and 256 point FFT were implemented in Fixed Point arithmetic. The stimulus for the 64 point FFT were the 54 Mbps data and 24 Mbps data from the IEEE 802.11a OFDM standard and the stimulus for the 256 point FFT was derived form the IEEE 802.16d 256 Point FFT standard. In both cases the NOC architecture was simulated in cycle accurate SystemC simulation (The FFT was implemented in SystemC RTL as is the NOC). The fixed point results matched the floating point expected results to a high degree of accuracy. This effort showed that a fixed NOC architecture can support variable size FFT based on the throughput requirements or robustness requirements of the reconfigurable radio.

8.2 Radix 2 FFT Algorithm Mapped to NOC Architecture

A key component of the Reconfigurable Radio is the FFT engine which needs to support variable size FFT's. The FFT support also needs to exploit the massive parallelism offered by the NOC Grid based architecture to both speedup the FFT computation and also to be able to exploit the computational primitives and allow the sharing of RAM resources (for storing complex data) by other agents in the network.

8.3 Radix 2 FFT

Figure 13:
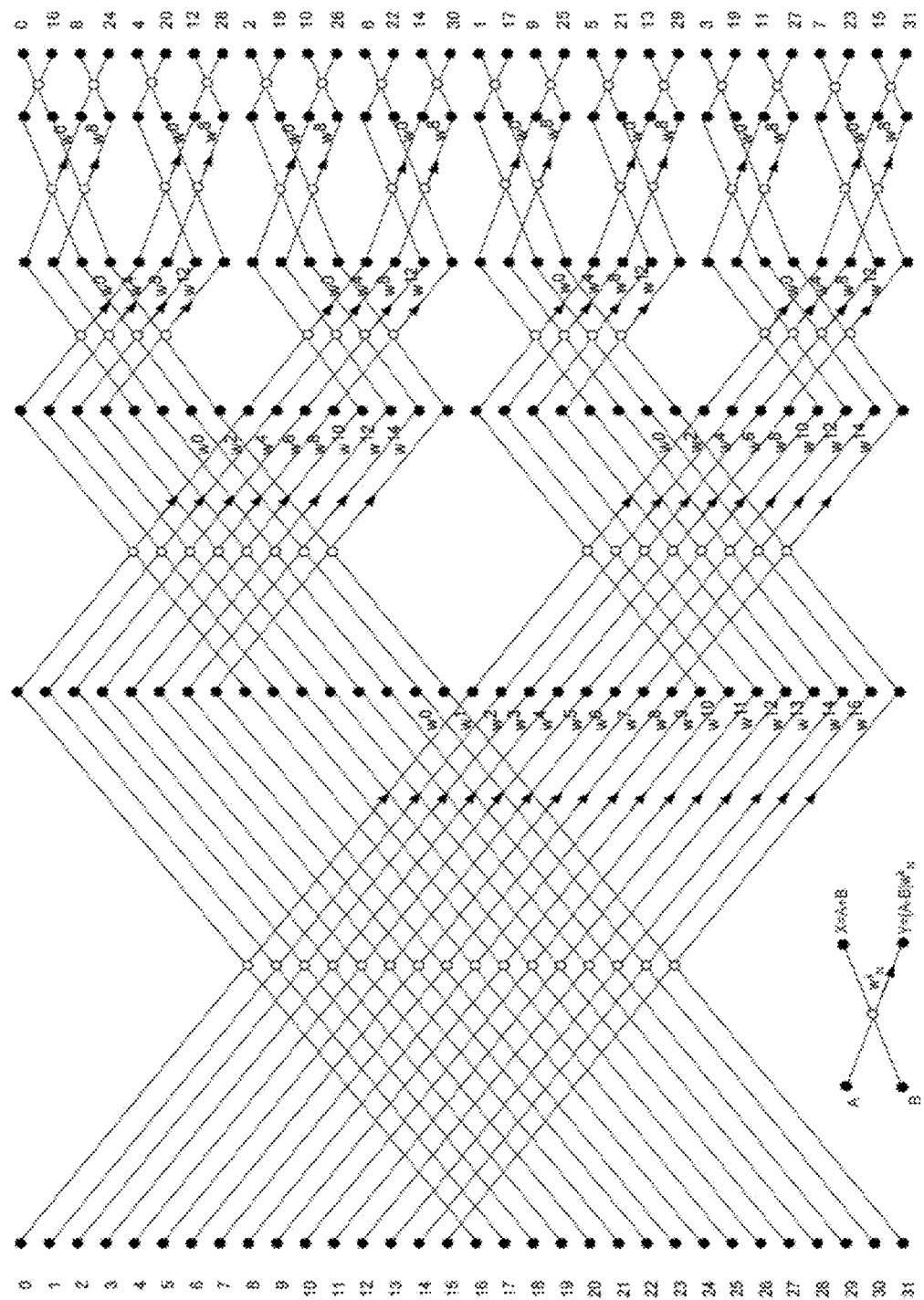
FIG. 13 is a drawing and shows a Radix 2 in-place FFT.

The 32 point Radix 2 in place FFT is shown in FIG. 13. This signal flow diagram for the FFT is derived from [Rabiner, Gold 75]. There are many methods and architectures to implant the FFT algorithm. For this invention, the mapping of the FFT algorithm to the NOC is unique and requires the development of an FFT agent that supports receiving and sending packets to other agents through the NOC. The FFT algorithm of FIG. 13 shows that the complex multiply operations require the Twiddle factors which depend on the size of the FFT. To support variable power of 2 size FFTs, the Twiddle factors are generated using a single Rotation CORDIC agent and the results stored in a complex RAM agent. The Complex RAM agent also stores the complex block of samples that are input to the FFT. The size of the RAM can support the anticipated maximum FFT size with room for the Twiddle factors. For example a 1024 point FFT. We must point out that to reduce the clock rate requirements we may support multiple complex RAM agents and combine smaller FFT's to form a larger FFT's. The architecture is quite flexible. In reference to FIG. 13 we also show that the FFT results are produced in bit-reversed order. The FFT we implement in the NOC is an in-place FFT where the results over-ride the original samples in the Complex RAM agent.

8.3.1 NOC Architecture to Support Radix 2 FFT

The minimum set of agents required to support a Radix 2 FFT on the NOC architecture is the Rotation CORDIC agent to compute the Twiddle factors (based on the size of the FFT), the Complex Multiply Agent (containing three multipliers and adders), the Complex RAM agent for storing the Twiddle factors and the block of complex samples that are the input to the FFT and also to store the result. The FFT Agent itself will consist of state machines that send and receive packets from the other agents. An agent is also used to read samples from a stimulus file (in the actual chip these are received by processing samples from Analog to Digital converters). Finally a Control agent starts the process by commanding the FFT agent to generate Twiddle factors for the specified FFT length and to also, through the rdsamples agent, read in a block of complex samples and store them in the Complex RAM agent. Finally the Control agent commands the FFT agent to compute the FFT and indicate when the FFT is done.

Figure 14:
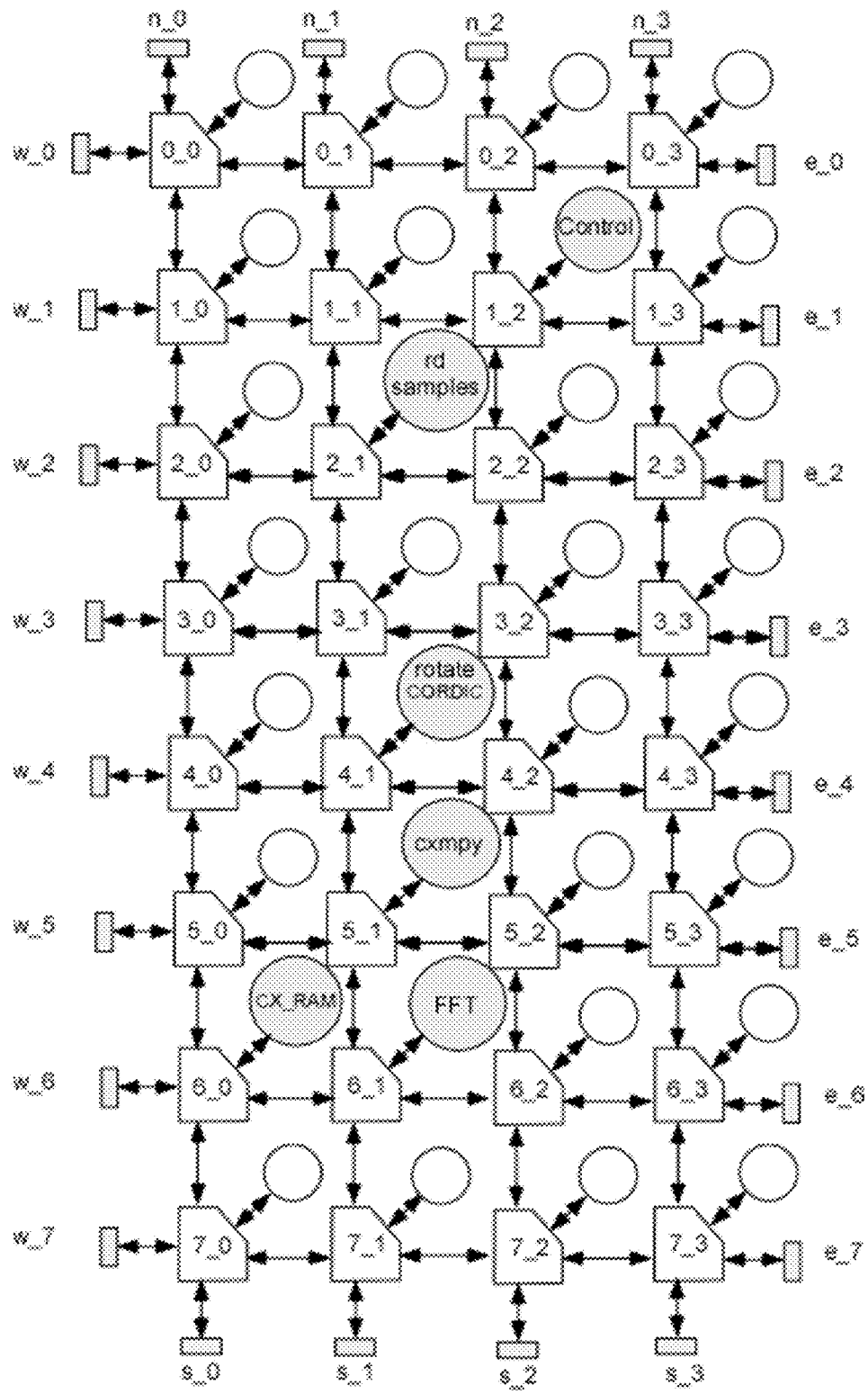
FIG. 14 is a drawing and shows a NOC Architecture 8×2.
Figure 15:
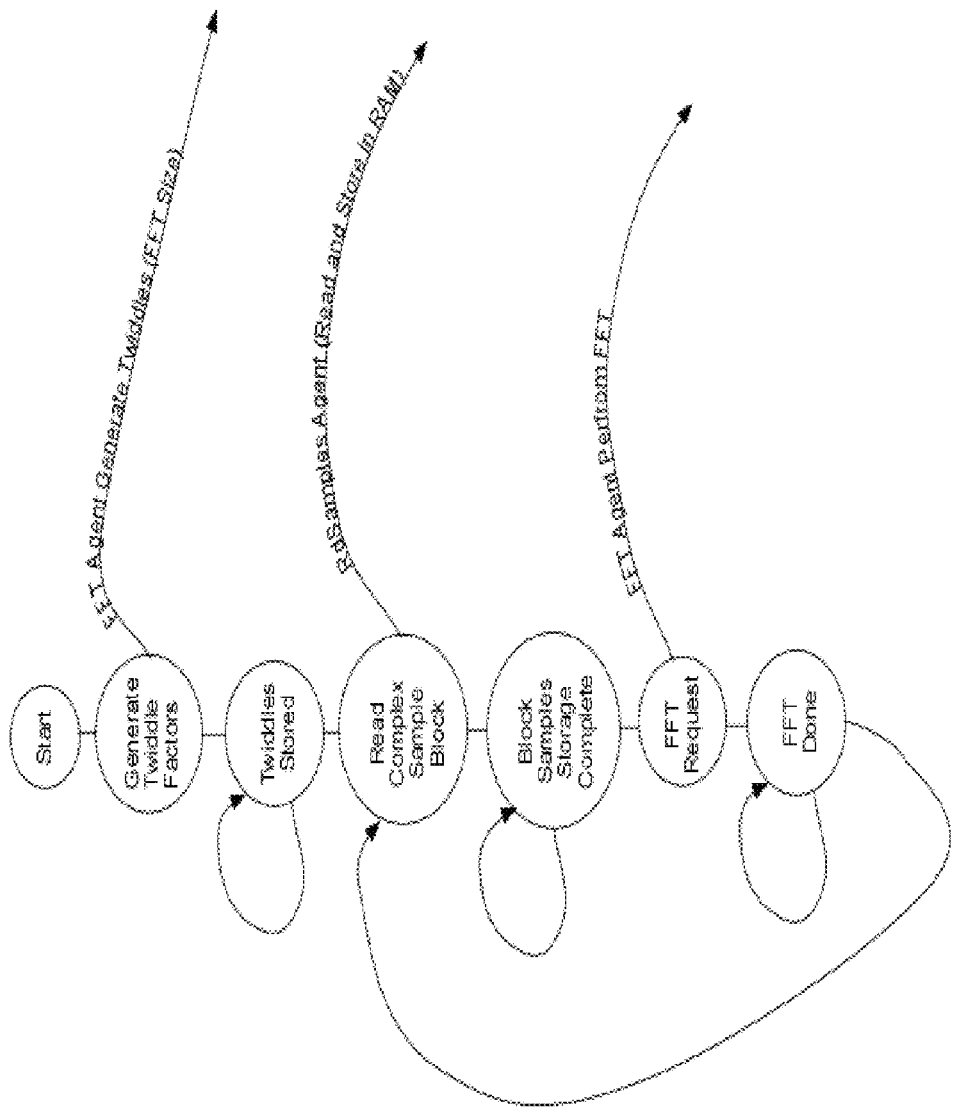
FIG. 15 is a drawing and shows a Control Agent State Diagram (Simplified).

The NOC Architecture is shown in FIG. 14 and is a 8×4 Grid. Note that the agents have been carefully placed on the Grid. The agents that require the minimum hops for the maximum computational efficiency have been placed so that they are neighbors. Thus, the Complex RAM agent (CX_RAM), and the Complex Multiply (cxmpy) are neighbors of the FFT agent. The computation and storage of the twiddle factors is not time critical and can be done at setup. The reading of samples into the Complex RAM by the sample read agent (rdsamples), is pipelined and only involves a fixed latency hit by placing the agent a few hops away from the Complex RAM agent. The master Control agent sends single packets and receives acknowledgments from other agents. The time critical traffic is between the FFT agent and the Complex RAM and Complex Multiply agents. The simplified state diagram of the Control agent is shown in FIG. 15.

8.3.2 FFT Agent State Machine and Transactions with Agents

The FFT agent state machine is divided into two separate state machines. State machine handles the incoming packets with computed results or requests to the FFT agent. The main state machine handles the computation of the radix 2 FFT. The FFT agent interacts with the Rotation CORDIC agent (rotate), the complex multiply agent (cxmpy) and the Complex RAM agent (cx_ram). The FFT agent responds to requests from the Control agent to generate twiddle factors and to start the FFT computation.

The FFT agent exploits the unique capability of the NOC, outlined in previously, to send forward addresses and forward commands to agents so that when the agent completes processing it can send the result back to the agent or to another agent with a command.

Figure 16:
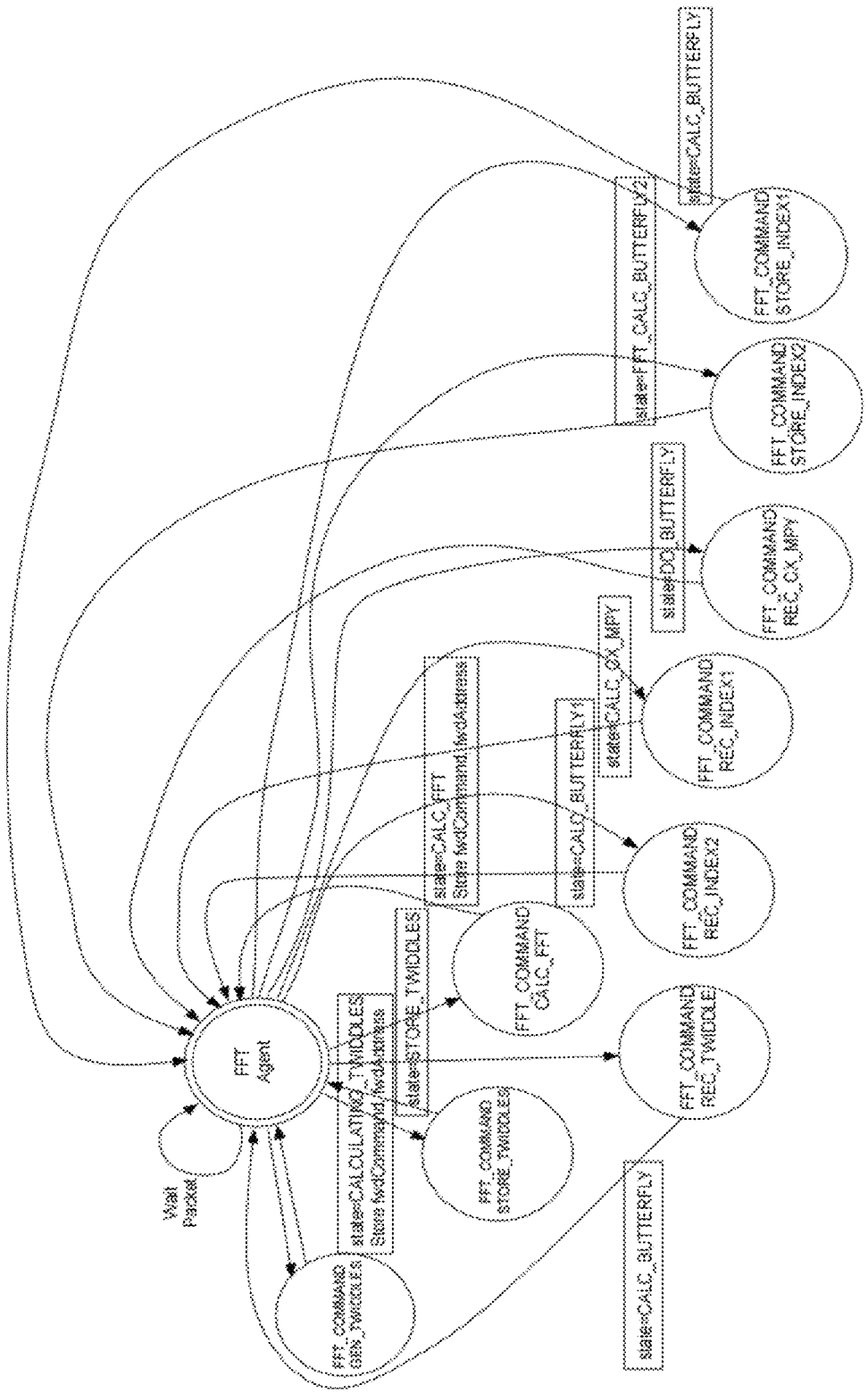
FIG. 16 is a drawing and shows a FFT Agent Receive Packet State Machine.
Figure 17:
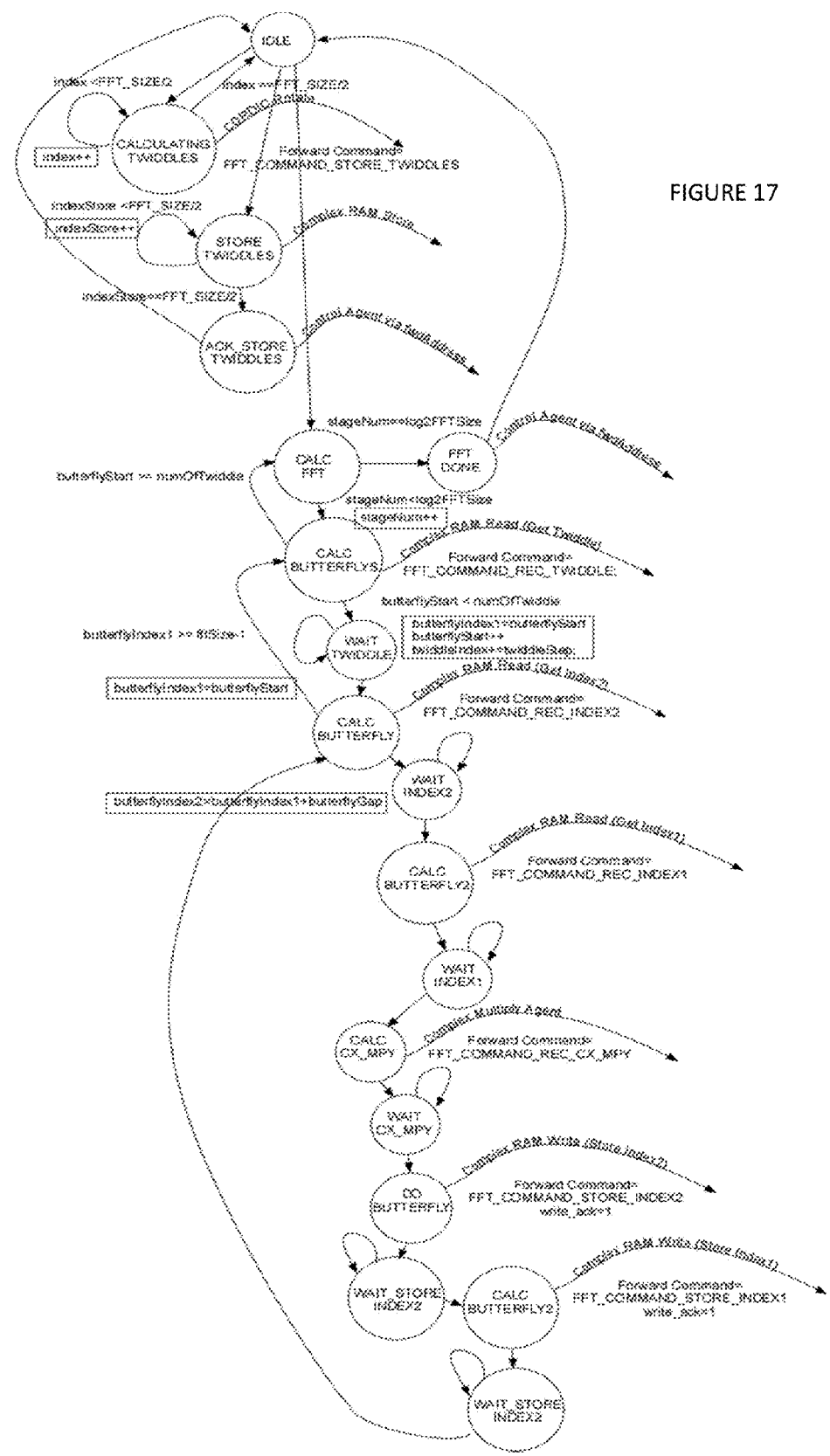
FIG. 17 is a drawing and shows a FFT Agent Receive Packet State Machine.
Figure 18:
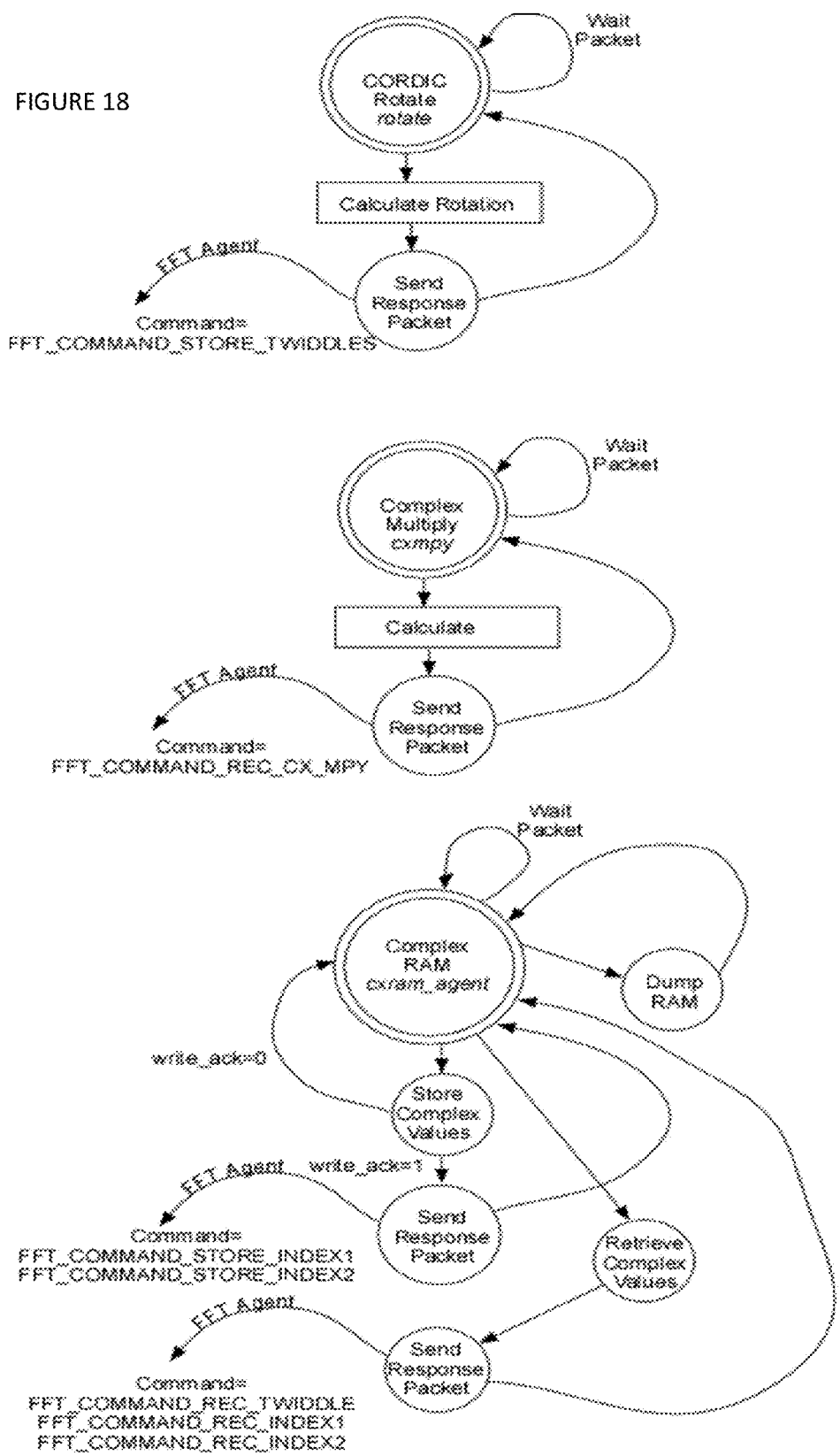
FIG. 18 is a drawing and shows a Agent State Machines.

The state machine for receiving packets is shown in FIG. 16. FIG. 17 shows the state machine for computing the Radix 2 FFT, and FIG. 18 shows the state machines for the rotate, cxmpy and cx_ram agents.

Note that in FIG. 16, after receiving a packet the state may change and the change is indicated by the rectangles. These drive the state machine in FIG. 17 for computing the Radix 2 FFT. Note that the two indexes are kept track of for the butterfly. Two complex samples are retrieved from Complex RAM using the two indexes. We compute the new values (using the complex multiply agent) and store them back in Complex RAM. At each butterfly stage the appropriate twiddle factor is retrieved from Complex RAM. There are log 2 FFTSize stages.

Note that for debugging purposes the Complex RAM agent supports a Dump RAM command. This is issued for example when the Twiddle factors have been stored, the block of samples have been stored, and finally when the FFT computation has been completed. Any agent can request that the Complex RAM dump its contents.

8.4 Verification of the Variable Size FFT on the NOC Architecture with SystemC The verification of the implementation of a reconfigurable variable length FFT on the NOC architecture (FIG. 14) is carried out using cycle accurate SystemC simulations. In fact the FFT agent is implemented in SystemC RTL and can be directly translated to Verilog RTL. First we present the results of a 64 point FFT on the NOC followed by the results of a 256 point FFT. In both cases the Control agent sends an FFT request specifying the FFT Size to the FFT Agent. The agent implements the FFT with the specified size using the agent resources in the network.

8.5 64 Point FFT

Figure 19:
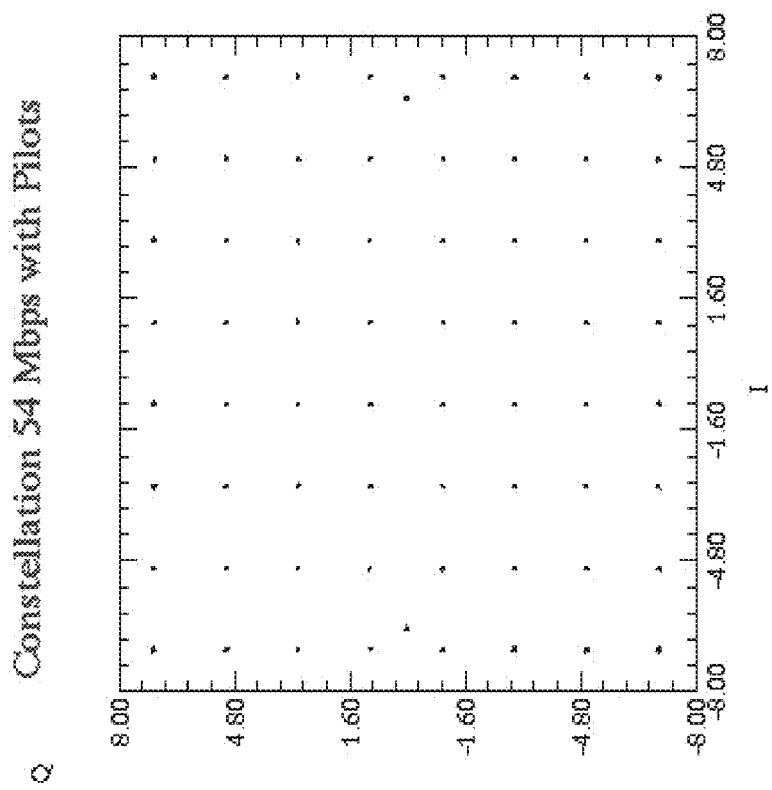
FIG. 19 is a drawing and shows a 7 IEEE 802.11a 54 Mbps Floating Point FFT.
Figure 20:
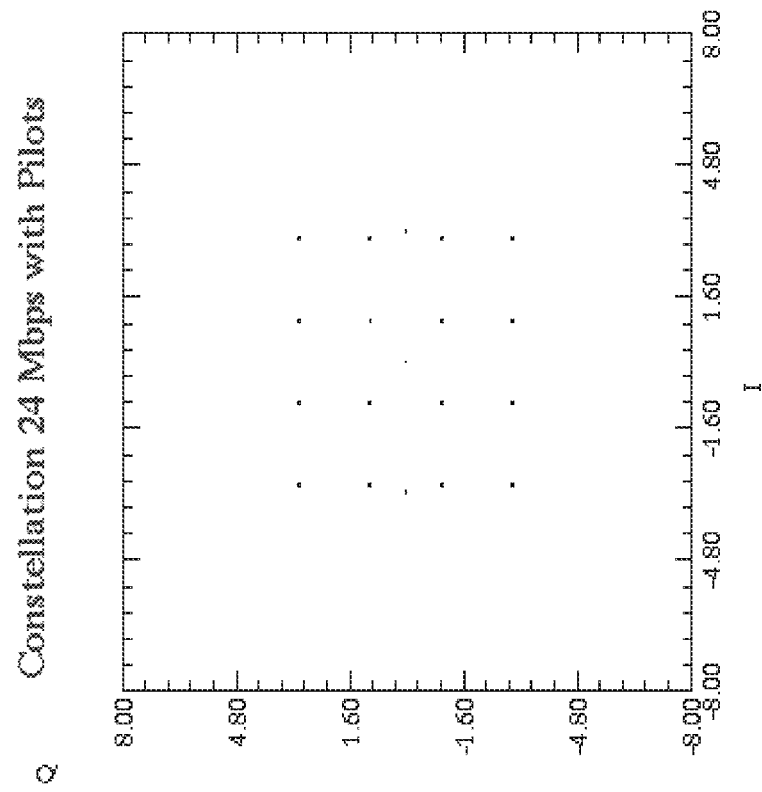
FIG. 20 is a drawing and shows a IEEE 802.11a 24 Mbps Floating Point FFT.

To test the 64 point FFT, time-domain complex samples based on the 54 Mbps and 24 Mbps IEEE 802.11a standard are provided. The constellations based on processing the stimulus using floating point FFTs is shown in FIGS. 19 and 20.

Figure 21:
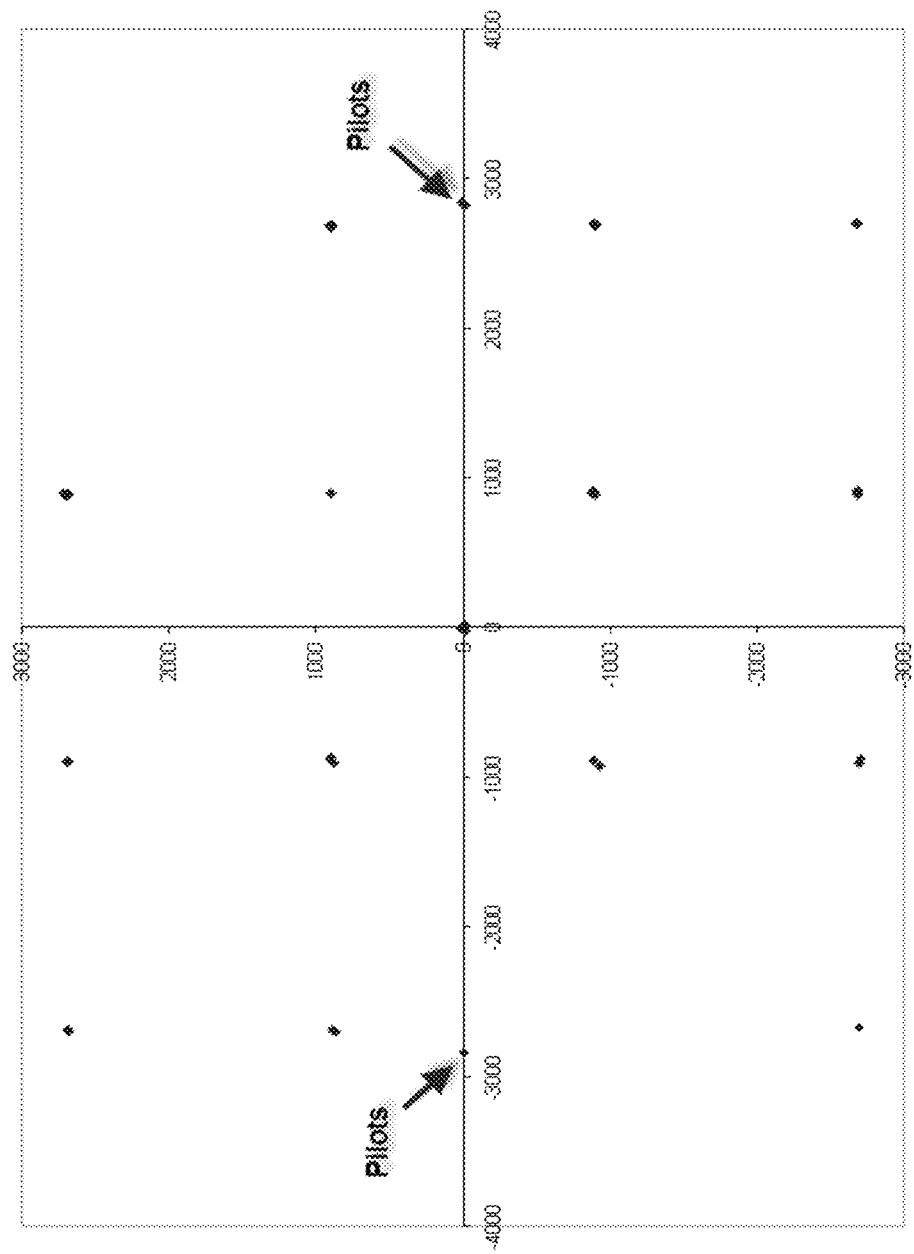
FIG. 21 is a drawing and shows a NOC 64 Point FFT Fixed Point Result.

The results of the Fixed Point Radix 2 FFT of the single block of 64 complex samples at the 54 Mbps rate (64 QAM) implemented on the NOC is shown in FIG. 21.

In FIG. 21 we show the Pilots (BPSK). Also note that compared to FIG. 19, some constellation points are not present. This is because we are showing the FFT result for 64 samples which is one OFDM symbol. The results match the floating point results to a high.

8.5.1 256 Point FFT

Figure 22:
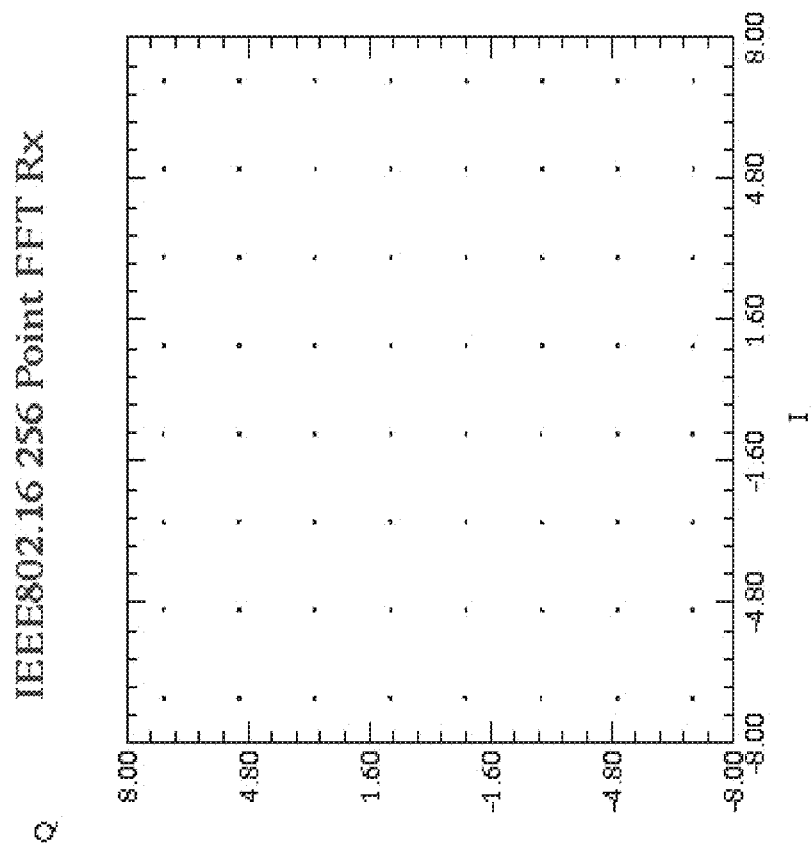
FIG. 22 is a drawing and shows a 10 Floating Point FFT Result on IEEE 802.16d 256 Point FFT Input Stimulus.

The implementation of a 256 point FFT on the same NOC architecture (FIG. 14) was also simulated in SystemC. The only change made was that the Control agent requested a 256 FFT size and the rdsamples agent read in 256 sample block of complex samples. The stimulus was the FFT input for an implementation of the IEEE 802.16d 256 point FFT standard. The results of a 256 point floating point FFT operation on the stimulus is shown in FIG. 22.

Figure 23:
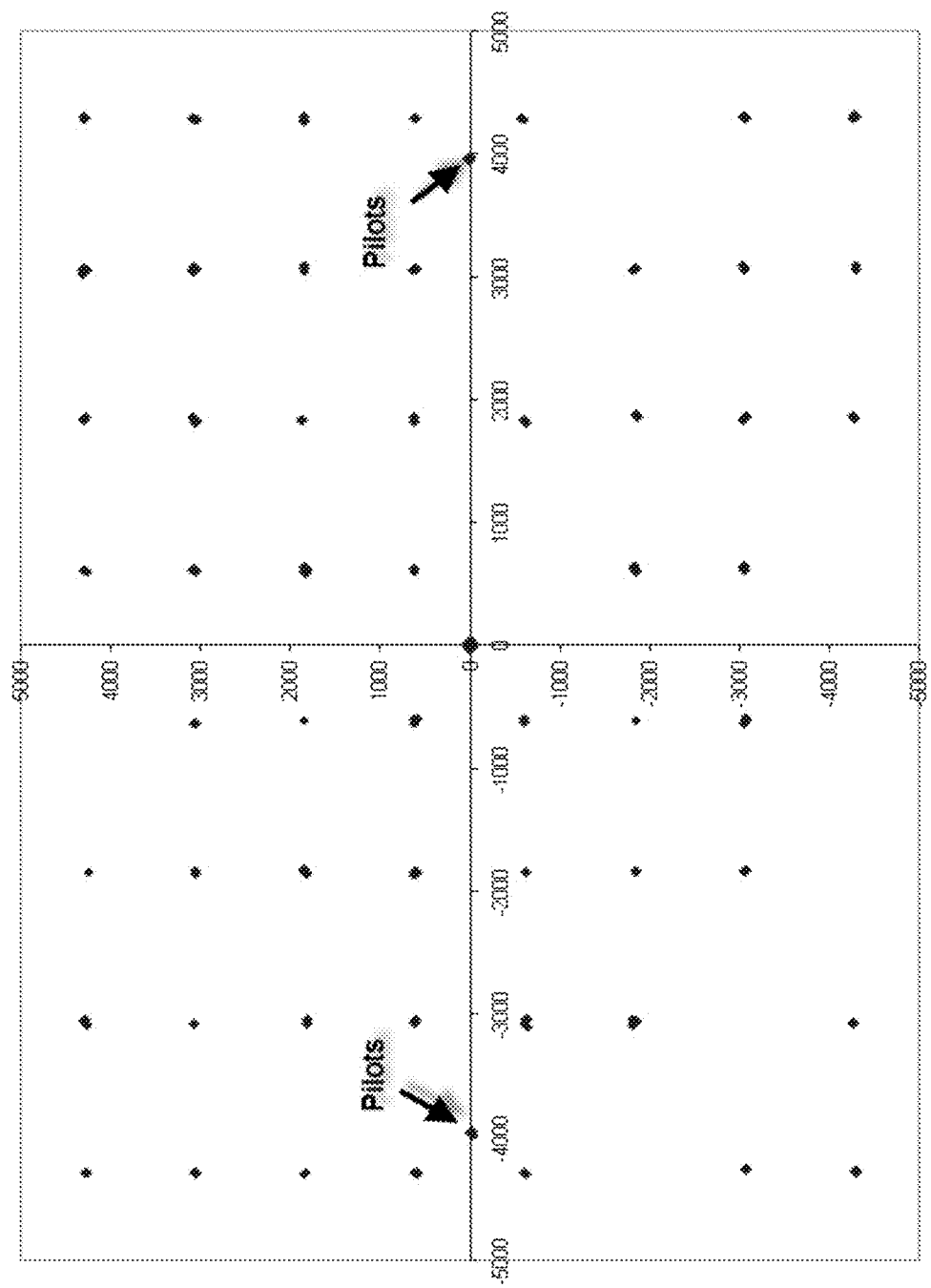
FIG. 23 is a drawing and shows a 11 NOC 256 Point FFT Fixed Point Result.
Figure 24:
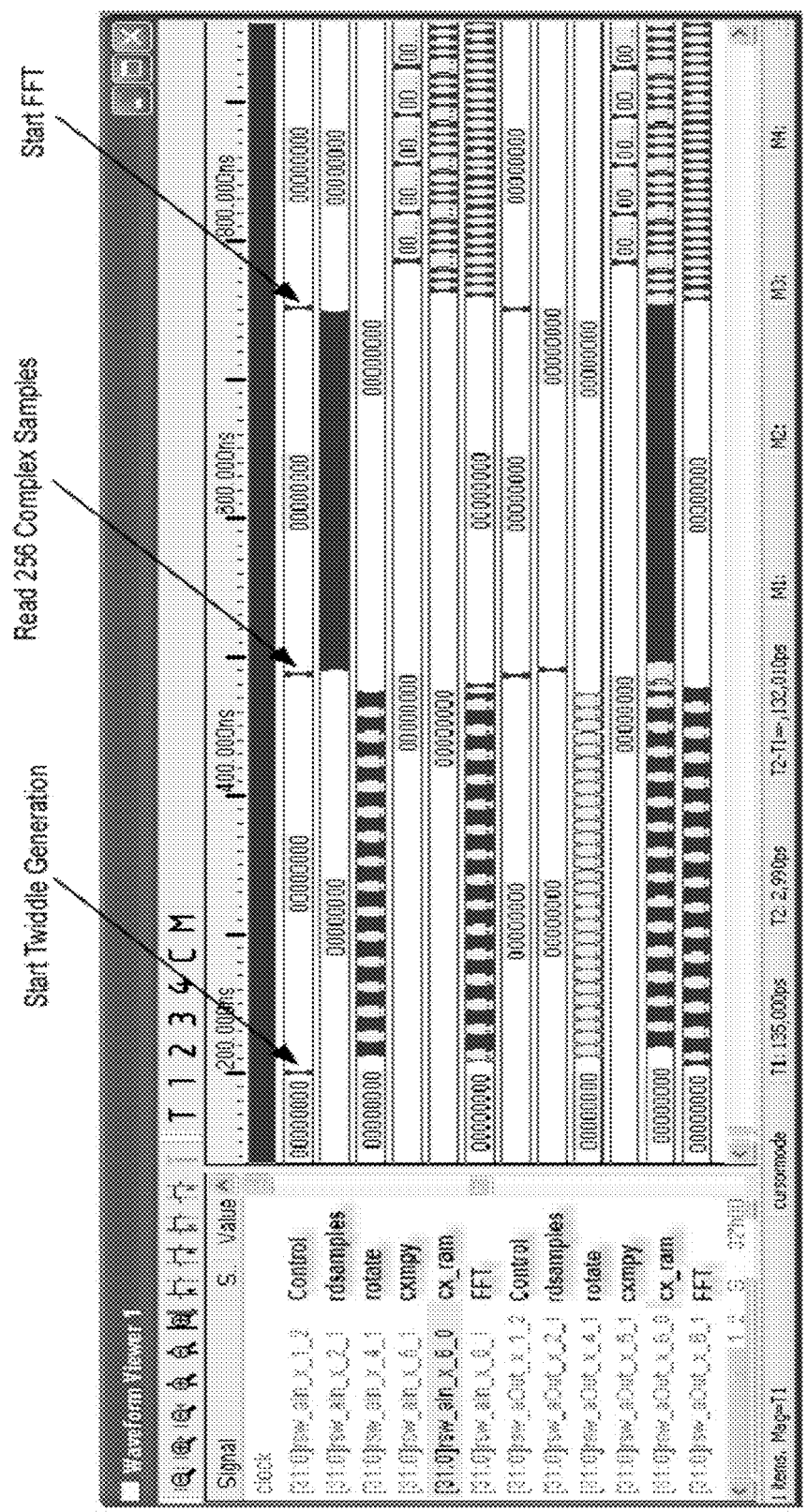
FIG. 24 is a drawing and shows a NOC 256 Point FFT Agent Input and Output Packets.
Figure 25:
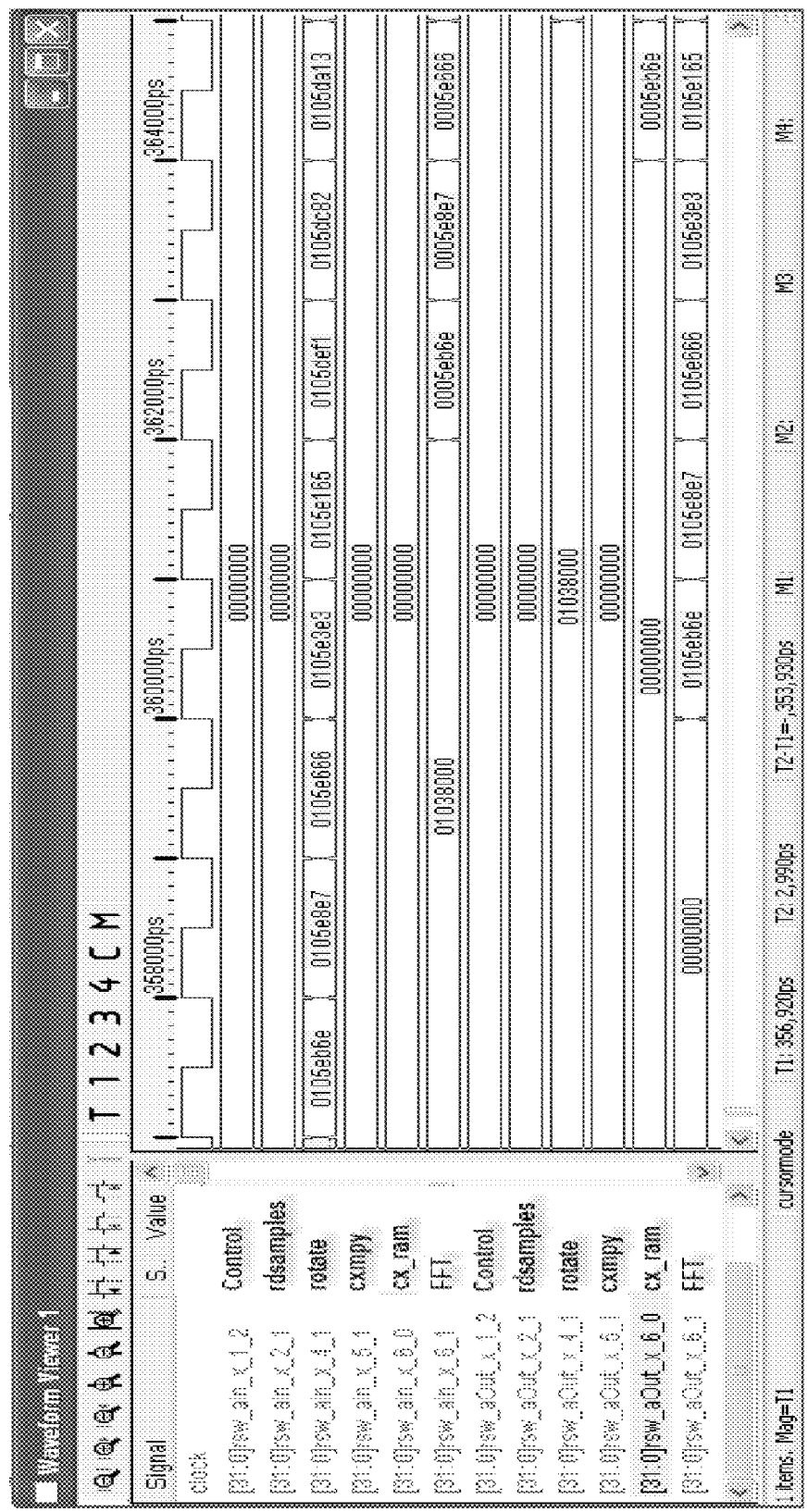
FIG. 25 is a drawing and shows a Twiddle Generation Details, NOC 256 Point FFT Agent Input/Output Packets.

FIG. 23 Shows the results of the Fixed Point FFT implemented on the NOC (FIG. 14) using the cycle accurate SystemC simulation.

In FIG. 23, note that more constellation points appear for 64 QAM since for a 256 sample OFDM symbol, more points are available compared to the 64 point symbol used in IEEE 802.11a (FIG. 21).

8.5.2 Timing Diagrams, SystemC Cycle Accurate Simulation

The timing diagrams for the simulation of the 256 point FFT on the NOC architecture (FIG. 14) are shown below.

By studying the details for each phase we can verify that packets are transported between agents based on the NOC topology in FIG. 14.

Figure 26:
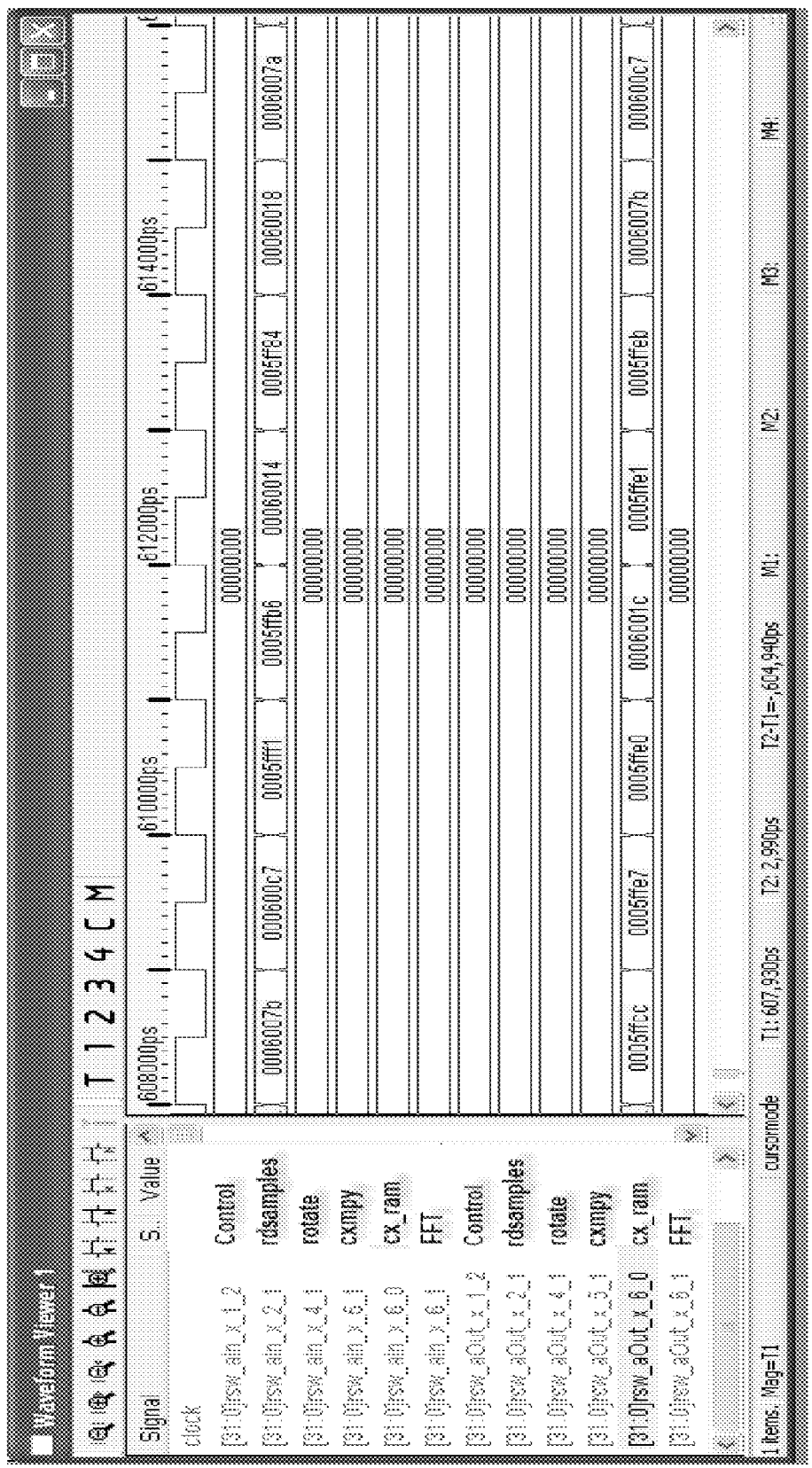
FIG. 26 is a drawing and shows a Block Sample Read Details, NOC 256 Point FFT Agent Input/Output Packets.
Figure 27:
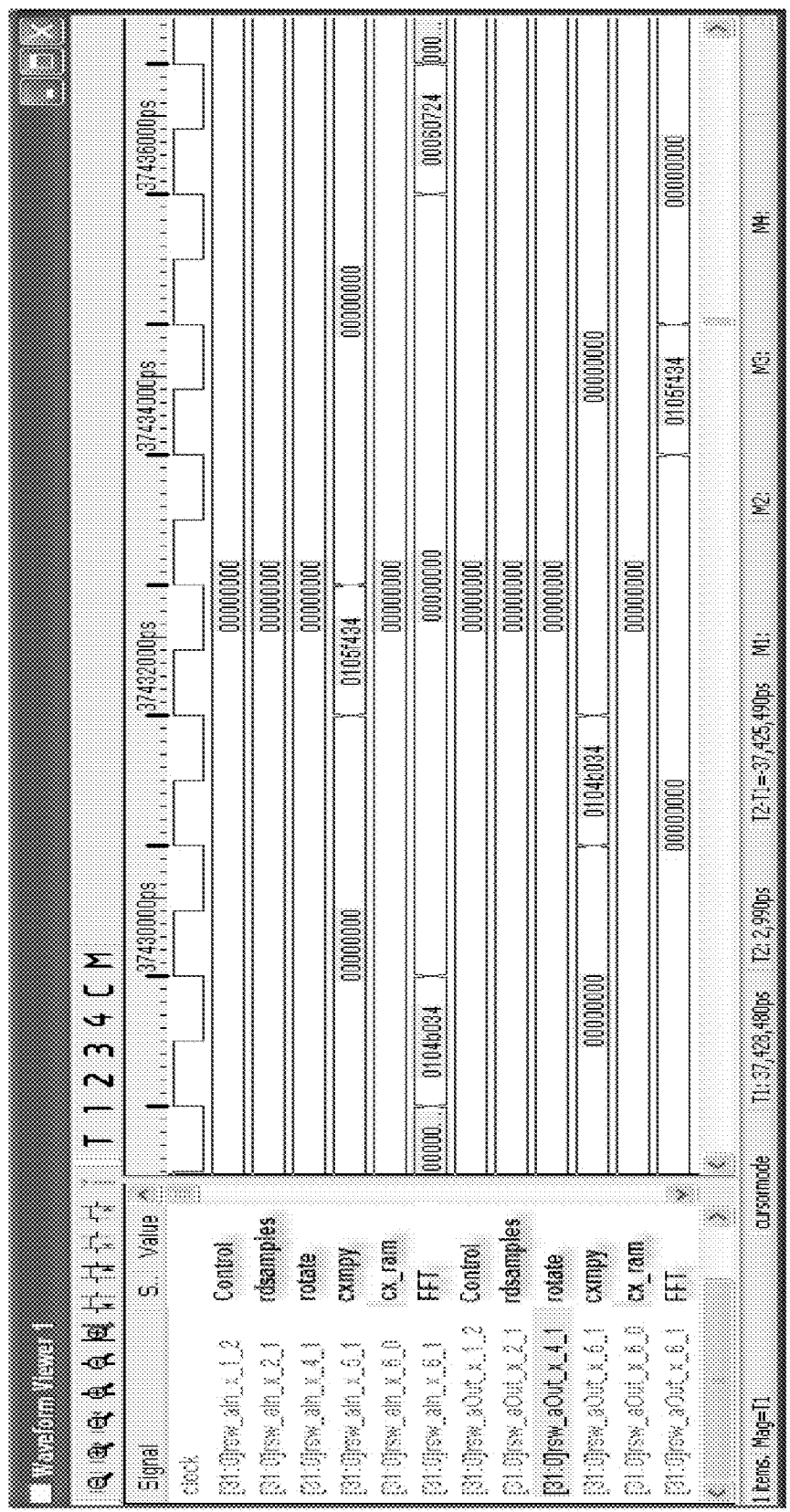
FIG. 27 is a drawing and shows a FFT Computation Details, NOC 256 Point FFT Agent Input/Output Packets.

Also note that in FIG. 26, the pipelined nature of block sample read where there is only a fixed latency in writing to Complex RAM based on the hop distance between the rdsample agent and cx_ram agent.

8.5.3 FFT Optimization

As a first step in verifying the implementation of a reconfigurable variable size FFT we implemented a Radix 2 FFT using only a single Complex Multiply agent and single Complex RAM agent. There are a number of optimizations to substantially reduce the number of cycles required to compute the FFT. Chief among these is to combine the retrieval of the index 1 and index 2 butterfly samples from Complex RAM into a single packet. This can be done since the FFT only requires 10 bit precision per real or imaginary part. The retrieval of the Twiddle can also be piggy backed.

A large FFT can be split into two smaller FFT's (128 point into two 64 point FFT's) that are combined using butterfly operations to form a large FFT. In the NOC this is easily accomplished by partitioning the network into sub regions where traffic does not collide. Also we can explore Radix 4 FFT's on the NOC.

9. MIMO OFDM Modeling and Simulation

The MIMO OFDM Configurations that will be supported by the multi-cluster NoC Reconfigurable Radio are shown in Table 9.1. In the Table, Channel State Information (CSI) is required to be fed back (quantized of course) to the transmitter, for Beamforming systems. In addition to the system shown in Table 9.1, the chip can be Reconfigured to support single carrier modulations schemes for maximum power saving trading off complexity for system clock frequency.

9.1 Block Diagram "C" Modeling and Simulation

In order to verify the performance of the fixed point 2×2 SVD computation mapped to the NoC cluster, a 2×2 Beam Forming MIMO OFDM system was modeled and simulated in "C" using the open source CAPSIM block diagram communication and DSP modeling tool (http://sourceforge.net/projects/capsimtmk/).

Figure 28:
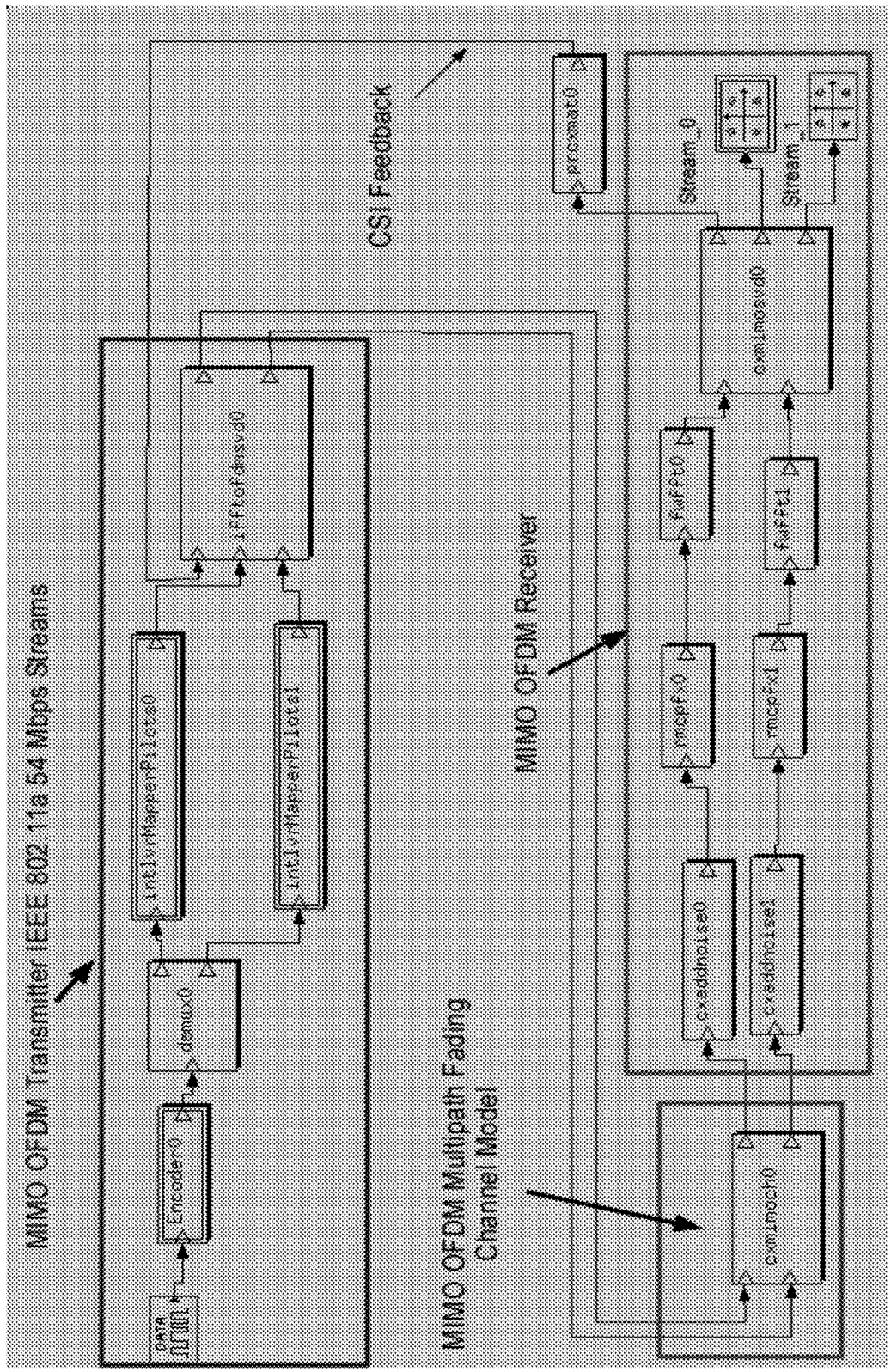
FIG. 28 is a drawing and shows a 2×2 Closed Loop MIMO OFDM Block Diagram.

A 2×2 Closed Loop MIMO OFDM block diagram is shown in FIG. 28.

Figure 29:
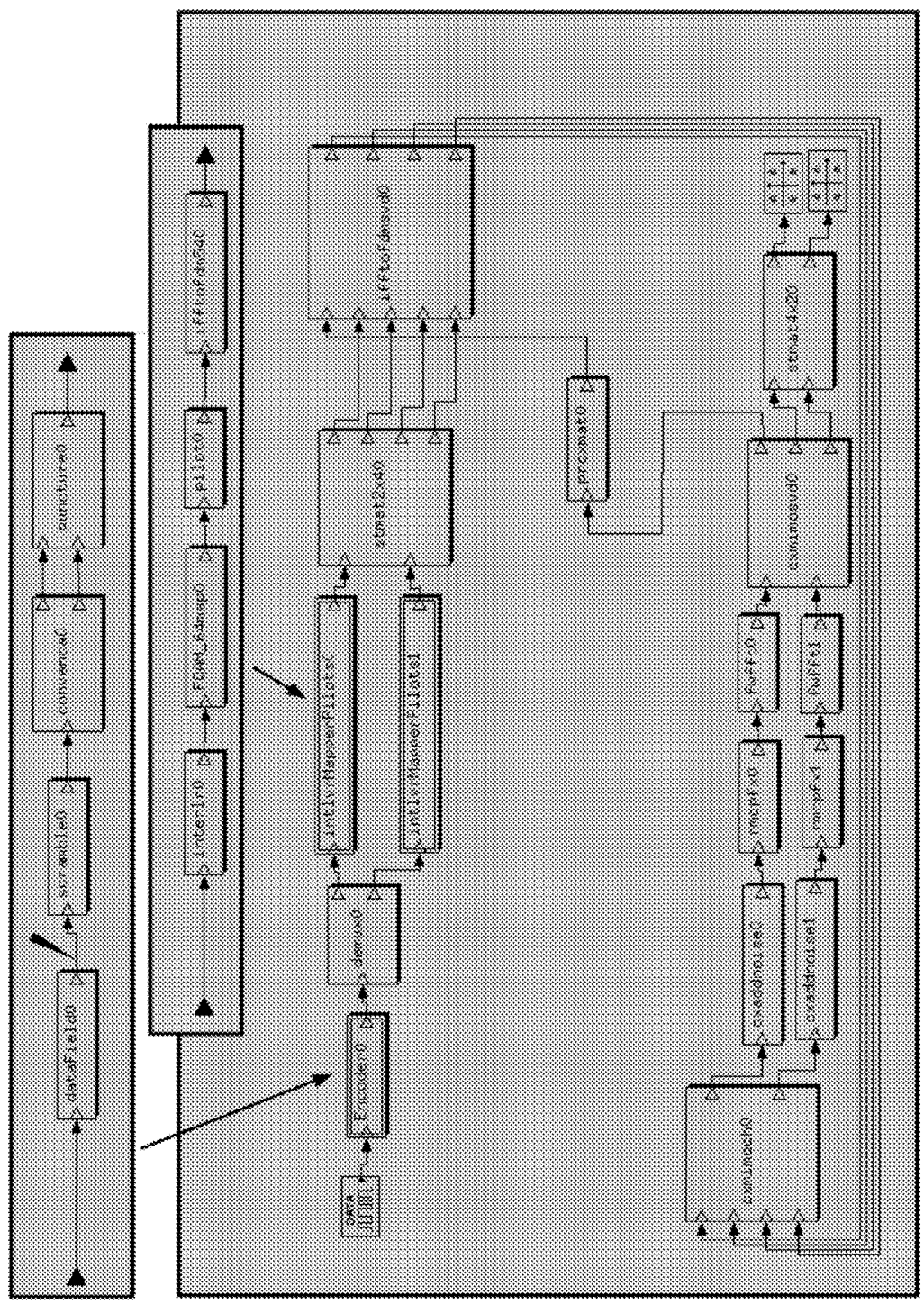
FIG. 29 is a drawing and shows a 4×2 Closed Loop MIMO OFDM Block Diagram.

For comparison the block diagram of a 4×2 Closed Loop MIMO OFDM is shown in FIG. 29. In this case we have 4 transmit chains. Also shown are the hierarchical blocks for the Encoder and the Interleaver, Mapper, Pilot Insertion and inverse FFT at the transmitter. The hierarchical blocks implement the complete IEEE 802.11 54 Mbps OFDM transmitter.

Figure 30:
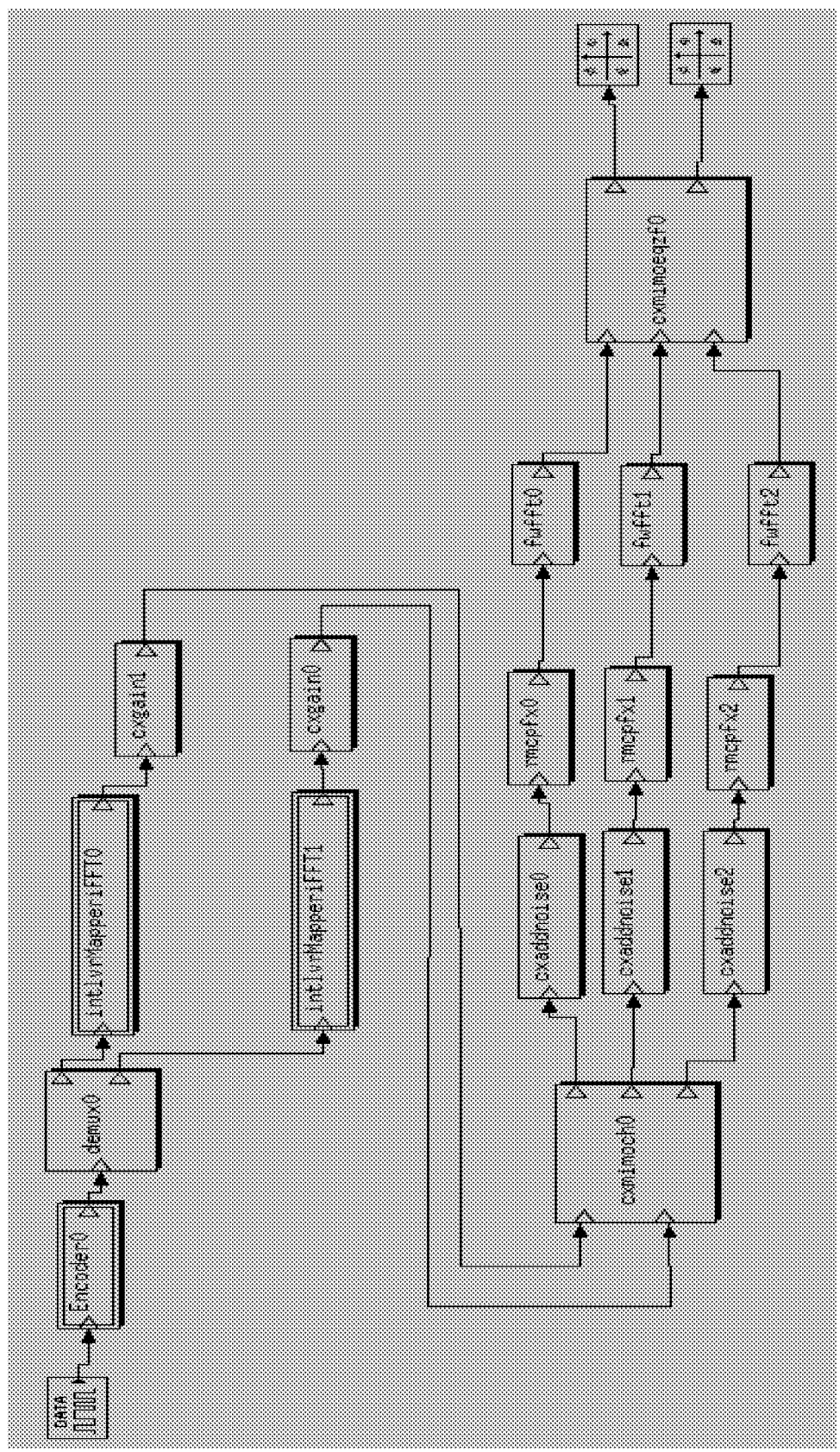
FIG. 30 is a drawing and shows a 2×3 Open Loop MIMO OFDM Block Diagram.

In FIG. 30 the Open Loop 2×3 MIMO OFDM system is shown in which there are three receive chains and no feedback.

The MIMO Channel block models a Rayleigh multipath fading MIMO channel. The parameters are the rms delay spread and the seed to generate unique multipath fading channels. By changing the seed we can model a wide range of good channels and ill-conditioned channels required to evaluate the performance of various MIMO OFDM configurations.

Figure 31:
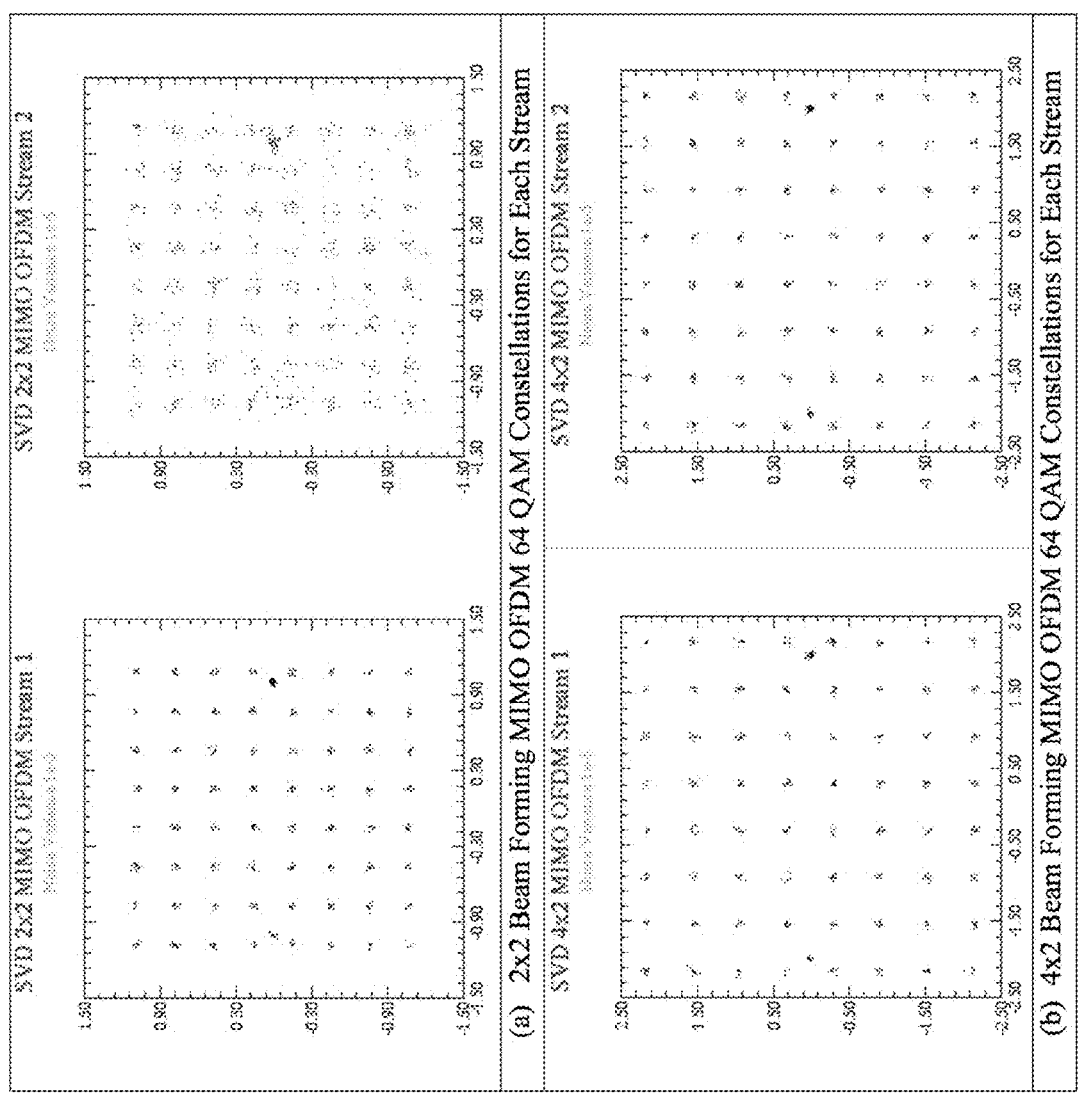
FIG. 31 is a drawing and shows a 2×2 Closed Loop versus 4×2 Closed Loop.

The equalized and separated streams for the 4×2 and 2×2 Beamforming MIMO OFDM are shown in FIG. 31. Clearly the addition of two more transmit antennas using the 4×2 Beamforming system has greatly improved the received constellation.

Figure 32:
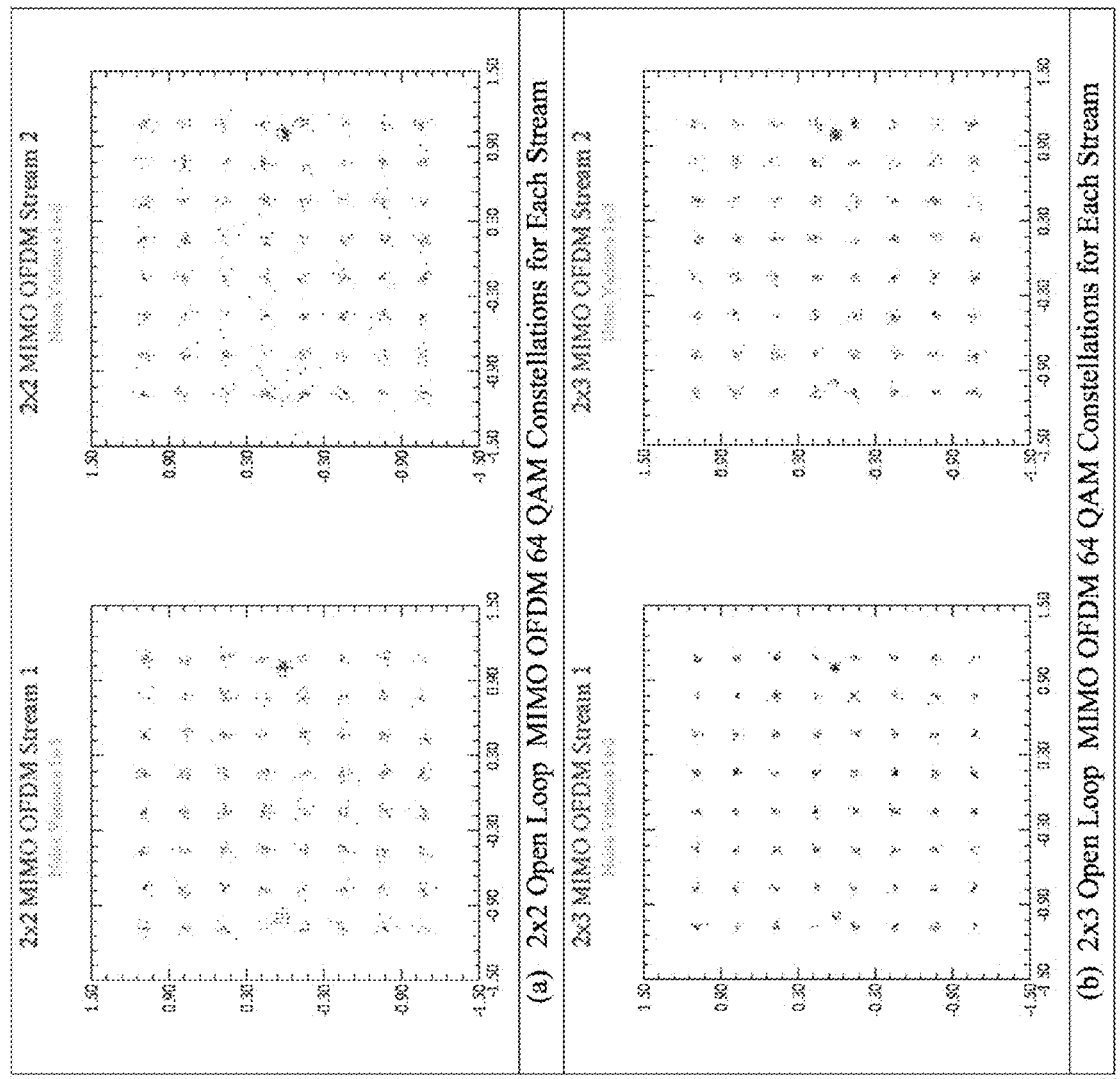
FIG. 32 is a drawing and shows a 2×2 Open Loop versus 2×3 Open Loop.

The results of separating the two streams using open loop MIMO OFDM systems is shown in FIG. 32. Clearly the 2×3 received constellations are dramatically better than the 2×2 open loop stream. That is, by adding an additional receive chain the performance is greatly improved. Note that the 2×2 beam forming system outperforms the 2×2 open loop system. This is important since adding a receive chain costs in terms of additional power. In all the cases shown in FIGS. 31 and 30 the same noise power (1e-5 variance) was added to each receive chain.

TABLE 9.1

MIMO OFDM Configurations

| Configuration | Tx | Rx | CSI | FFTs | SVD | QR | Rate | Application |
|---|---|---|---|---|---|---|---|---|
| 1x1 SISO | 1 | 1 | No | 1 | No | No | 1x | Lowest Data Rate, Lowest Power |
| 1x2 MRC | 1 | 2 | No | 2 | No | No | 1x | Reliable Low Rate. Longer range more power. |
| 2x2 Open Loop | 2 | 2 | No | 2 | 2x2 | No | 2x | Medium Data Rate |
| 2x2 Beam Forming | 2 | 2 | Yes | 2 | 2x2 | No | 2x | Medium Date Rate more reliable then Open Loop |
| 2x3 Open Loop | 2 | 3 | No | 3 | 2x2 | Yes | 2x | Reliable Medium Data Rate |
| 4x2 Beam Forming | 4 | 2 | Yes | 2 | 2x2 | No | 2x | High Down link Data Rate, Reliable Up-link, Low Power Video |
| 3x4 Open Loop | 3 | 4 | No | 4 | 3x3 | Yes | 3x | High Data Rate |
| 4x4 Beam Forming | 4 | 4 | Yes | 4 | 4x4 | No | 4x | Very High Data Rate |
| 1x4 Beam Forming | 1 | 4 | Yes | 4 | 4x4 | No | 1x | Very Long Range |

Notes:
SISO Single Input Single Output, MRC Maximal Ratio Combining.

9.2 Comparison of the CORDIC Based Fixed Point Beamforming with Floating Point Beamformimg MIMO OFDM The 2×2 SVD (Beamforming) MIMO OFDM System is implemented using the Fixed Point CORDIC based 2×2 SVD kernel. In this section, the fixed point SVD implementation is compared with the floating point SVD based on the LAPACK library. In the simulations the 2×2 Beamforming MIMO OFDM system shown in FIG. 28 (using Capsim and IEEE 802.11 54 Mbps streams) is used where the receiver is either based on the floating point LAPACK library, or the fixed point CORDIC based SVD. This comparison is key to exploring the degradation introduced by the fixed point implementation of the 2×2 SVD and to demonstrate that the fixed point 2×2 SVD performs well over a wide range of MIMO channels.

Figure 33:
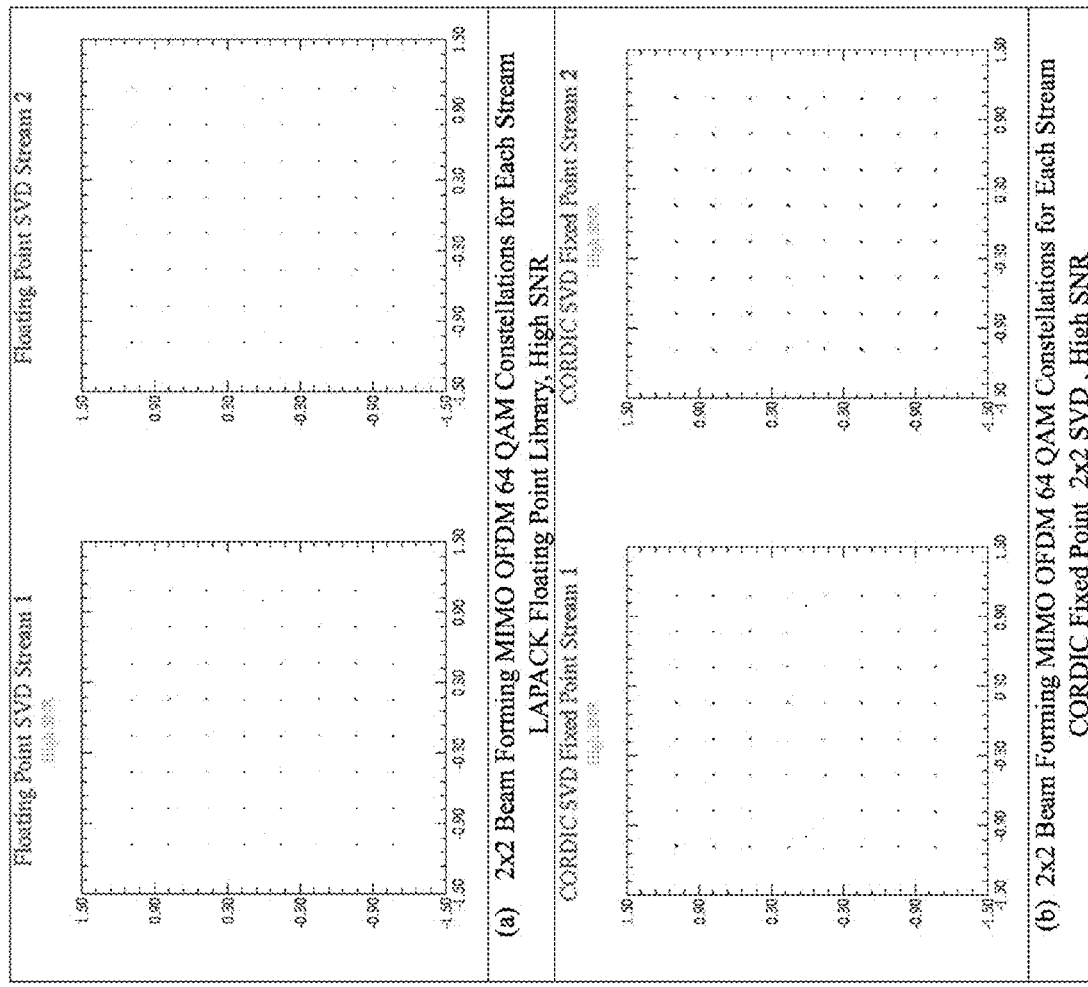
FIG. 33 is a drawing and shows a Floating Point versus Fixed Point 2×2 Closed Loop MIMO OFDM High SNR.

As show in FIG. 33, the fixed point CORDIC based 2×2 SVD MIMO OFDM system performs nicely compared to the floating point LAPACK based 2×2 SVD. The slight apparent degradation is due to finite precision in the fixed point CORDIC 2×2 SVD implementation.

Figure 34:
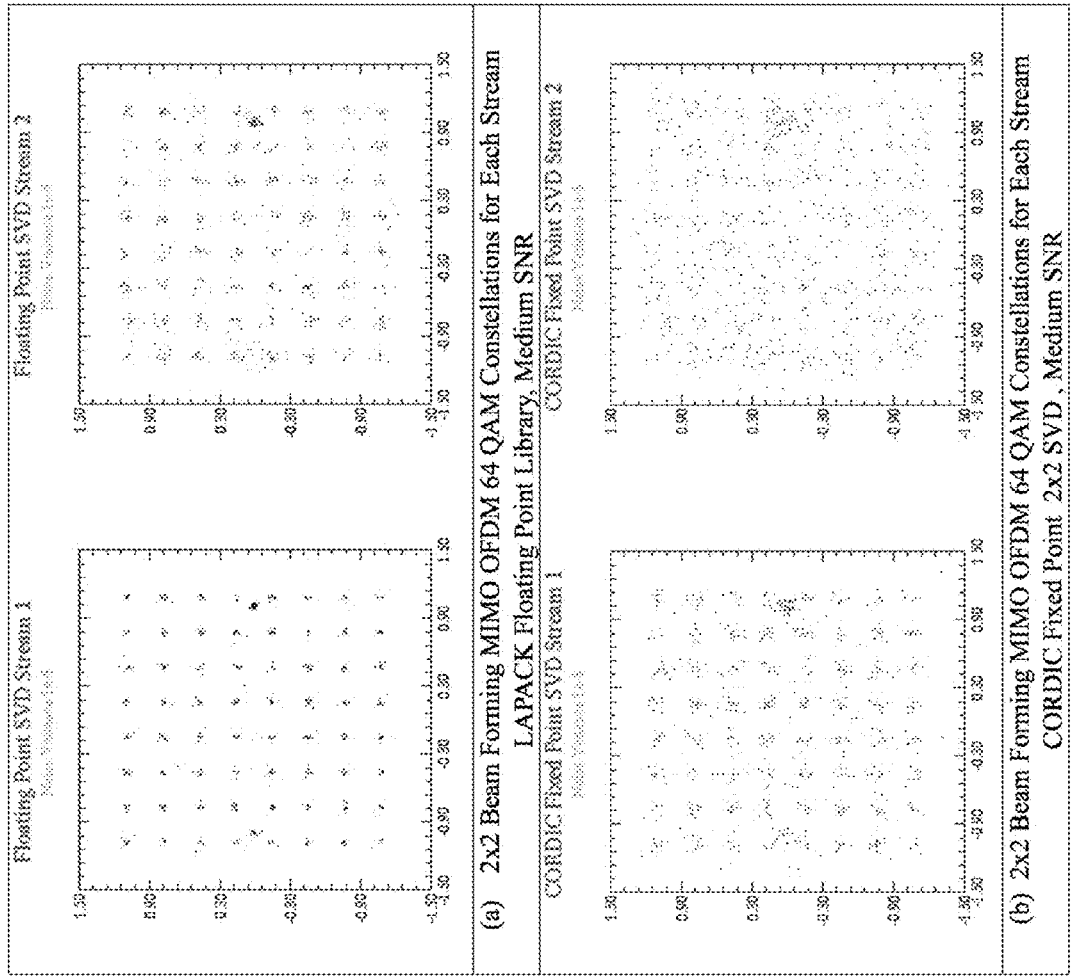
FIG. 34 is a drawing and shows a Floating Point versus Fixed Point 2×2 Closed Loop MIMO OFDM Medium SNR.

A key comparison is the case where channel noise is added. In this case, we expect that the finite precision fixed point CORDIC SVD will enhance noise and degrade performance compared to the floating point LAPACK implementation. This is shown in FIG. 34 where noise variance of 1e-5 was added to each receive chain.

Figure 35:
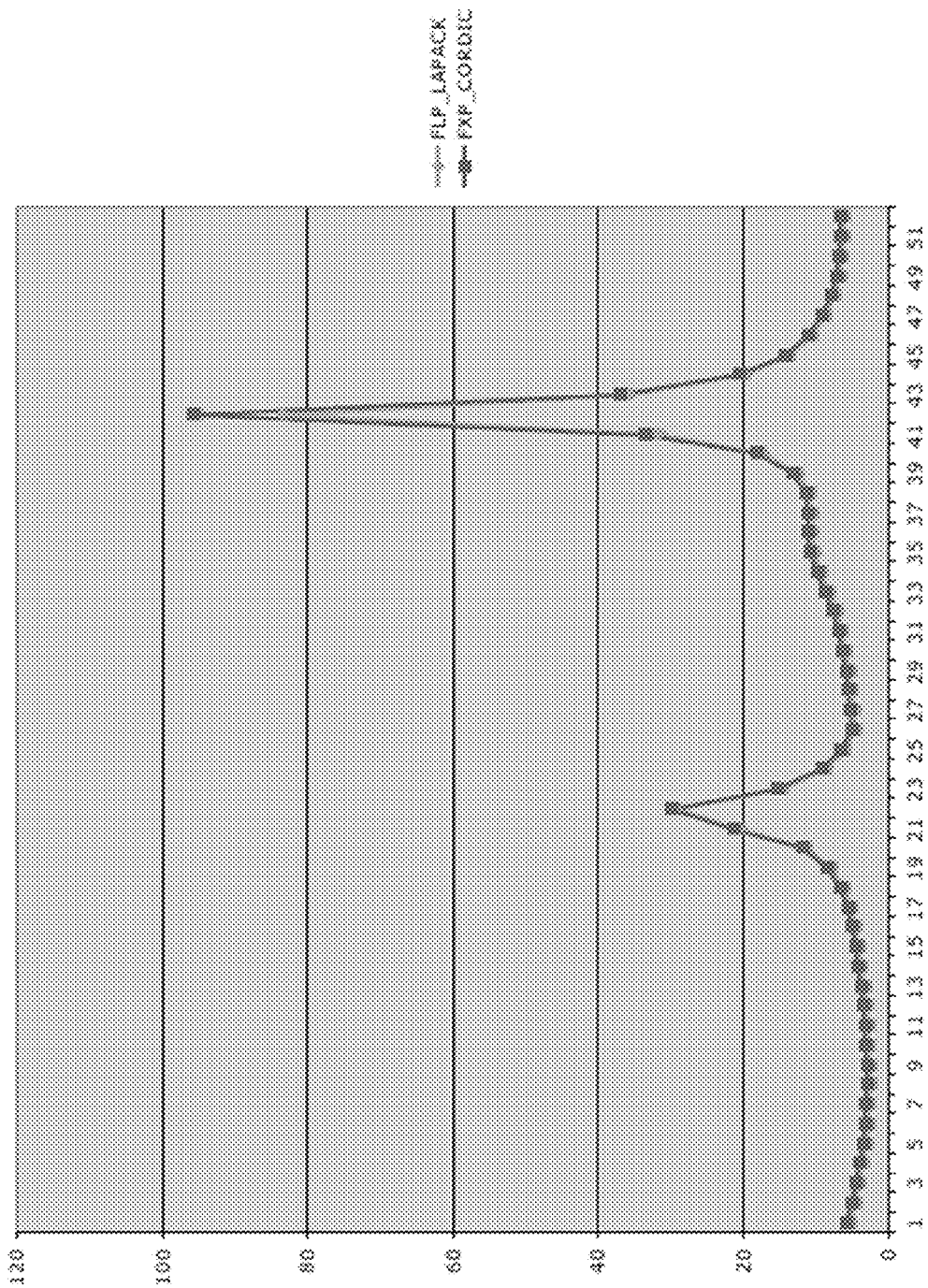
FIG. 35 is a drawing and shows a Singular Value Ratio: Floating Point versus Fixed Point 2×2 Closed Loop.

To show that the fixed point CORDIC 2×2 SVD tracks the floating point SVD in a 2×2 MIMO OFDM system we show the plot of the ratio of Singular Values for various carriers (52 for IEEE 802.11a streams) in FIG. 35 with additive noise. (variance 1e-5). Note that the ratios track very well over the 52 carriers. The deviation is at the high Singular Value Ratio which corresponds to an ill conditioned channel at that carrier frequency. The enhancement of roundoff noise is caused at this point and other ill conditioned channel conditions.

The overall conclusion is that, for a full simulation of a 2×2 Beamforming MIMO OFDM system, the 2×2 fixed point CORDIC based computation of the SVD performs well compared to the floating point simulation. Since the fixed point CORDIC SVD has been successfully mapped to the NoC cluster and it has been simulated at the RTL level with SystemC, there is a solid foundation to proceed forward with this approach. Also the fixed point CORDIC SVD MIMO OFDM simulation environment with MIMO Rayleigh fading channel modeling and IEEE 802.11a streams, is the foundation for the verification of the RTL and Gatelevel netlist of the NoC MIMO OFDM cluster.

10. Singular Value Decomposition of General Complex 2×2 Matrix on NOC Architecture

10.1 Introduction

In this section, there is described the mapping of the computation of the Singular Value Decomposition (SVD) of a general 2×2 complex matrix to the NOC architecture using only CORDIC Rotate, CORDIC ArcTan/Modulus and Multiply primitives.

10.2 State Diagram for NoC SVD Agent

The state machine for the implementation of the 2×2 general Complex Matrix SVD on the NOC architecture has been developed and is shown in FIGS. 53-57. The primitives used are the Rotation CORDIC, the Arc Tangent/Modulus CORDIC, Complex Multiply and Real Multiply agents. We also used the 2×2 complex matrix multiply agent developed in this project.

The SVD computation using these primitives is very robust and is all performed using Fixed Point Arithmetic. There is no division operation involved. The detailed algorithm is described in [Hemkumar, 94]. Appendix I presents the algorithm for computing the fixed point 2×2 SVD using CORDIC and Real and Complex multiplications. The presentation in Appendix I has been developed by the author based on the work in [Hemkumar, 94].

10.3 Implementation of the Fixed Point CORDIC 2×2 SVD on the NoC

Figure 36:
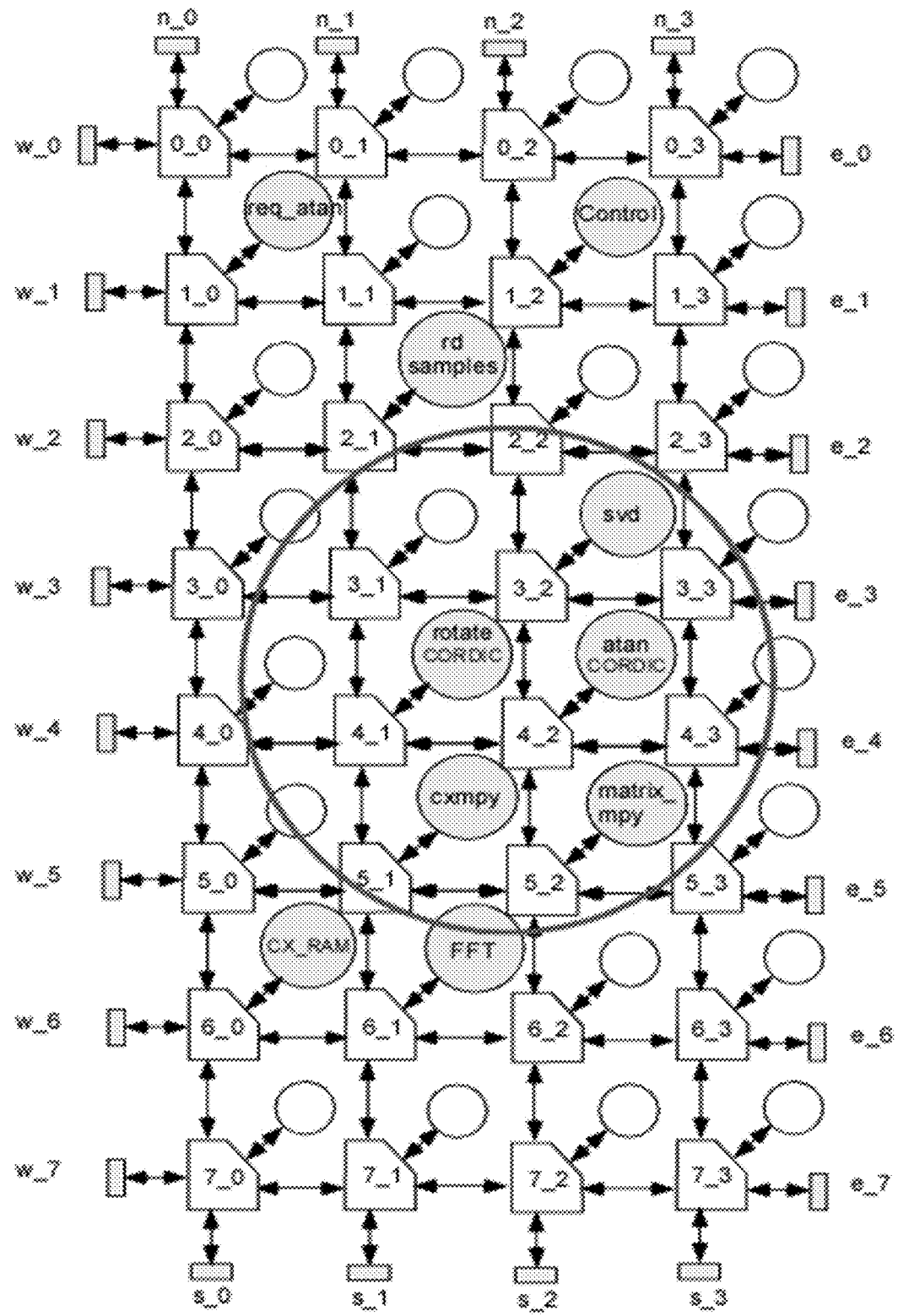
FIG. 36 is a drawing and shows a NoC for 2×2 SVD.
Figure 37:
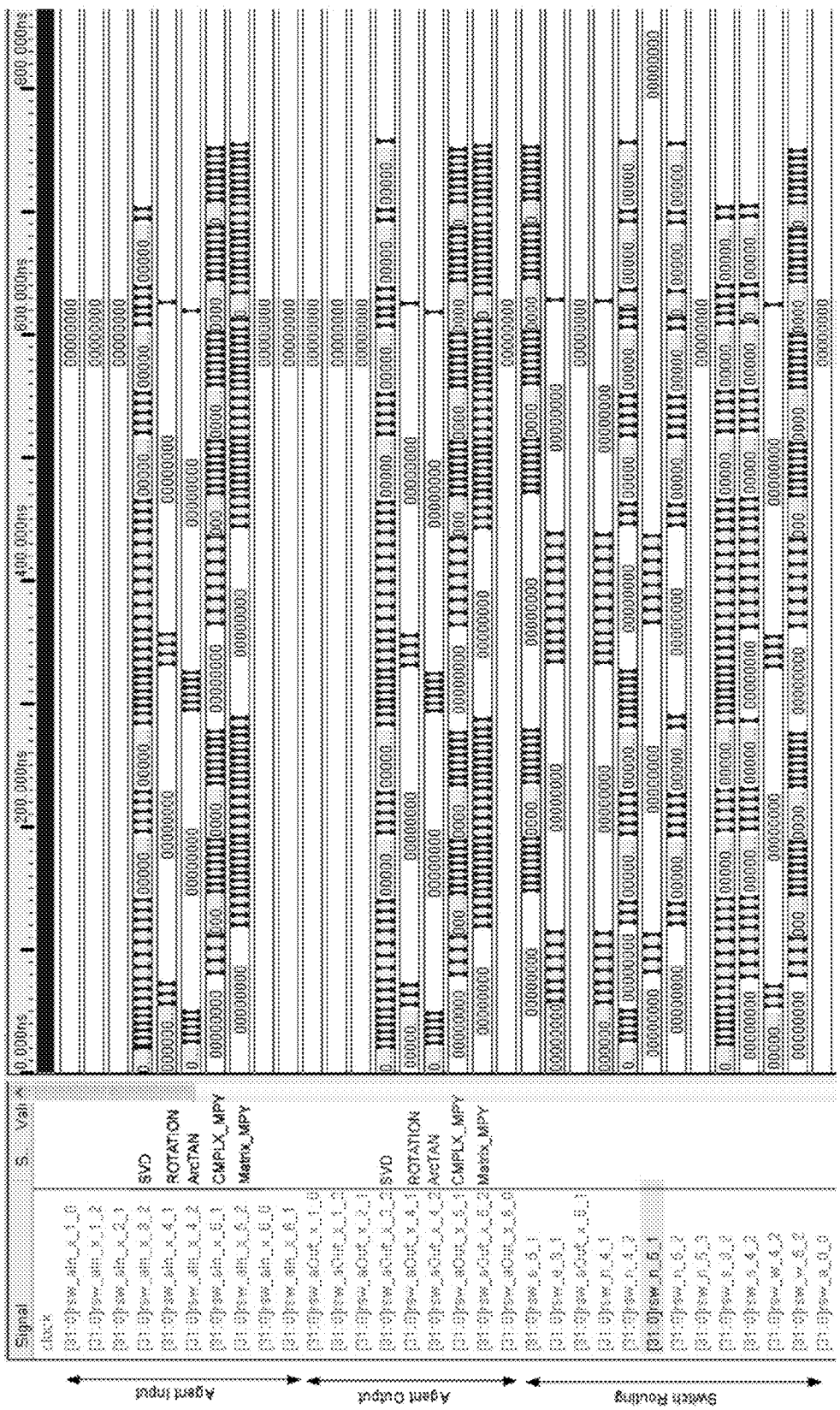
FIG. 37 is a drawing and shows a NoC Based SystemC Complex 2×2 SVD Computation Timing Diagram.

In this section we show the agents involved in the computation of the 2×2 SVD in the NoC shown in FIG. 36. The key agent is the SVD agent which implements the state machine and sends packets to the Rotation CORDIC, the ArcTan CORDIC primitive agents and to the Matrix Multiply agent. The Matrix Multiply agent in turn sends packets to the Complex Multiply primitive agent. The timing diagram of the SystemC RTL simulation (bit exact and cycle accurate) for the computation of a 2×2 SVD is shown in FIG. 37. The RTL level simulation in SystemC is a direct recipe for the Verilog RTL implementation of the SVD agent.

11. NoC Primitive Agent Requirements and Design

In this section the packet organization for primitive agents is provided. The table below is a list of primitive agents.

TABLE 11.1

Primitive Agents

| Item | Agent | Description |
|---|---|---|
| 1 | Rotation CORDIC | Rotates vector with (X,Y) coordinates by specified angle |
| 2 | ArcTan CORDIC | Given a vector with (X, Y) coordinates, compute arc tangent and modulus. |
| 3 | Complex Multiply | For a specified command compute either the full precision result of the complex multiplication of two complex numbers, or perform three parallel real multiplies. |
| 4 | Reciprocal | Calculate the Reciprocal of a scalar |

11.1 Rotation CORDIC Agent

Figure 38:
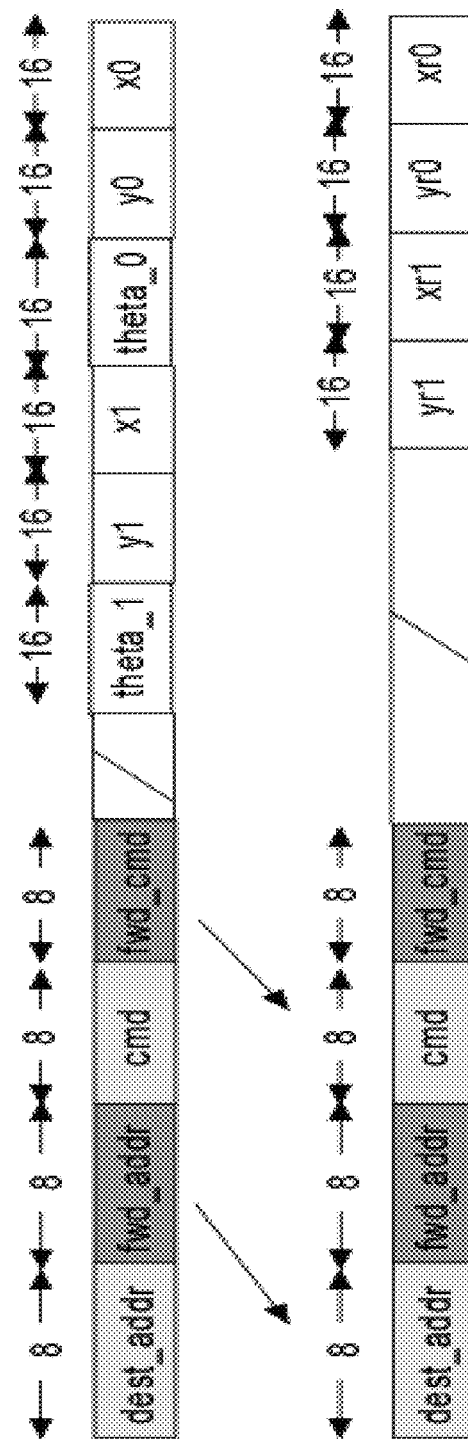
FIG. 38 is a drawing and shows a Packet Field Organization Rotation CORDIC.
Figure 39:
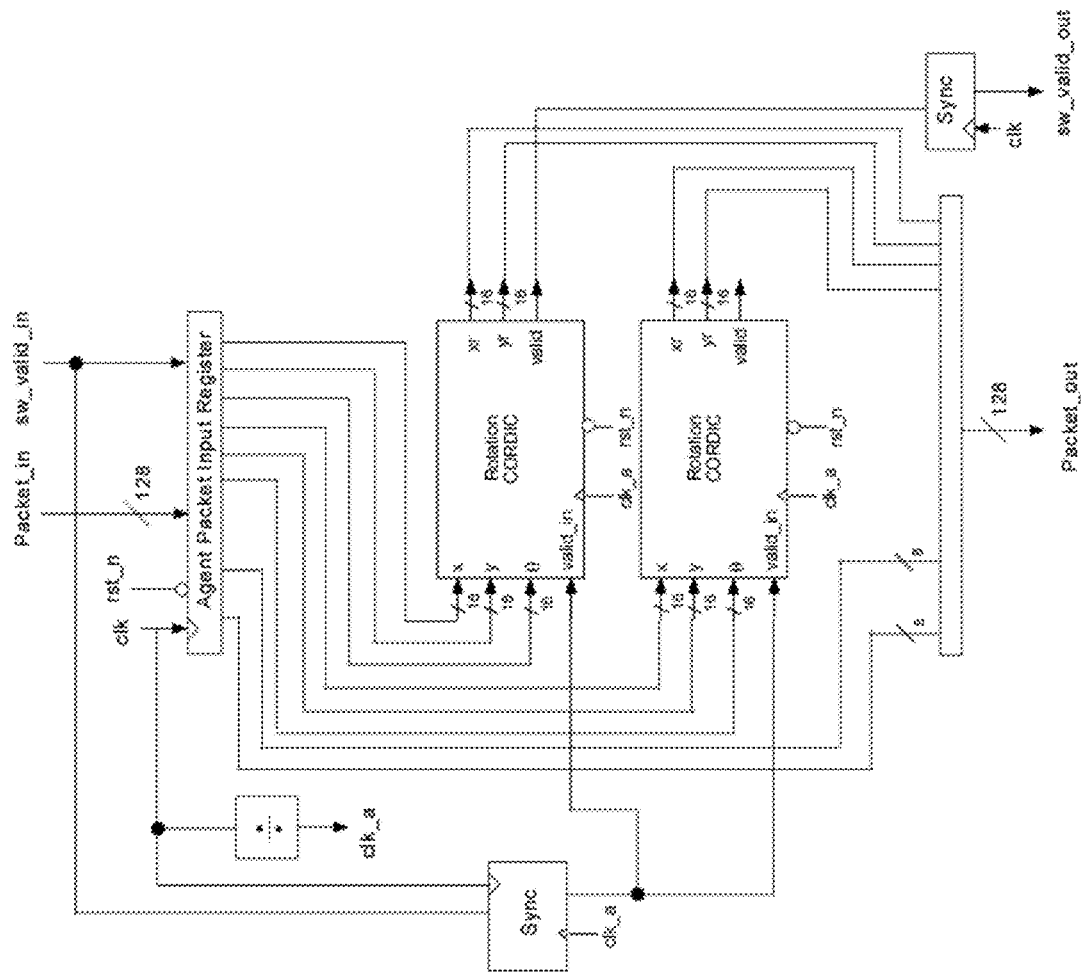
FIG. 39 is a drawing and shows a Rotation CORDIC.

The packet format for the computation of a set of two rotations using CORDIC is shown in FIG. 38. By combining two CORDIC Rotation blocks in a single agent we are able to reduce the communication overhead (hops) through the switch by computing two CORDIC rotations in parallel. For example, the computation of the SVD using CORDIC contains a number of rotations that can be computed in parallel. This is also true of Givens rotations for QR factorization. In carrier offset correction, two receive chains can be processed by a single Rotation agent. The architecture of the CORDIC Rotation agent is shown in FIG. 39.

11.2 ArcTan CORDIC Agent

Figure 40:
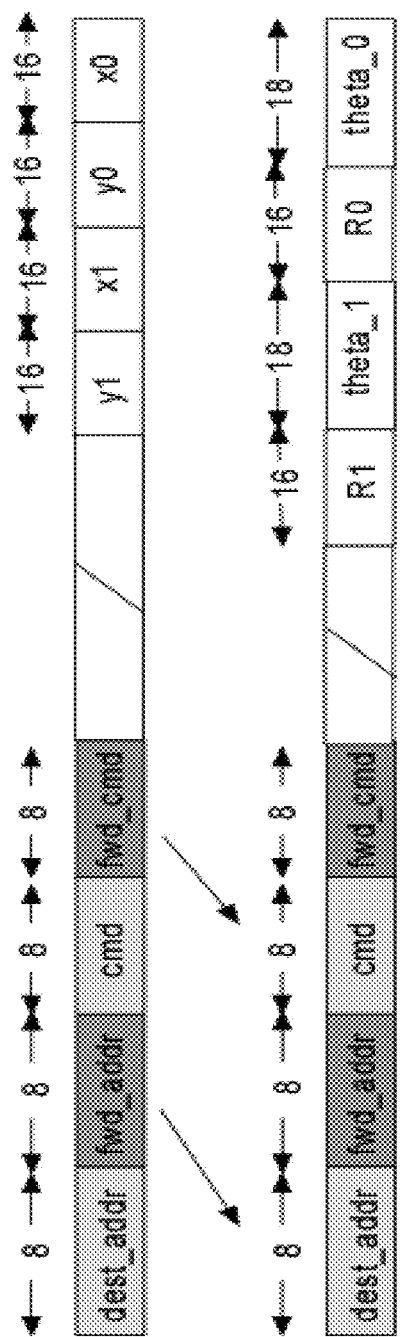
FIG. 40 is a drawing and shows a Packet Field Organization ArcTan CORDIC Agent.
Figure 41:
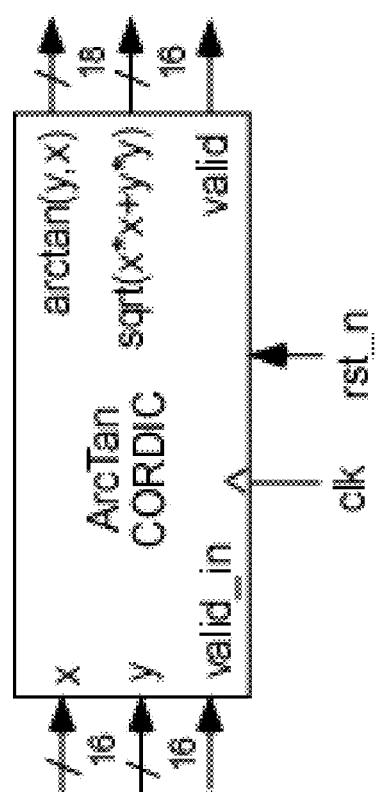
FIG. 41 is a drawing and shows a ArcTan CORDIC Module.

The packet organization for the computation of the ArcTan CORDIC is shown in FIG. 40. Two ArcTan CORDIC operations are carried out in parallel by a single agent. Also shown in FIG. 41 is the ArcTan CORDIC module.

11.3 Reciprocal Agent

The Reciprocal Agent will be implemented using the Newton-Raphson Method for reciprocal approximation {Erc., 2004]. The agent will compute two reciprocals in parallel to speed up operations. For example two singular values need to be inverted per carrier. Also in Zero Forcing equalization, two channel estimates can be inverted with one packet transmission through the network.

11.4 Complex Multiply Agent

The complex multiply operation is accomplished using 3 real multiplications. The basic equation is:

$$x*y = (xr*(yr-yi) + (xr-xi)*yi) + j(xi*(yr+yi) + (xr-xi)*yi)$$

Figure 42:
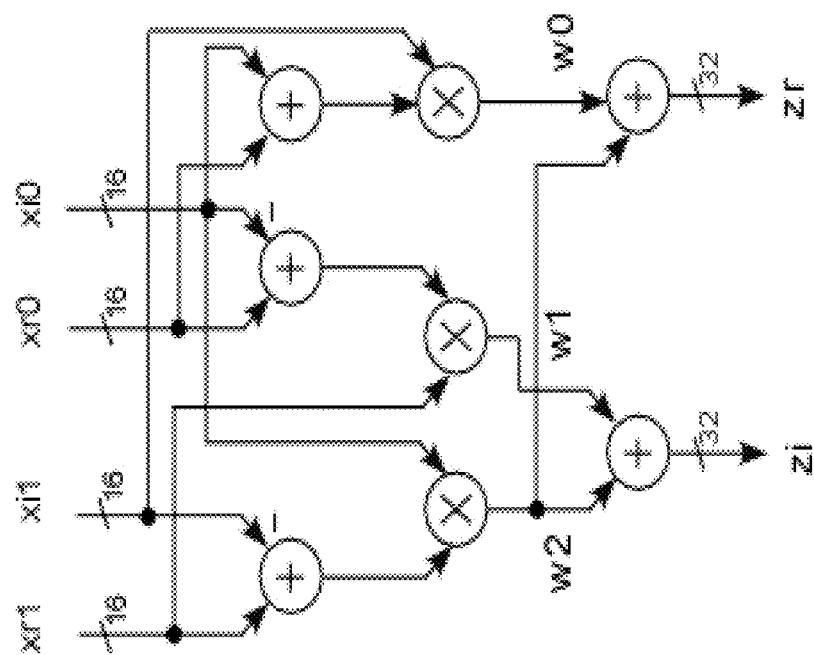
FIG. 42 is a drawing and shows a Complex Multiply.
Figure 43:
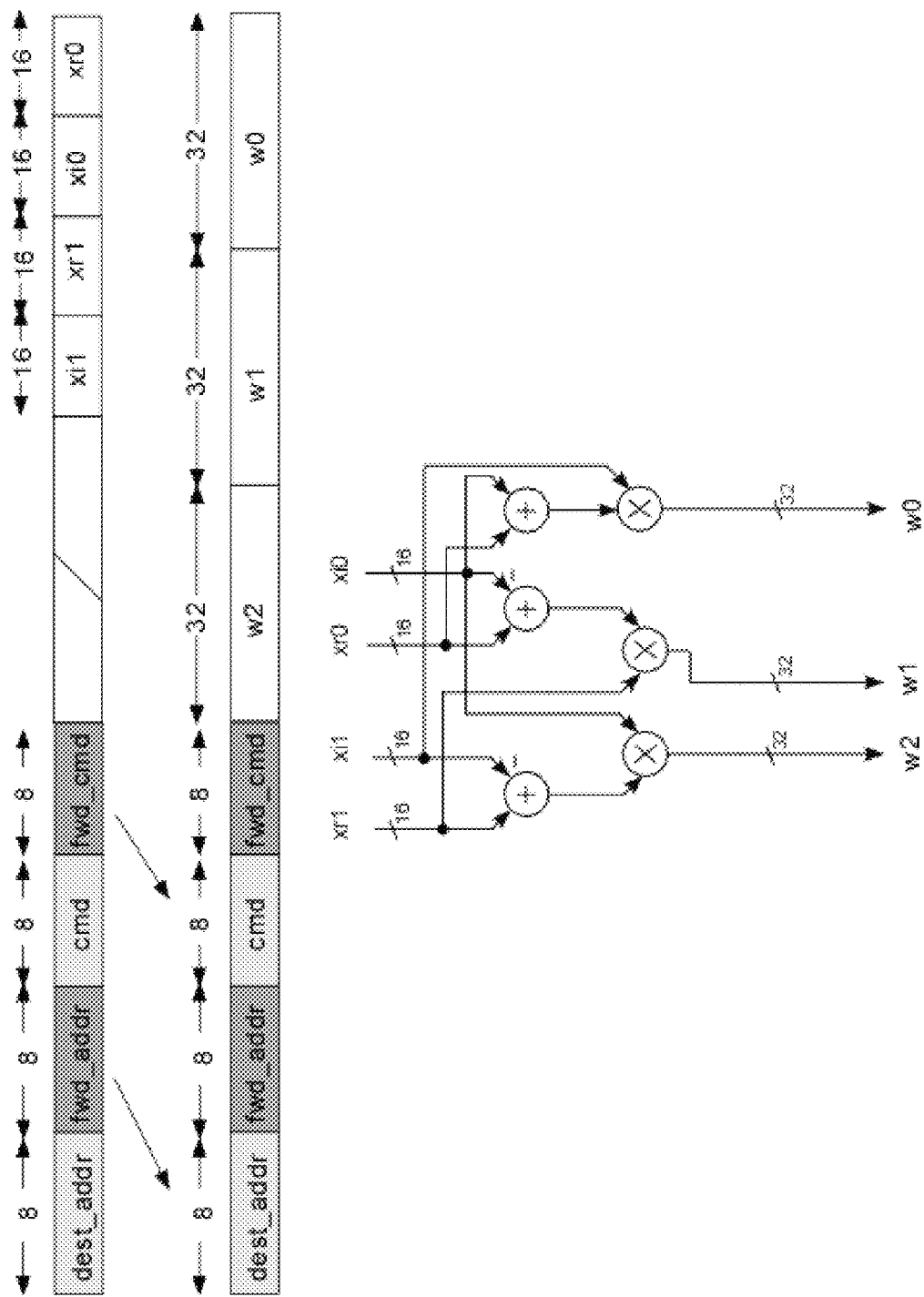
FIG. 43 is a drawing and shows a Complex Multiply without 32 bit Adders.
Figure 44:
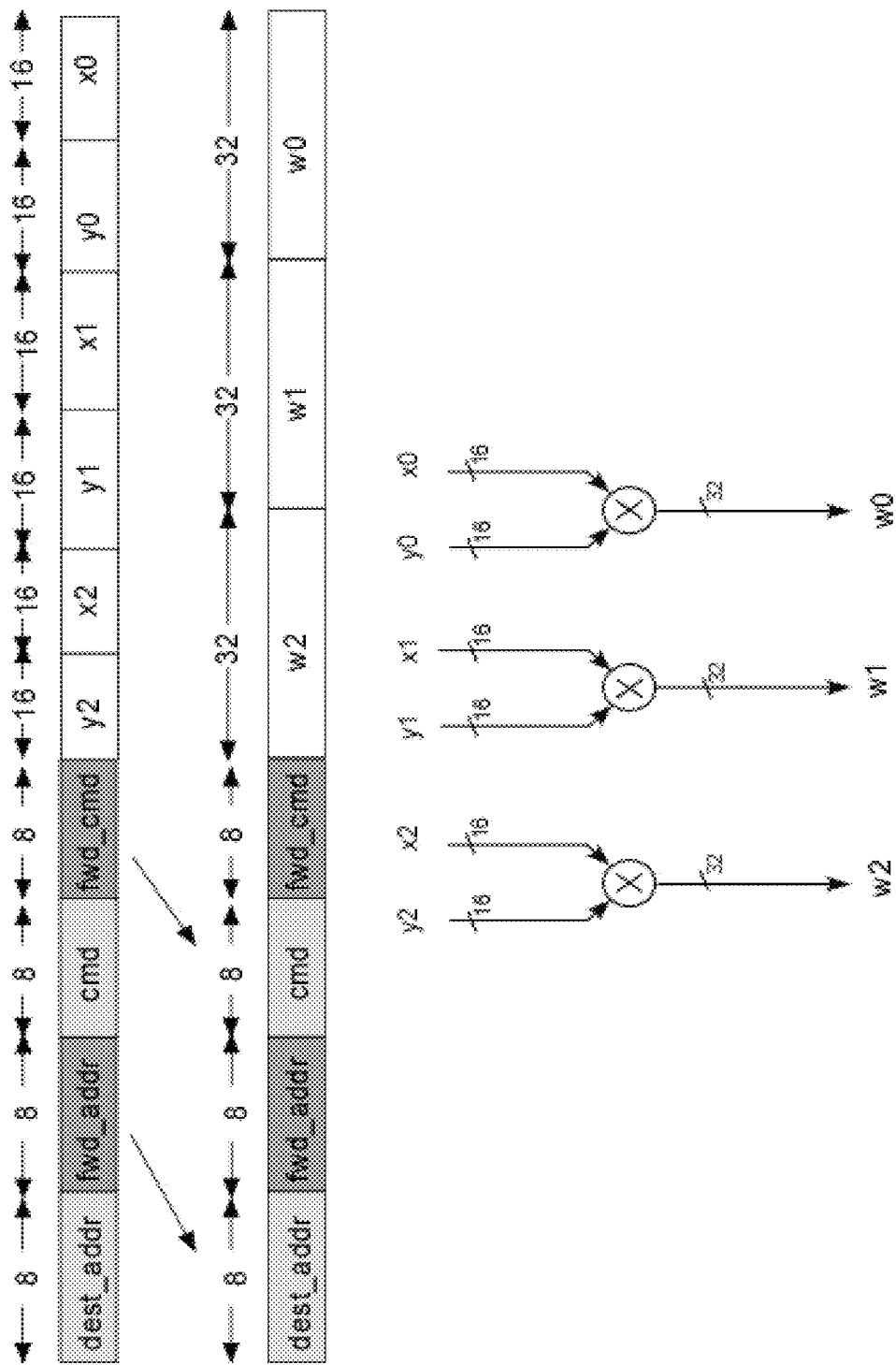
FIG. 44 is a drawing and shows a Complex Multiply Operation with packet field organization.

FIG. 42 shows the signal flow for a complex multiplication. However, the Complex Multiply agent does not compute (zi, zr). Instead it computes and returns three full precision (32 bit) partial results w0, w1, and w2. The packet requesting a complex multiply is shown in FIG. 43 along with the returned packet. By computing w2, w1 and w0 we avoid implementing two 32 bit adders in the agent. This results in synthesizing a faster agent and also saves in area. The RISC Agent has the 40 bit Accumulators and computes (zi, zr) based on the received 32 bit values w2, w1 and w0.

The Complex Multiply agent also has a mode that computes three full precision multiplies in parallel. There are many opportunities to compute multiple parallel multiplies in SVD. This mode is also used in the implementation of multiple FIR filters by a RISC agent.

12. RISC Agent

The key to the reconfigurability of the NoC are the RISC agents. The RISC agent architecture is optimized for receiving, processing and sending packets into the NoC network. In this section we will describe the specification and preliminary architecture of the RISC. Table 12.1 shows a sample of Algorithms implemented on the RISC Agent.

TABLE 12.1

Sample Algorithms implemented on the RISC Agents for Receiver Operation

| Item | Algorithm | Complexity | Agents Used | Operation | Notes |
|---|---|---|---|---|---|
| 1 | Variable Length FFT | High | CMPLX Multiply, Rotation CORDIC, Complex SRAM | Training, Steady-State | |
| 2 | 2 × 2 Complex Matrix SVD | Very High | CMPLX Multiply, Rotation CORDIC, ATAN CORDIC, Matrix Multiply, Complex SRAM | MIMO Training | Complex SRAM for Setup |
| 3 | MIMO Equalization | Low | CMPLX Multiply, Complex SRAM | Steady-State | |
| 4 | Complex Auto-Correlation | Low | CMPLX Multiply | Packet Detection | |
| 5 | Complex Matched Filter | Moderate | CMPLX Multiply | Packet Detection | |
| 6 | 4 Parallel Real FIR Filters | Low | CMPLX Multiply | Continuous | |
| 7 | SISO Training and Equalization | Moderate | ATAN CORDIC, CMPLX Multiply, Scalar Division | Training | |
| 8 | PILOT Tracking | Moderate | CMPLX Multiply, Rotation CORDIC, ATAN CORDIC, | Steady-State | Complex SRAM for Setup |
| 9 | De-Interleaver | Low | None | Steady-State | |
| 10 | De-Mapper | Low | None | Steady-State | |
| 11 | AGC | Moderate | CMPLX Multiply | Packet Detection | |

It is important to distinguish various operational modes during the demodulation of a received MIMO OFDM packet as outlined in Table 12.2.

| Operation | Description |
| --- | --- |
| Packet Detection | Processing of short preamble to detect packet, coarse carrier offset estimation and correction, coarse timing |
| SISO Training | Long Preamble Symbol processing, MRC channel estimation and equalization |
| MIMO Training | Calculation of U, Σ, and V matrices in Beamforming (including quantization of feedback data) and to calculate Pseudoinverse for Open Loop. |
| Steady State | FFT per stream, MIMO Equalization, Pilot Tracking, Demapper per stream, de-Interleaver per stream, stream combination, Reed Solomon Decoder, de-puncture, Viterbi Decoder. |
| Continuous | Always active during packet reception (e.g. CIC Filters, FIR Decimation Filters). |

Note that the following operations are orthogonal:

Packet Detection: SISO Training, MIMO Training, Steady State

SISO Training: MIMO Training, Steady State

MIMO Training: Steady State

For more information on the Pseudoinverse of a complex matrix, see [Weisstein].

The Pseudoinverse is computed for open loop systems but it can be computed with a 2×2 SVD of a complex matrix (for 2×2 and 2×3 Open Loop systems).

The following are important observations regarding the RISC Agents and Orthogonal Operations:

During Steady State operation the Complex Multipliers used in Packet Detection are freed up to be used by the FFT and SVD Computation.

Resources (Agents) used by the SVD computation are freed up during Steady State for MIMO Equalization and Pilot Tracking.

Code segments in the RISC Agents can be rapidly swapped out between operation stages keeping the size of the Instruction RAM small. For example code used in SVD computations can be replaced with code for MIMO Equalization and Pilot Tracking. Code for packet detection is swapped out for SVD Calculation code. This is done by the Primary RISC Processor. The RISC agent is designed to accomplish this in a very efficient way.

Figure 45:
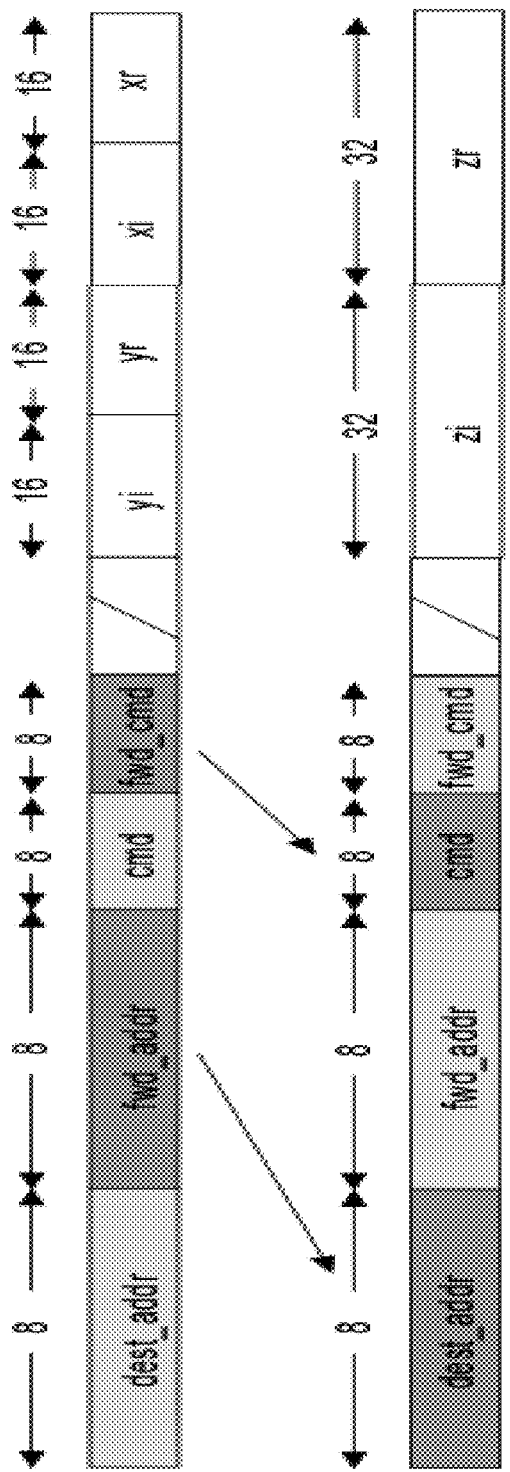
FIG. 45 is a drawing and shows a Complex Multiply Operation with packet field.

In FIG. 45 we show the packet fields for a complex multiply operation.

The top Packet is received by Complex Mutiplier. The full precision result is sent using the Bottom Packet. Note swap of fwd_addr and fwd_cmd.

Figure 46:
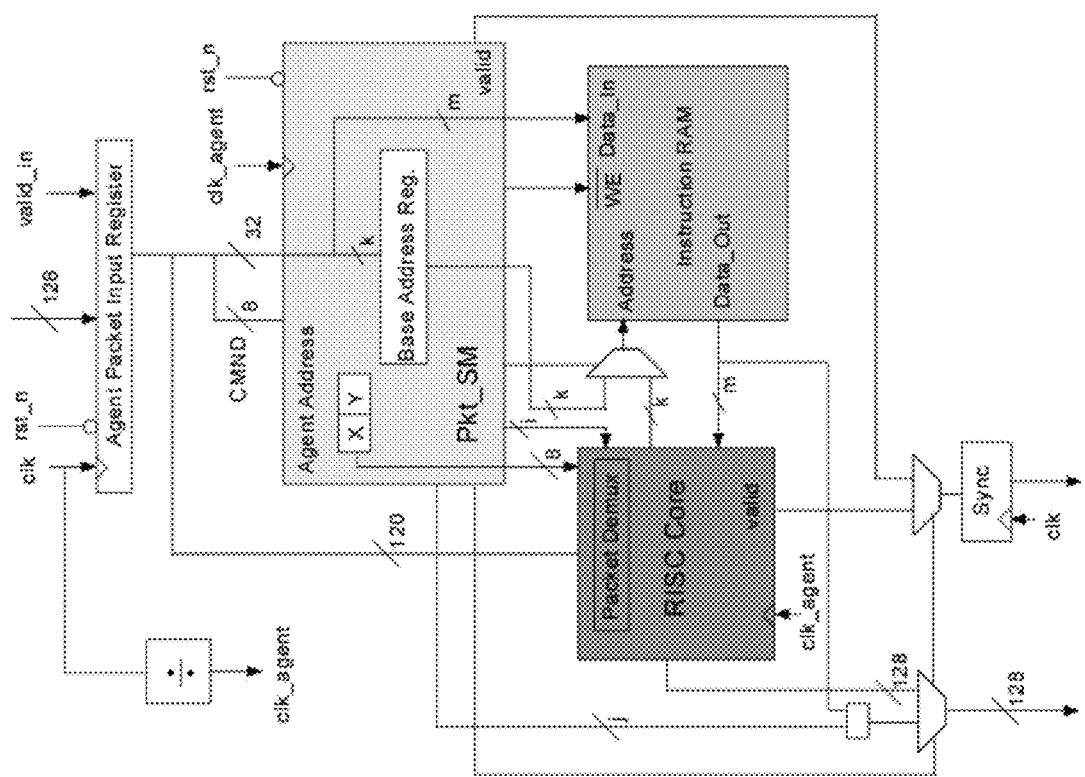
FIG. 46 is a drawing and shows a Toplevel Diagram of the RISC Agent.

The toplevel of the RISC Agent is shown in FIG. 46. The Block labeled Pkt_SM is the Packet Processing State Machine. This block interprets a subset of reserved commands in the received packet and performs operations such as loading instructions into the Instruction RAM (IRAM) and also reading the stored instructions in IRAM for verification. This allows the NoC Primary RISC to download code into the RISC's IRAM and read it back for verification. It is important that code download be fast and efficient for substituting new algorithms depending on the signal processing tasks at various stages of communication packet demodulation. This also permits for reducing the size of the IRAM. This is a key requirement since many RISC agents may be used for demanding tasks (high throughput modes). The Pkt_SM block has a base address register so that the following packets only contain the sequential instructions as the address register is automatically incremented. Table 12.3 shows the special commands and their purpose.

TABLE 12.3

| Command Code | Operation |
| --- | --- |
| 0x0 | NOP |
| 0x1 | Load Pkt_SM with IRAM Base Address |
| 0x2 | Write data (Instruction) to IRAM and increment Address |
| 0x3 | Read IRAM Instruction into Packet and increment Address |
| 0x4 | Reset RISC |
| 0x5 | Reset Pkt_SM |
| 0x6 | Deep Sleep |
| 0x7 | Wakeup |
| 0x8 | Soft Kill |
| 0x9 | Normal RISC execute |
| 0xA | Write Agent Address (x,y) into Pkt_SM Agent Address Register |

The RISC core handles all other commands. The packets involved in the signal processing flow contain commands that are usually next states and operands. For example two 16 bit complex numbers or two 32 bit results of a complex multiply. The RISC core can send packets to agents, for example, (x,y) coordinates to an ArcTan CORDIC block and receive the polar coordinates (angle and modulus). The RISC core has a packet demux block that can be setup to route fields in the received packets to the Registers in the Register File or directly to the accumulators. The hardware implementation of the reconfigurable packet demux block eliminates the overhead associated with moving fields within the packet to the appropriate registers.

The RISC core assembles the transmit packet with either results or requests to other agents. In the toplevel diagram, we show that the Pkt_SM block can also send a packet to the switch fabric. This is the case for verifying the Instruction RAM or other tasks.

In the toplevel diagram we also show that the (X,Y) address of the agent is programmed into the (X,Y) register in the Pkt_SM block. This allows the host or the Primary RISC to assign addresses to agents based on their associated routing switch address. The address is also needed in assembling packets to be sent to agents which need to use the address (forward address) to send results back to the RISC agent.

The toplevel diagram also shows components of the RSI (Routing Switch Interface). As a packet traverses the NoC and is received by the routing switch, if the switch is the target, the packet is latched into a 128 bit register when valid is high (for one clock cycle). The register retains the data until it is overwritten by another packet destined for the agent in the switch. The RSI divides the clock in the switch fabric down to a lower frequency to match the frequency of the agent, in this case the RISC processor. For example if the switch fabric clock is 1 GHz, it can be divided down by 5 to obtain a 200 MHz clock for the RISC processor. The RSI has synchronizing logic to generate valid signals for the packet that is sent out by the agent into the switch fabric.

RISC Architecture Requirements

Figure 47:
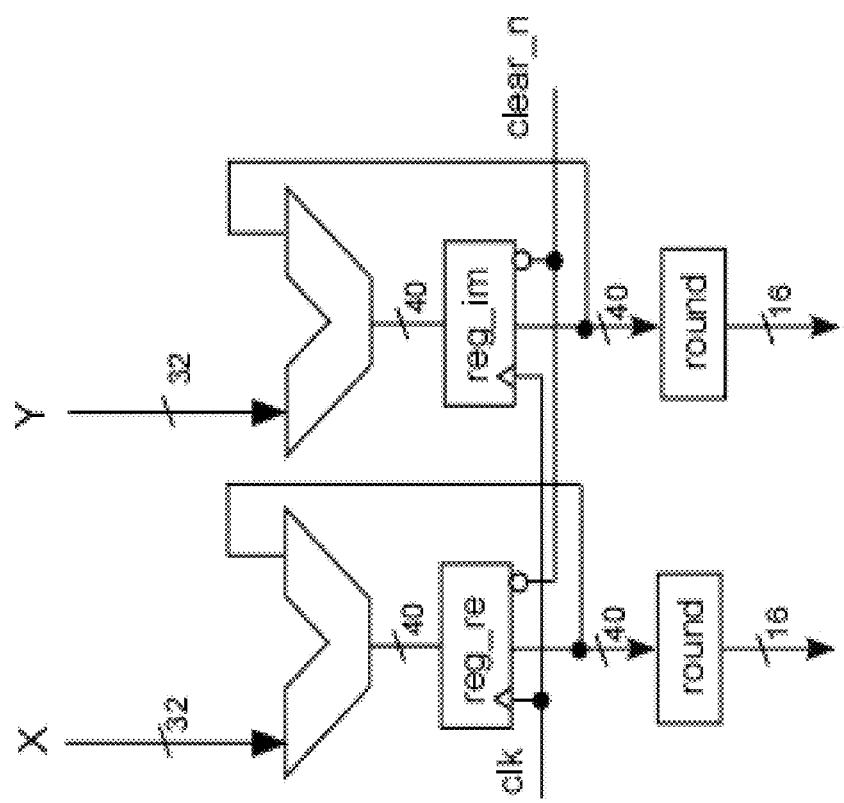
FIG. 47 is a drawing and shows Dual Accumulators.

Below we present a list of requirements for the RISC agent. FIG. 47 shows the dual accumulation requirements for processing complex multiplication results or implementing two real FIR filters in a single agent.

Dual 40 bit Accumulators with Clear for computing complex matrix Row×Columns, complex matched filter operations, and dual real FIR filtering (I and Q channels).

16 bit ALU operations

Register File with 32 Registers each 32 bits wide and addressable as 16 bit real and 16 bit imaginary part.

Registers in Register file used as addresses for Complex RAM Agents.

Programmable Demux of received packet fields into Registers in Register file or inputs to Accumulator.

Dual Barrel Shifter

Rounding unit per Accumulator

Bit addressable logic

Dual status registers for Dual/Quad ALU results.

Bit Reverse Address Generation

Modulo M Address Generation

Programmable Routing of Registers in Register File or Accumulators to Output Packet Fields.

Optimized for "C" Switch Case Statements.

Support for Viterbi Compare, Select, and Store Unit (CSSU) for the Add/Compare Selection of the Viterbi Operator (per TI TMS320C54).

Specialized Hardware support for Interleaver and De-interlever algorithms.

Reed Solomon Decoding Optimization Hardware.

Convolutional Turbo Coding Acceleration.

13. Radiation Hardening of the NoC

SET hardening can only be done using special RHBD circuit techniques. Micro-RDC's temporal sampling latch methodology permits microcircuits to be build with a very high degree of immunity to both SEU and SET [Mavis/Eaton 2000], [Mavis/Eaton 2002], and [Mavis/Eaton 2007].

By careful examination of the primitive agents and the routing switches we can make the following observations:

The accumulators and the integrators and comb filters need protection against SEU since an SEU will affect the result over a long duration.

The XY coordinates in the routing switches associated with each cluster Tag need to be protected against SEU as a single bit error leads to a catastrophic failure.

The 2-level FIFO's (or single level Registers) at the routing switches do not need SEU protection since the packets are transferred to agents or other switches in a single cycle. This assumption can be tested in a prototype ASIC and if invalid the switch registers will be implemented using temporal latches. The payload delivered to the agent is protected against SEU by registering the payload in registers synthesized with temporal latches when necessary. Also the high speed requirements on the links between routing switches precludes SEU protection of FIFOs using temporal latches. Note in most cases we have a "single" level FIFO.

For memory, the most viable SEU hardening technique at 0.18 micron and smaller technologies is to use conventional unhardened 4-transistor memory cells, place each bit of a word in a separate memory block (to achieve large separations), and use an inexpensive error detect and correct (EDAC) scheme, such as a Hamming code with periodic scrubbing, to reduce the error rate to an acceptable level. Also interleaving plays a key role in mitigating upsets when combined with EDAC.

See for example, Rad Hard SRAM design.

For data latches, more sophisticated techniques are required. This is because DICE-based (and also TMR-based) latches only represent an improvement for static SEU susceptibility and do nothing to help mitigate the effects of SETs.

Combinational logic is hardened by synthesizing using radiation hardened standard cell library.

Between MIMO OFDM packet demodulation operations, the Host can refresh the XY Tags in all routing switches to further mitigate SEU. Also all accumulators and RAMS are cleared.

Finally the code in the RISC agents can be scrubbed by the Primary RISC on a periodic schedule.

Prototype Reconfigurable NoC MIMO OFDM ASIC 14.1 Introduction

As a first major step in the development of a fully functional Radiation Hardened Reconfigurable Radio, we will tapeout a prototype ASIC which fully implements a 4×4 MIMO OFDM receiver and transmitter but performs Reed Solomon Decoding, Viterbi Decoding and Convolutional Turbo Coding off chip.

14.2 SERDES Host Interface and PLL

Figure 48:
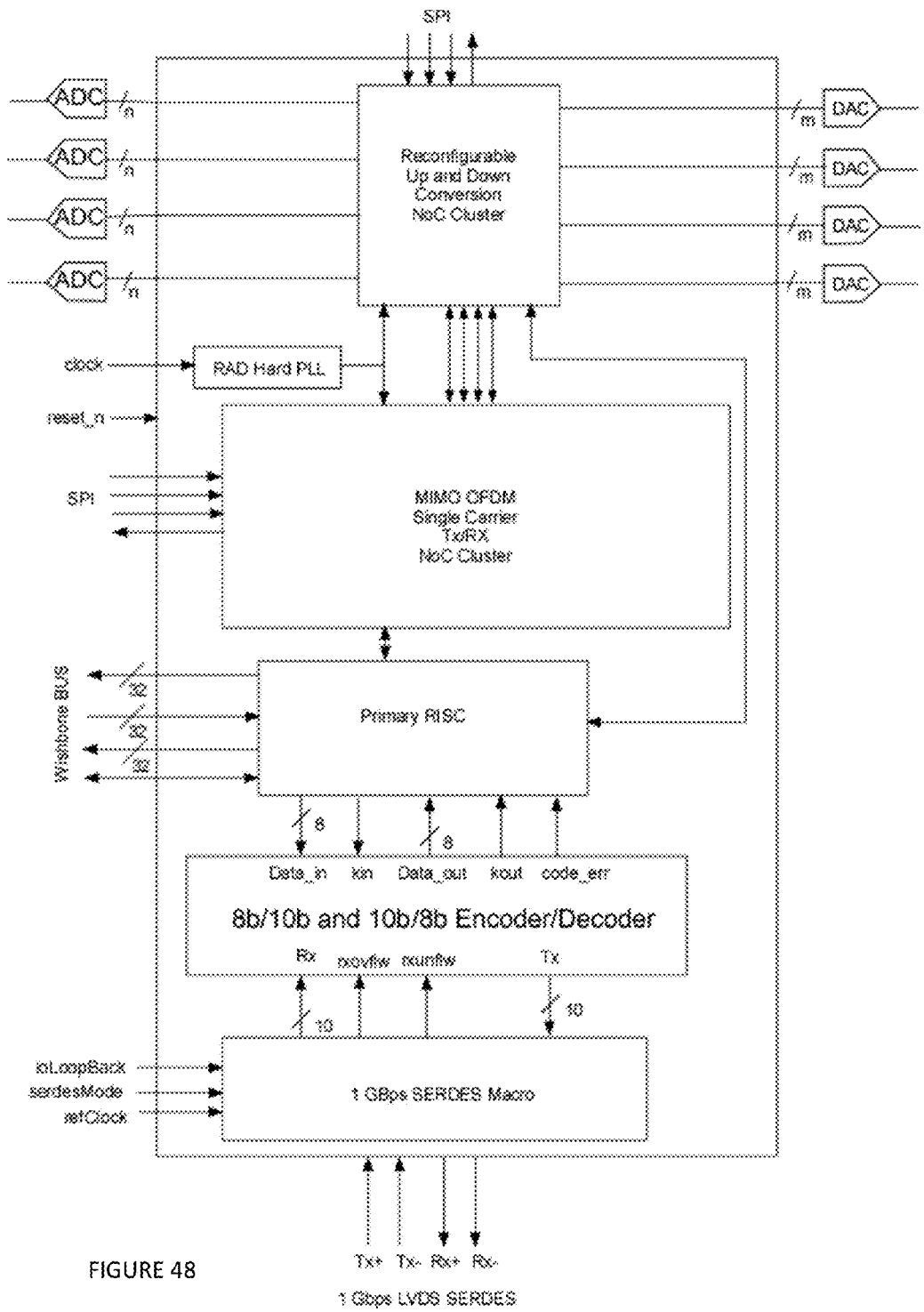
FIG. 48 is a drawing and shows a Reconfigurable Radio Prototype Chip Toplevel.

A toplevel block diagram of the proposed prototype Reconfigurable NoC chip is shown in FIG. 48. In this implementation the host interface is through a 1 Gbps LVDS SERDES interface. The chip has a primary 32 bit RISC. It supports four receive chains at IF or Zero-IF (with I and Q interleaved) using four Analog to Digital Converters (ADCs). The ADC's are off chip. The chip supports four transmit channels. Note that we are showing a single Digital to Analog Converter per Tx chain, however, we will support two DACs per chain for direct up conversion. The chip has a Radiation Hardened PLL that provides the 1 GHz or 500 MHz clock to the NoC switch fabric.

14.3 NoC Clusters

The chip has two main NoC clusters. The Up/Down conversion cluster and the main MIMO OFDM and Single Carrier system cluster. Separation of the two clusters is driven by a number of factors the main ones being:

The Up/Down conversion cluster agents are always active during receive or transmit. There is no orthogonality between operation modes.

The agent types are tuned to the Up/Down conversion process. They are the Numerically Controlled Oscillators and Mixers, CIC Filters and FIR Filter agents. The RISC Agents in this cluster deal with the reprogrammable FIR filters and AGC among other tasks and are always busy.

On the other hand, the MIMO OFDM cluster has many operations that are orthogonal. Also unlike the Up/Down Conversion cluster many tasks are idle between reception of radio packets.

Note in FIG. 48 that the Up/Down Conversion cluster feeds samples into the MIMO OFDM cluster during radio packet reception. During radio packet transmission the MIMO OFDM cluster feeds data into the Up/Down conversion cluster.

14.4 Primary RISC

The Primary RISC is responsible for host interface processing and MAC operations. It is also responsible for downloading code segments into the RISC agents in the clusters to reconfigure the Radio. In the toplevel diagram of the chip, we show that the Primary RISC interfaces into the high speed SERDES host interface using the 8b/10b and 10b/8b with Disparity Encoders and Decoders. The Decoder also aligns the SERDES data in conjunction with K28.5 characters and receive overflow and under flow signals.

14.5 Primary RISC Wishbone BUS Interface

To provide maximum flexibility in the programming of the Primary RISC, a 32 bit Wishbone Bus (see OpenCores.Org Wishbone BUS specification) is provided for the RISC for off-chip and on-chip interfacing. In this manner, firmware is stored in Rad Hard parallel EEPROMS and Rad Hard Volatile RAM is also accessed. The Wishbone bus also can be interfaced to an FPGA to provide stimulus or to further process the received streams.

14.6 SPI for NoC Clusters

Each NoC cluster has a dedicated agent with an off chip SPI slave interface. The SPI agents support the transmission and reception of arbitrary 128 bit packets into the switch fabric to any agent within the NoC cluster. This allows for the individual testing of all agents within a cluster. This is in addition to the capability to test any agent by the Primary RISC and by extension through the SERDES host interface. In the toplevel diagram of the chip we show that the Primary RISC has independent access to the NoC clusters.

14.7 FPGA Processing and Stimulus Injection into the Chip

The prototype chip is designed such that a high performance FPGA can further process the demodulated receive streams to recover the transmitted digital data. For example, the FPGA can implement a high speed Viterbi decoder. In a 2×3 open loop MIMO system, there are three receive chains and two demodulated data streams. The high speed transfer between the demodulated data streams and the FPGA (where they are decoded, combined and then processed by a Viterbi decoder) can be accomplished using the offchip Wishbone bus. The FPGA can provide digital stimulus through the ADC interfaces for testing the MIMO OFDM Receiver.

14.8 SpaceWire Interface

Figure 49:
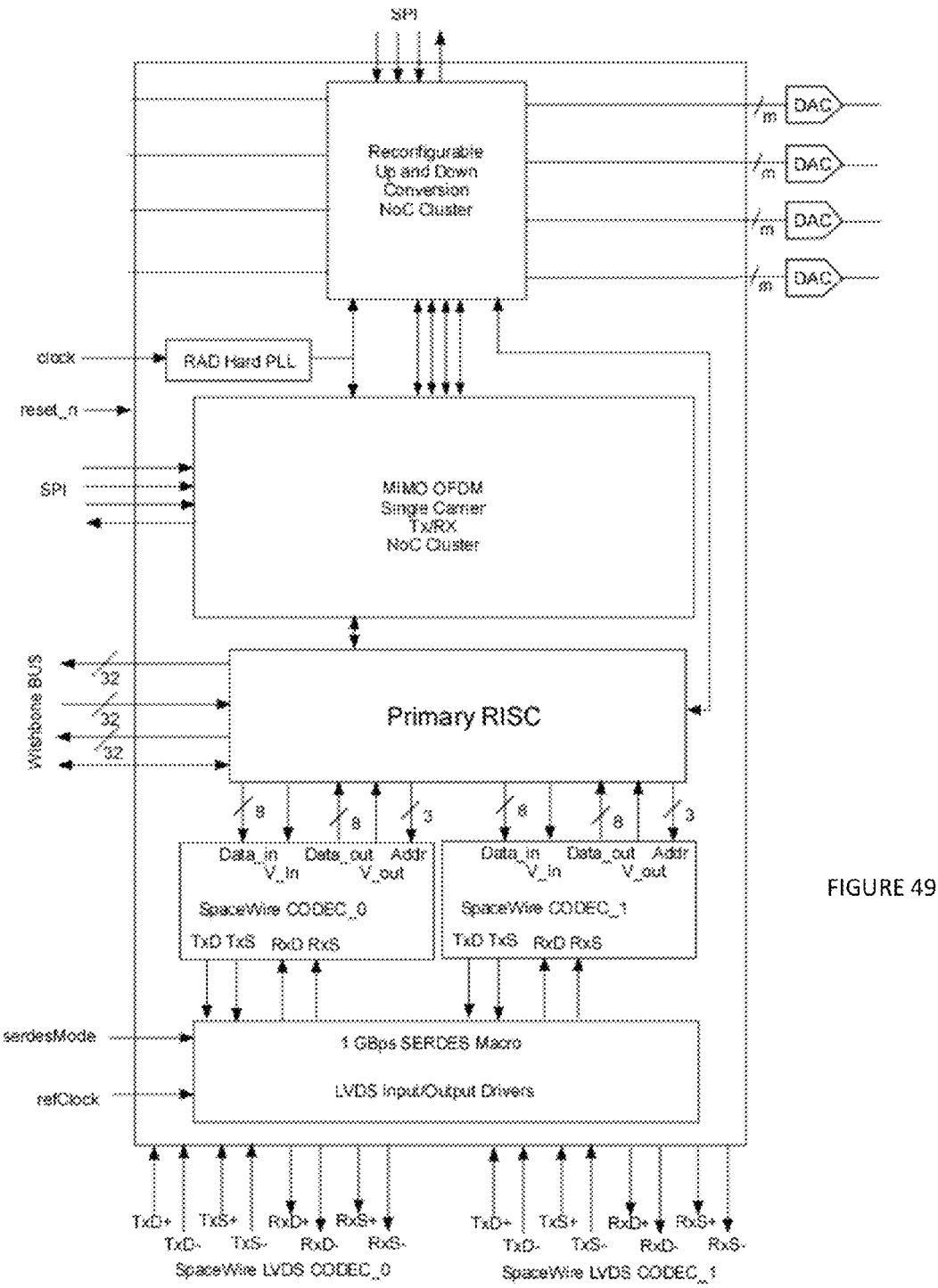
FIG. 49 is a drawing and shows a Reconfigurable Radio Prototype Chip Toplevel with SpaceWire Host Interface.

The prototype chip also supports interfacing to a SpaceWire network. See FIG. 49. The Radiation Hardened SERDES hard macro that we will use in the chip, supports a mode where the SERDES LVDS drivers are directly accessed through the LSB of the transmit and receive digital signals. In this case the SERDES PLL and clock data recovery are turned off. The host interface is through two SpaceWire CODECs implemented on the chip. An external pin will switch between the SERDES interface or the SpaceWire interface. Since SpaceWire is slower than SERDES two CODECs are used. This capability of the chip is very important for risk mitigation in case a host interface fails and during very low power operation where the throughput is lowered. SpaceWire provides a very low power, albeit slower, interface.

14.9 NoC Clusters

Figure 50:
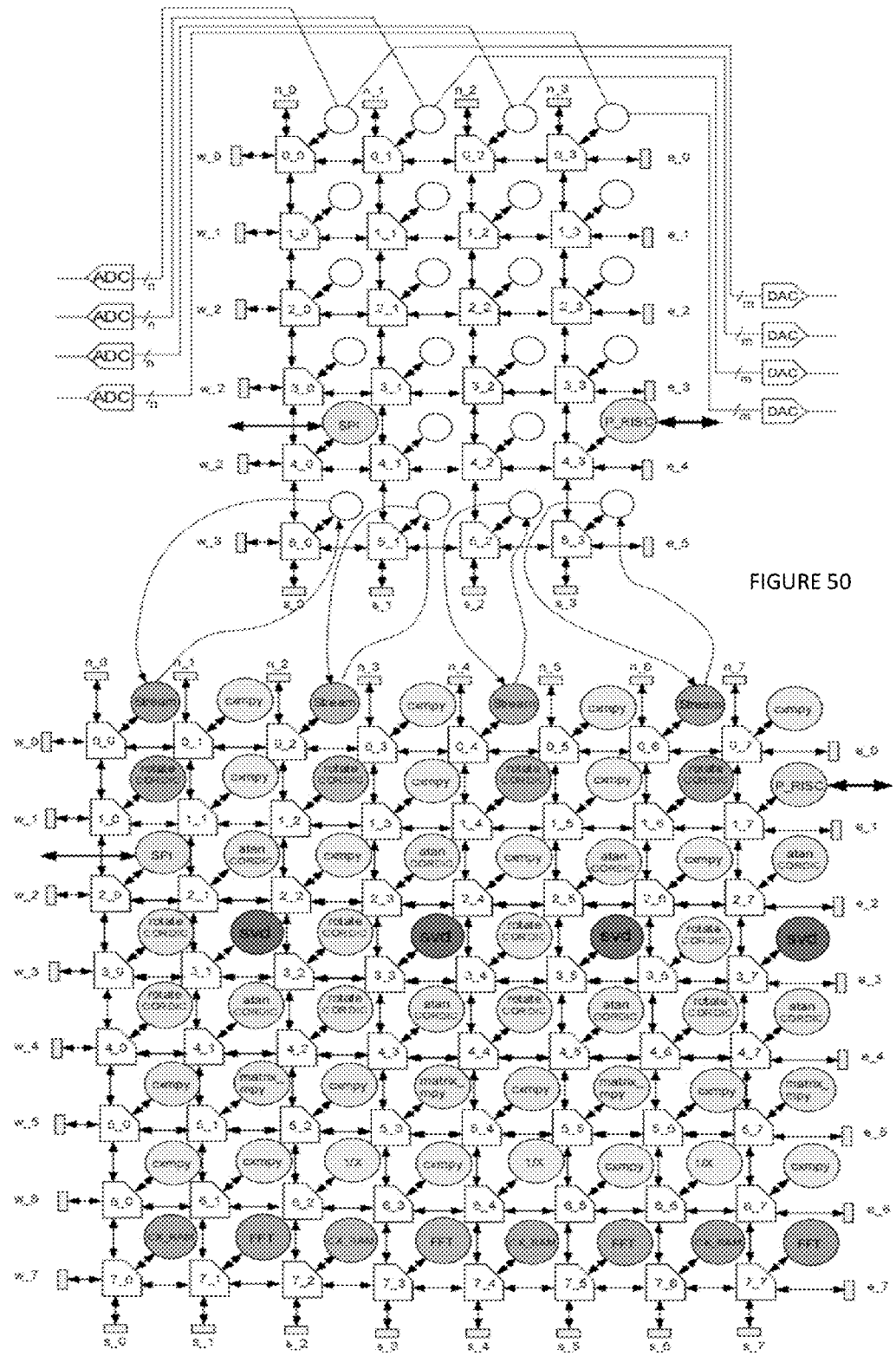
FIG. 50 is a drawing and shows NoC Clusters.
Figure 51:
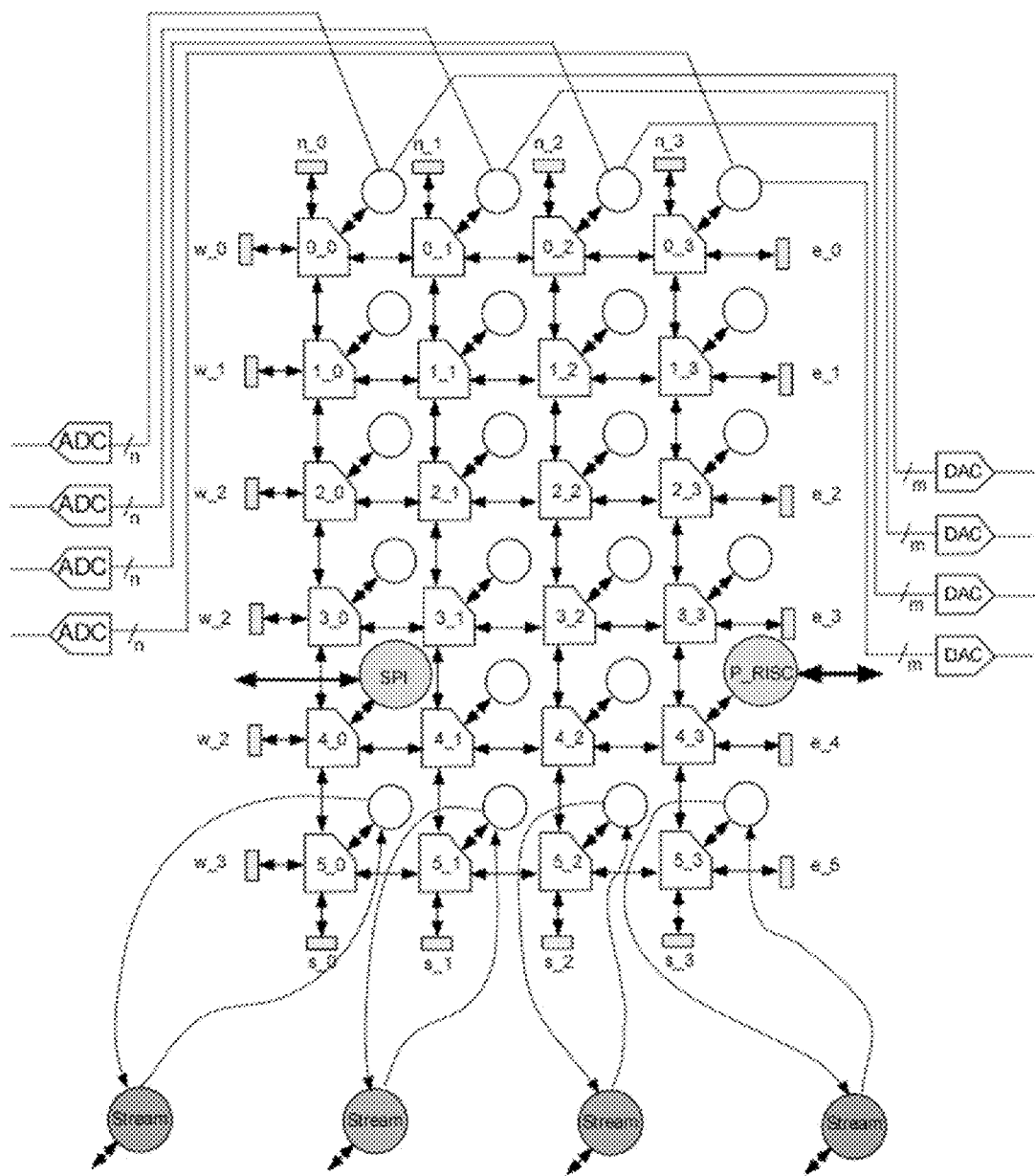
FIG. 51 is a drawing and shows an Up/Down Conversion Cluster.
Figure 52:
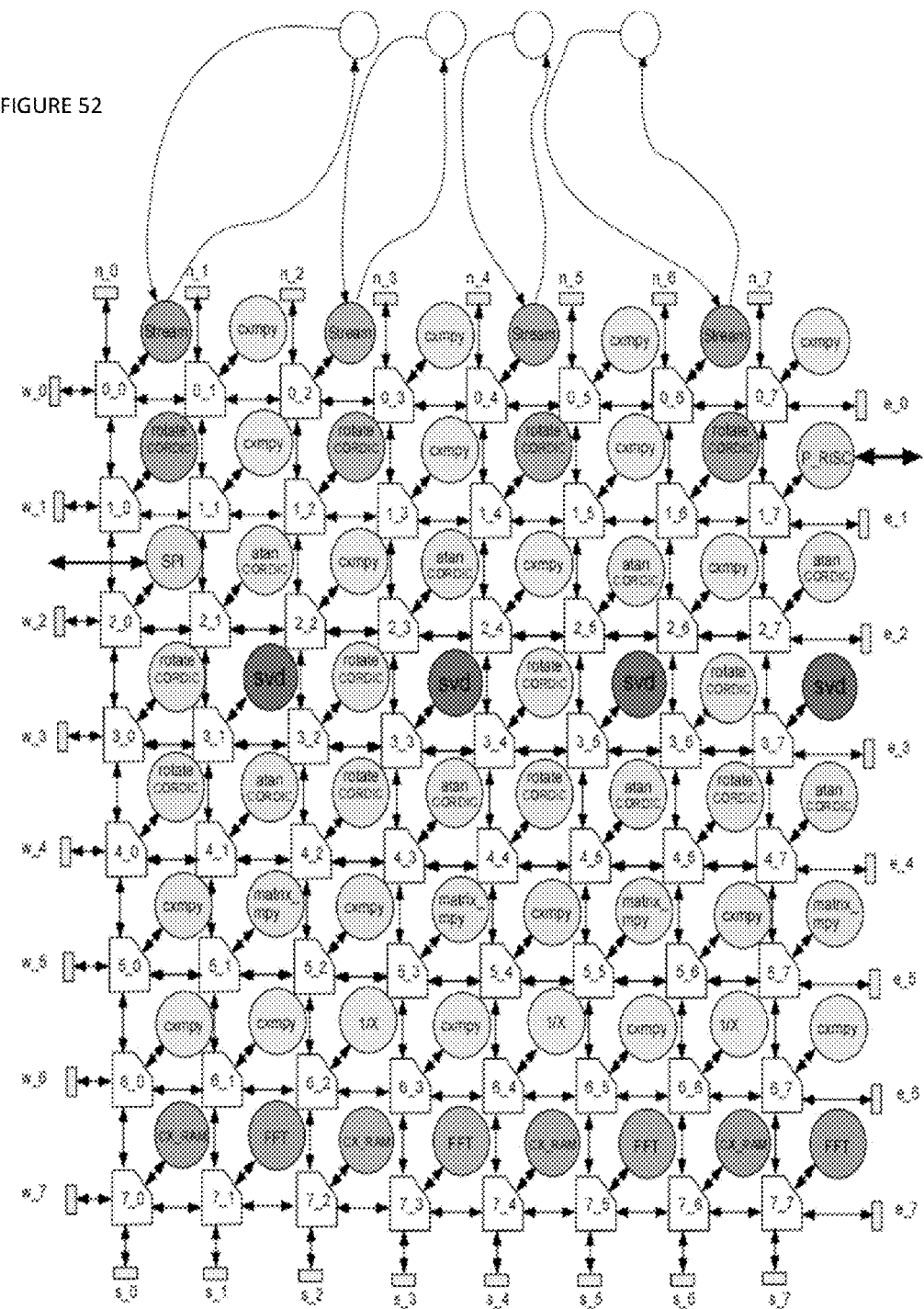
FIG. 52 is a drawing and shows a MIMO OFDM Cluster.
Figure 53:
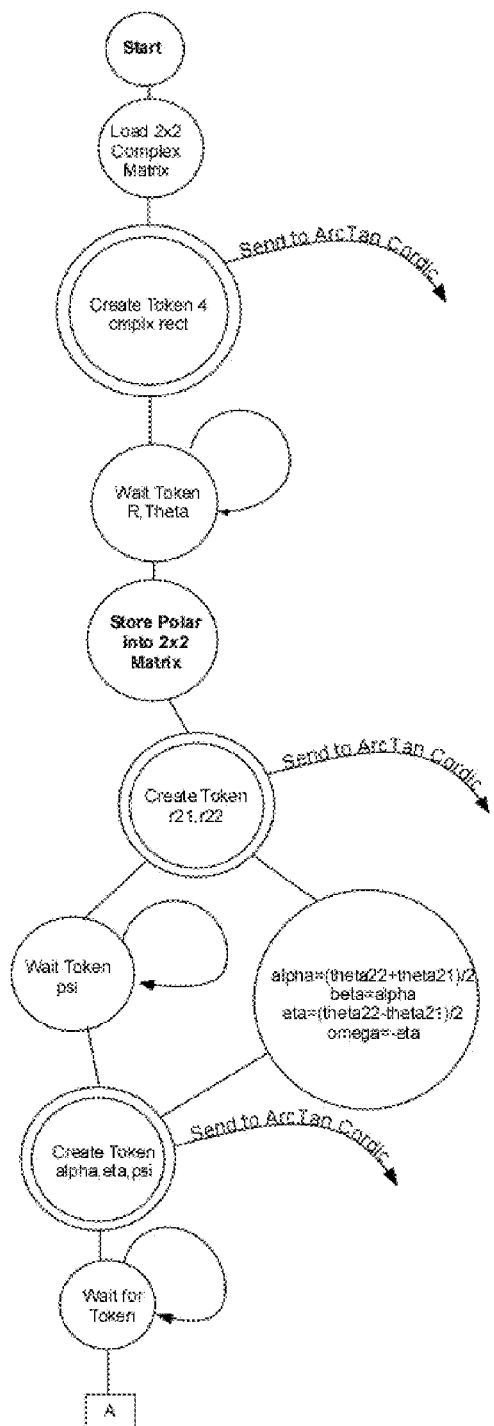
FIG. 53 is a drawing 1 of 5 of the state machine for implementation of the 2×2 general Complex Matrix Single Value Decomposition (SVD).
Figure 54:
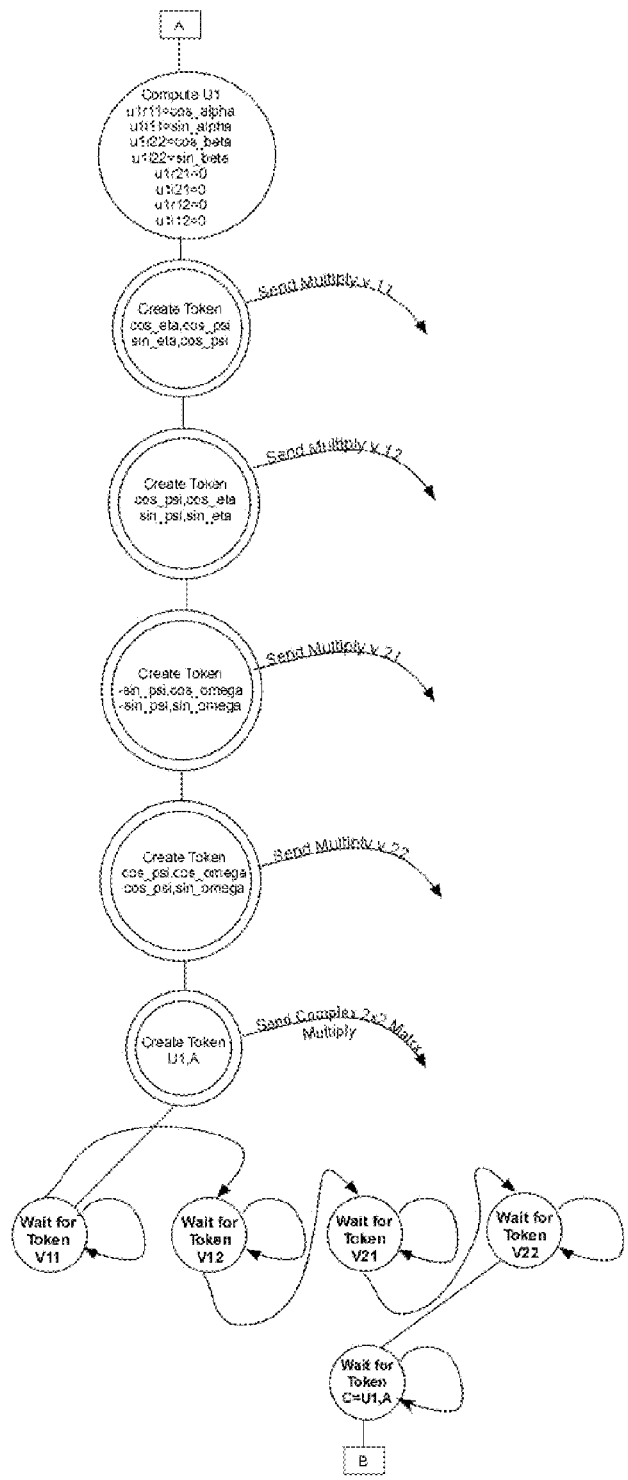
FIG. 54 is a drawing 2 of 5 of the state machine for implementation of the 2×2 general Complex Matrix Single Value Decomposition (SVD).
Figure 55:
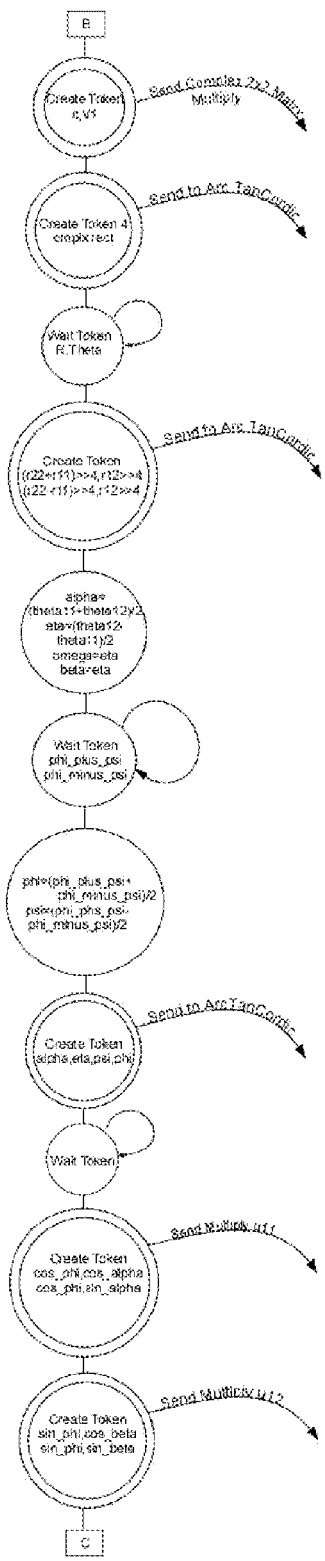
FIG. 55 is a drawing 3 of 5 of the state machine for implementation of the 2×2 general Complex Matrix Single Value Decomposition (SVD).
Figure 56:
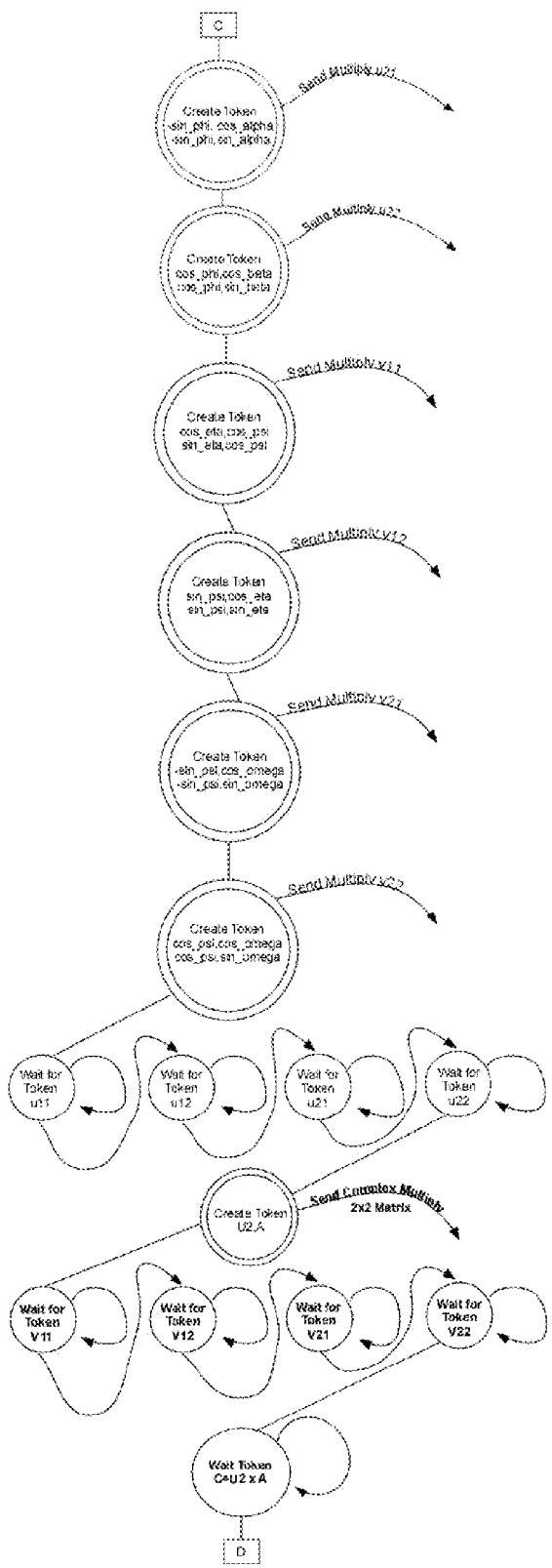
FIG. 56 is a drawing 4 of 5 of the state machine for implementation of the 2×2 general Complex Matrix Single Value Decomposition (SVD).
Figure 57:
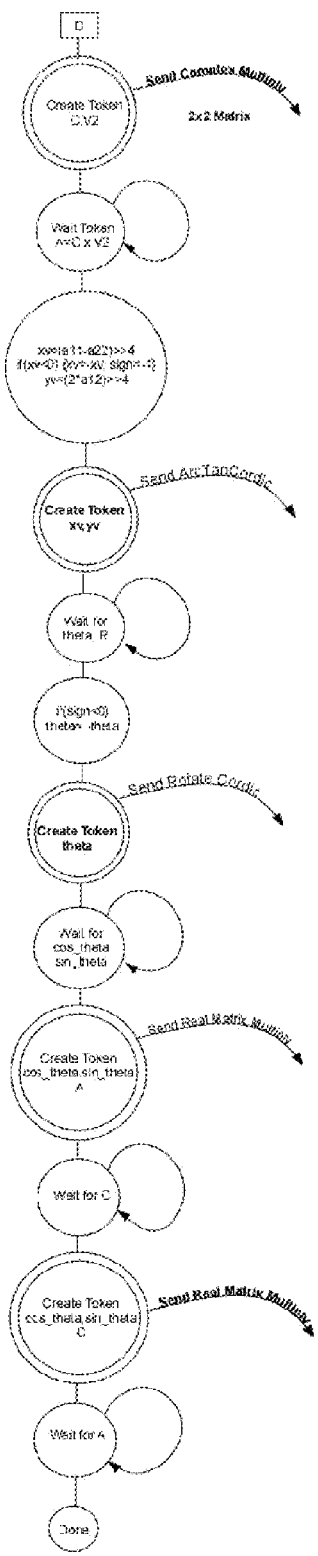
FIG. 57 is a drawing 5 of 5 of the state machine for implementation of the 2×2 general Complex Matrix Single Value Decomposition (SVD).

The NoC Clusters are shown in FIG. 50. The Up/Down Conversion cluster is shown in FIG. 51. The MIMO OFDM cluster is shown in FIG. 52. The purpose of FIG. 50 is to show that for each receive chain, baseband samples are fed into the MIMO OFDM cluster form the Up/Down Conversion cluster. Also during transmit, samples are fed to the Up/Down Conversion cluster from the MIMO OFDM cluster.

14.9.1 MIMO OFDM Cluster

The MIMO OFDM cluster in the prototype chip supports a 4 receive chain system. It will support a 4×4, 3×4, 4×2, 2×3, 2×2 and 1×4, 1×3, 1×2 and 1×1 systems. The cluster can support other MIMO OFDM systems such as a 4×1 beam forming system for maximum range. To support 4 receive chains, the MIMO OFDM cluster has been color coded for each receive chain. In FIG. 52, each receive chain has an independent agent that receives baseband samples from the Up/Down Conversion cluster. The cluster shows four color coded FFT agents for each chain. The FFTs independently process each receive chain in parallel. The FFT agent is implemented in the RISC agent. During initial training, after the FFT of the MIMO channel training symbols (through possible further processing prior to the FFT), the per carrier frequency domain samples are available to compute the 2×2 SVD per carrier (note that the 2×2 SVD is the main calculation engine for 4×2, 2×3, and 2×2 MIMO systems). We show four SVD agents running in parallel. Note that the SVD agents are not tied to a receive chain. They are all color coded in purple. Each SVD agent processes a set of orthogonal carrier sets in parallel. In fact to speed up this operation we can expand to an 8×16 NoC network. Once the 2×2 SVD engines complete processing the carriers, depending on the MIMO configuration, they can be used to compute the pseudo-inverse for open loop systems, or to supply the U, B and V matrices per carrier for beam forming. At this stage the code in each SVD agent is replaced with code for computing the MIMO equalization of the receive chains using complex matrix multiply and to support Pilot Tracking and other operations.

In the MIMO OFDM NoC cluster shown in FIG. 52, the primitive agents are placed near the RISC agents for SVD or FFT to minimize the latency.

14.9.2 Complex SRAM Agent

The Complex RAM agent, indicated by cx_ram agent in FIG. 52, is sized to support MIMO OFDM systems with 1024 carriers for very high throughput. The Complex RAM agent stores complex samples arranged as 32 bit words using 16 bits for the real part and 16 bits for the imaginary part. In the prototype chip, the Complex RAM agent is implemented as a 2048×32 Radiation Hardened SRAM. A full section is devoted to the design and implementation of the Rad Hard SRAM by Micro-RDC. The Complex SRAM agent has a state machine to interpret commands. It supports read and write to individual locations and specialized operations such as high speed shifting of data.

14.10 Singular Value Decomposition of Arbitrary Complex 2×2 Matrices Using CORDIC Operations This section contains the formulae and matrix manipulations for the Singular Value Decomposition of arbitrary complex matrices. The key point is to compute the SVD such that CORDIC computation units, rotations and arc tangents, can be used. The method is based on the work outlined in: Nariankadu D. Hemkumar, "Efficient VLSI Architectures for Matric Factorization," Ph.D. Dissertation, Rice University, April 1994.

A 2×2 arbitrary complex matrix is used to illustrate the technique.

Define the Matrix A, $$A = \begin{bmatrix} a_{11} & a_{12} \\ a_{21} & a_{22} \end{bmatrix} = U\Sigma V\dagger \quad (1)$$

We start out with the Matrix A and use Octave or Mathematica to compute the SVD:

$$A = \begin{pmatrix} 2+3i & 5+7i \\ 9-3i & 8+6i \end{pmatrix} = U\Sigma V^\dagger$$

Where, $\Sigma$=[18:5769; 5:8221] and, $$U = \begin{pmatrix} -0.77513 - 0.22045i & -0.30045 + 0.51021i \\ -0.51724 + 0.28818i & -0.20187 - 0.78017i \end{pmatrix}$$

$$V = \begin{pmatrix} -0.71051 + 0i & 0.70369 + 0i \\ -0.23065 + 0.66482i & -0.23288 + 0.67126i \end{pmatrix}$$

The first step in computing the SVD is to convert the matrix A into Polar form. This is accomplished using the ArcTan Cordic function. Note that the Arctan Cordic function also computed the modulus. In "C" notation:

$\theta$=ArcTanCordic($x,y,\&r$);

$r_{11}$=Abs[$a_{11}$]
$\theta_{11}$=Arg[$a_{11}$]
$r_{12}$=Abs[$a_{12}$]
$\theta_{12}$=Arg[$a_{12}$]
$r_{21}$=Abs[$a_{21}$]
$\theta_{21}$=Arg[$a_{21}$]
$r_{22}$=Abs[$a_{22}$]
$\theta_{22}$=Arg[$a_{22}$]

$$AA = \begin{pmatrix} r_{11}e^{i\theta_{11}} & r_{12}e^{i\theta_{12}} \\ r_{21}e^{i\theta_{21}} & r_{22}e^{i\theta_{22}} \end{pmatrix}$$

Define the following angles:

$$\alpha = \frac{Imag[a_{22}] + Imag[a_{21}]}{2}$$

$\beta=\alpha$ $$\eta = \frac{Imag[a_{22}] - Imag[a_{21}]}{2}$$

$\omega=-\eta$

Define the left and right matrices U1 and V1:

$$U_1 = \begin{pmatrix} \cos\phi & -\sin\phi \\ \sin\phi & \cos\phi \end{pmatrix} \begin{pmatrix} e^{i\alpha} & 0 \\ 0 & e^{i\beta} \end{pmatrix}$$

$$V_1 = \begin{pmatrix} e^{i\eta} & 0 \\ 0 & e^{i\omega} \end{pmatrix} \begin{pmatrix} \cos\psi & -\sin\psi \\ \sin\psi & \cos\psi \end{pmatrix}$$

$\omega=-\eta$

The first steps are to use the U1 and V1 matrices to transform the matrix
A into an upper triangle matrix $R_{lower}$ (R lower) where,
Convert the Upper Triangular Matrix RL to Polar Coordinates:

$r_{11}$=Abs[$rl_{11}$]
$\theta_{11}$=Arg[$rl_{11}$]
$r_{12}$=Abs[$rl_{12}$]
$\theta_{12}$=Arg[$rl_{12}$]
$r_{21}$=Arg[$rl_{21}$]
$\theta_{21}$=Arg[$rl_{21}$]
$r_{22}$=Abs[$rl_{22}$]
$\theta_{22}$=Arg[$rl_{22}$]

Now we need to transform RL into a real matrix R. We define the angles, $$\alpha = \frac{\theta_{11} + \theta_{21}}{2}$$

$$\eta = \frac{\theta_{11} - \theta_{12}}{2}$$

$\beta=\eta$ $\omega=-\eta$

Define, $\phi p\psi$=-ArcTan($r_{12},r_{22}+r_{11}$)

$\phi m\psi$=ArcTan($r_{12},r_{22}+r_{11}$)

$$\phi = \frac{\phi p\psi + \phi m\psi}{2}$$

$$\psi = \frac{\phi p\psi + \phi m\psi}{2}$$

$$U_2 = \begin{pmatrix} \cos\phi & \sin\phi \\ -\sin\phi & \cos\phi \end{pmatrix} \begin{pmatrix} e^{i\alpha} & 0 \\ 0 & e^{i\beta} \end{pmatrix}$$

$$V_2 = \begin{pmatrix} e^{i\eta} & 0 \\ 0 & e^{i\omega} \end{pmatrix} \begin{pmatrix} \cos\psi & \sin\psi \\ -\sin\psi & \cos\psi \end{pmatrix}$$

Compute:

$R=U_2 \times RL \times V_2$

The Matrix R is a real matrix.

The next step is to use Jacobi Rotation to diagonalize R to obtain the Singular Values. For Jacobi Rotations see: James W. Demmel, "Applied Numerical Linear Algebra", 1997 p. 249 Algorithm 5.12.

We have, $$R = \begin{pmatrix} r_{11} & r_{12} \\ r_{21} & r_{22} \end{pmatrix}$$

Let, $x=r_{11}-r_{22}$ $y=2r_{12}$

In "C" notation compute Θ:

θ=ArcTanCordic(x,y,&r);

Now compute cos(Θ) and sin(Θ) using the Cordic Rotation module. In "C" notation, with x=1; y=0,
CordicRotate(&x, &y, θ);
This function returns, x=cos(Θ) and y=sin(Θ).

$$\sum = \begin{pmatrix} \cos\theta & \sin\theta \\ -\sin\theta & \cos\theta \end{pmatrix} \begin{pmatrix} r_{11} & r_{12} \\ r_{21} & r_{22} \end{pmatrix} \begin{pmatrix} \cos\theta & -\sin\theta \\ \sin\theta & \cos\theta \end{pmatrix}$$

Computation of U Matrix:

$$U = \begin{pmatrix} \cos\theta & \sin\theta \\ -\sin\theta & \cos\theta \end{pmatrix} \times U_2 \times U_1$$

Computation of V Matrix:

$$V = V_1 \times V_2 \times \begin{pmatrix} \cos\theta & -\sin\theta \\ \sin\theta & \cos\theta \end{pmatrix}$$

14.11 Computing SVD of Rectangular Matrix with Square SVD Algorithms

The following Section is from [Delosme, 1991] and is concerned with computing the SVD of a rectangular matrix using the SVD of a square matrix. Assume that we are interested in the SVD of m×n matrix R. Let m≥n. If not, Transpose the matrix. if m<n. The Rectangular matrix R is decomposed into the product Q×S of an m×n matrix. Q satisfying QH Q=In×S is square of order n. Then the SVD of S is computed:

$$S = UDV^H$$

With $U^H U = V^H V = I_n$

D is real Diagonal. The SVD of R, $$R = (QU)DV^H$$

The implementation of the decomposition R=QS is based on the Givens method in which plane rotations are applied to the rows of R in a specific order. For complex an appropriate rotation is applied.

To illustrate we quote Example 3.6 provided in [Demmel, 1997]:

Example 3.6

We illustrate two intermediate steps in computing the QR decomposition of a 5-to-4 matrix using Givens rotations.

$$\begin{pmatrix} x & x & x & x \\ 0 & x & x & x \\ 0 & 0 & x & x \\ 0 & 0 & x & x \\ 0 & 0 & x & x \end{pmatrix}$$

to $$\begin{pmatrix} x & x & x & x \\ 0 & x & x & x \\ 0 & 0 & x & x \\ 0 & 0 & 0 & x \\ 0 & 0 & 0 & x \end{pmatrix}$$

We multiply $$\begin{pmatrix} 1 & & & & \\ & 1 & & & \\ & & 1 & & \\ & & & c & -s \\ & & & s & c \end{pmatrix} \begin{pmatrix} x & x & x & x \\ 0 & x & x & x \\ 0 & 0 & x & x \\ 0 & 0 & x & x \\ 0 & 0 & x & x \end{pmatrix} = \begin{pmatrix} x & x & x & x \\ 0 & x & x & x \\ 0 & 0 & x & x \\ 0 & 0 & x & x \\ 0 & 0 & 0 & x \end{pmatrix}$$

and $$\begin{pmatrix} 1 & & & & \\ & 1 & & & \\ & & c' & -s' & \\ & & s' & c' & \\ & & & & 1 \end{pmatrix} \begin{pmatrix} x & x & x & x \\ 0 & x & x & x \\ 0 & 0 & x & x \\ 0 & 0 & x & x \\ 0 & 0 & 0 & x \end{pmatrix} = \begin{pmatrix} x & x & x & x \\ 0 & x & x & x \\ 0 & 0 & x & x \\ 0 & 0 & 0 & x \\ 0 & 0 & 0 & x \end{pmatrix}$$

In the above, c=cos Θ, s=sin Θ and c'=cos Φ, s'=sin Φ.

REFERENCES

Achronix, http://www.achronix.com Developer of a 1.5 GHz FPGA that makes use of an asynchronous switching network on chip.

Bourduas, Stephan and Zilic, Zeljko, A Hybrid Ring/Mesh Interconnect for Network-on-Chip Using Hierarchical Rings for Global Routing, NOC '07 Symposium—May 2007—Princeton.

Borkar, S.; Cohn, R.; Cox, G.; Gleason, S.; Gross, T.; Kung, H. T.; Lam, M.; Moore, B.; Peterson, C.; Pieper, J.; Rankin, L.; Tseng, P. S.; Sutton, J.; Urbanski, J.; Webb, J., iWarp: an integrated solution to high-speed parallel computing, Supercomputing '88. [Vol. 1]. Proceedings. Date: 14-18 Nov. 1988, Pages: 330-339.

Carmichael, C and Bridgford, B. A cost/benefit frameworkd for evaluating reconfigurable FPGA SEU mitigation techniques, MAPLD 2005.

Dahl, T.; Christophersen, N.; Gesbert, D. BIMA: blind iterative MIMO algorithm, IEEE International Conference on Acoustics, Speech, and Signal Processing, 2002. Proceedings. (ICASSP '02). Volume 3, Date: 2002, Pages: III-2365-III-2368 vol. 3.

Delosme, Jean-Marc, Parallel Implementations of the SVD using Implicit CORDIC Arithmetic, Yale Univ., SVD and Signal Processing II, R. J. Vaccaro (Editor) Elsevier Science Publishing, 1991.

Demmel, James W., Applied Numerical Linear Algebra, SIAM, Philadelphia, 1997.

Duller, A.; Towner, D.; Panesar, G.; Gray, A.; Robbins, W., PicoArray technology: the tool's story, Proceedings Design, Automation and Test in Europe, 2005. Date: 7-11 Mar. 2005, Pages: 106-111 Vol. 3.

Ercegovac, Milos D., Tomas Lang, Digital Arithmetic, Morgan Kaufmann Publishers, 2004.

Fredriksson, Fredrik, Evaluation of Methods for MIMO Capacity Enhancement, Dept. of Signals, Sensors & Systems, Royal Institute of Technology, Stockholm, Sweden 2004.

Hogenauer, E., An economical class of digital filters for decimation and interpolation, Acoustics, IEEE Transactions on Speech and Signal Processing, Volume 29, Issue 2, Date: April 1981, Pages: 155-162.

Kiessling, M.; Mujtaba, S. A., A software radio architecture for multi-channel digital upconversion and downconversion using generalized polyphase filterbanks with frequency offset correction. The 13th IEEE International Symposium on Personal, Indoor and Mobile Radio Communications, Volume 1, Date: 15-18 Sep. 2002, Pages: 105-109 vol. 1.

Koch-Hofer, Cédric, Renaudin, Marc, Thonnart, Yvain, Vivet, Pascal, ASC, a SystemC extension for modeling Asynchronous Systems, and its application to an Asynchronous NoC, NOC'07 Symposium—May 2007—Princeton.

Lin, Y.; Lee, H.; Woh, M.; Harel, Y.; Mahlke, S.; Mudge, T.; Chakrabarti, C.; Flautner, K., SODA: A High-Performance DSP Architecture for Software-Defined Radio IEEE Micro, Volume 27, Issue 1, Date: January February 2007, Pages: 114-123.

Manohar, R.; Kelly, C., IV, Network on a chip: modeling wireless networks with asynchronous VLSI, IEEE Communications Magazine, Volume 39, Issue 11, November 2001 Page(s): 149-155.

Mavis, D. G.; Eaton, P. H., SEU and SET Modeling and Mitigation in Deep Submicron Technologies 45th annual IEEE International proceedings Reliability physics symposium, 2007. Date: 15-19 Apr. 2007, Pages: 293-305.

Mavis, D. G. and Eaton, P. H., Soft Error Rate Mitigation Techniques for Modern Microcircuits, Proceedings of the 2002 International Reliability Physics Symposium (IRPS), pp. 216-225.

Mavis, D. G. and Eaton, P. H., Temporally Redundant Latch for Preventing Single Event Disruptions in Sequential Integrated Circuits, U.S. Pat. No. 6,127,864, October 2000.

Nariankadu D. Hemkumar, Efficient VLSI Architectures for Matrix Factorization, Ph.D. Dissertation, Rice University, April 1994.

Owens, J. D.; Dally, W. J.; Ho, R.; Jayasimha, D. N.; Keckler, S. W.; Li-Shivan Peh, Research Challenges for On-Chip Interconnection Networks, IEEE Micro, Volume 27, Issue 5, Date: September-October 2007, Pages: 96-108.

PactXPP, http://www.pactxpp.com Developer of a high performance, reconfigurable array based DSP ASIC.

Paulraj, A. J. et. al., An overview of MIMO communications—a key to gigabit wireless, Proceedings of the IEEE Volume 92, Issue 2, Date: February 2004, Pages: 198-218.

PicoChip, http://www.picochip.com Developer of array based high performance communications processing SoCs.

Qinghua Li; Lin, X. E., Compact feedback for MIMO-OFDM systems over frequency selective channels, 2005 IEEE 61st Vehicular Technology Conference, 2005. VTC 2005-Spring. Volume 1, Date: 30 May-1 Jun. 2005, Pages: 187-191 Vol. 1.

Rabiner, Lawrence R, B Bernard Gold, Theory and Application of Digital Signal Processing, Prentice-Hall, Inc, 1975.

Teramoto, A.; Nishijo, K.; Maemura, T.; Nagao, Y.; Kurosaki, M.; Ochi, H., Design of 600 Mbps 4Ã-2 MIMO-OFDM Wireless LAN System and Its FPGA Implementation, 10th International Conference on Advanced Communication Technology, 2008. ICACT 2008. Volume 1, Date: 17-20 Feb. 2008, Pages: 579-582.

Volder, J., The CORDIC Computing Technique, IRE Transaction on Electronic Computers, EC-8(3), pp. 330-334, 1959.

Volder, J., The Birth of CORDIC, Journal of VLSI Signal Processing Systems, 25(2), pp. 101-5, 2000.

Weisstein, Eric W., Pseudoinverse, From MathWorld—A Wolfram Web Resource. http://mathworld.wolfram.com/Pseudoinverse.html.

Wiesler, A.; Jondral, F. K., A software radio for second- and third-generation mobile systems, IEEE Transactions on Vehicular Technology, Volume 51, Issue 4, Date: July 2002, Pages: 738-748.

Zamiri-Jafarian, H.; Gulak, G. Iterative MIMO channel SVD estimation, 2005 IEEE International Conference on Communications ICC 2005. Volume 2, Date: 16-20 May 2005, Pages: 1157-1161 Vol. 2.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

What is claimed as the invention is:

1. A Reconfigurable Network on Chip (NoC) Multiple-Input-Multiple-Output (MIMO) Orthogonal Frequency Division Multiplexing (OFDM) Application Specific Integrated Circuit (ASIC) which fully implements a 4×4 MIMO OFDM receiver and transmitter, comprising:
  (i) a host interface that is a 1 Gbps Low Voltage Differential Signaling (LVDS) Serializer/Deserializer (SERDES) interface;
  (ii) a primary 32-bit Reduced Instruction Set Computer (RISC) that interfaces with the host interface;
  (iii) a 2×2 Singular Value Decomposition (SVD) computation engine in operational association with the primary 32-bit RISC that supports four receive chains at Intermediate Frequency (IF) or Zero Carrier Frequency (Zero-CF) with In-Phase components (I) and Quadrature-Phase components (Q) interleaved using four off-chip Analog to Digital Converters (ADCs) and supports four transmit channels, with at least one Digital to Analog Converter per transmit chain;
  (iv) a radiation hardened phase-locked loop (PLL) that provides a 1 GHz or 500 MHz clock to a NoC switch fabric of the ASIC; and
  (v) at least two NoC clusters on said NoC switch fabric, an up-down conversion cluster and a main MIMO OFDM and Single Carrier system cluster, wherein separation of the two clusters is driven by at least one factor selected from one or more up-down conversion cluster Agents that are always active during receive or transmit,
  wherein there is no orthogonality between operation modes, wherein the one or more up-down conversion cluster Agents are tuned to an up-down conversion process, wherein the one or more up-down conversion cluster Agents comprise one or more numerically Controlled Oscillators and Mixers, Cascaded Integrator Comb (CIC) Filters and Finite Impulse Response (FIR) Filter Agents, and wherein one or more RISC Agents in an up-down conversion cluster interface with one or more reprogrammable FIR filters and with Automatic Gain Control (AGC) are always busy, wherein the main MIMO OFDM and Single Carrier system cluster comprises orthogonal operations and supports task idling between reception of radio packets, wherein the up-down conversion cluster feeds samples into the main MIMO OFDM and Single Carrier system cluster during radio packet reception and during radio packet transmission the main MIMO OFDM and Single Carrier system cluster feeds data into the up-down conversion cluster, wherein the primary 32-bit RISC is responsible for host interface processing and Multiplier Accumulator (MAC) operations and is responsible for downloading code segments into the one or more RISC Agents in the at least two NoC clusters for reconfiguring a Radio, the primary 32-bit RISC interfaces into the host interface using an 8b/10b and a 10b/8b with Disparity Encoder and Decoder, the 8b/10b and 10b/8b with Disparity Encoder and Decoder align host interface data in conjunction with K28.5 characters and receive overflow and under flow signals, wherein a primary RISC 32-bit Wishbone BUS Interface is configured to provide maximum flexibility in the programming of the primary 32-bit RISC and provide the primary 32-bit RISC with off-chip and on-chip interfacing, including interfacing to firmware stored in a Rad Hard parallel Electrically Erasable Programmable Read-Only Memories (EEPROMs), access to a Rad Hard Volatile random access memory (RAM), and with optional Field Programmable Gate Array (FPGA) interfacing to provide stimulus or to further process received streams, and wherein the two or more NoC clusters each has a dedicated Serial Peripheral Interface (SPI) Agent with an off chip SPI slave interface, wherein the SPI Agents support transmission and reception of arbitrary 128-bit packets into the NoC switch fabric to any Agent within the two or more NoC clusters to allow for individual testing of all Agents within each of the two or more NoC clusters and to test any Agent using the primary 32-bit RISC and by extension through the host interface, the primary 32-bit RISC having independent access to the two or more NoC clusters.

2. The Reconfigurable NoC MIMO OFDM ASIC of claim 1, further comprising a high performance FPGA configured to process demodulated receive streams to recover transmitted digital data and provide digital stimulus through ADC interfaces for testing the MIMO OFDM Receiver.

3. The Reconfigurable NoC MIMO OFDM ASIC of claim 2, wherein the FPGA implements a high speed Viterbi decoder in a 2×3 open loop MIMO system, wherein there are three receive chains and two demodulated data streams, wherein high speed transfer between the two demodulated data streams and the FPGA are decoded, combined and then processed by the Viterbi decoder and is accomplished using an offchip Wishbone bus connected through the primary RISC 32-bit Wishbone BUS Interface, and wherein the FPGA provides the digital stimulus through the ADC interfaces for testing the MIMO OFDM Receiver.

4. The Reconfigurable NoC MIMO OFDM ASIC of claim 1, further comprising a SpaceWire Interface connected to the NoC switch fabric for interfacing to a Space Wire network.

5. The Reconfigurable NoC MIMO OFDM ASIC of claim 1, wherein the LVDS SERDES interface is a Radiation Hardened SERDES hard macro that supports a mode where SERDES LVDS drivers are directly accessed through a Least Significant Bit (LSB) of transmit and receive digital signals, wherein the host interface is through two SpaceWire coder-decoders (CODECs) implemented on the ASIC, wherein an external pin switches between the LVDS SERDES interface and the SpaceWire interface.

6. The Reconfigurable NoC MIMO OFDM ASIC of claim 1, wherein the main MIMO OFDM and Single Carrier system cluster supports a 4 receive chain system to provide a MIMO system selected from a 4×4, 3×4, 4×2, 2×3, 2×2 and 1×4, 1×3, 1×2 and 1×1 MIMO systems, wherein each receive chain has an independent Fast Fourier Transform (FFT) Agent that receives baseband samples from the up-down conversion cluster, wherein each FFT Agent independently processes each receive chain in parallel and each FFT Agent is implemented in the one or more RISC Agents.

7. The Reconfigurable NoC MIMO OFDM ASIC of claim 6, wherein the FFT Agent comprises a 1024 point FFT.

8. The Reconfigurable NoC MIMO OFDM ASIC of claim 6, wherein the FFT Agent comprises 64 Point FFT.

9. The Reconfigurable NoC MIMO OFDM ASIC of claim 6, wherein the FFT Agent comprises a 256 point FFT.

10. The Reconfigurable NoC MIMO OFDM ASIC of claim 1, further comprising at least four SVD Agents that run in parallel and are not tied to a receive chain of the four receive chains, each SVD Agent processes an orthogonal carrier set to compute a 2×2 SVD per carrier.

11. The Reconfigurable NoC MIMO OFDM ASIC of claim 10, wherein, after each SVD Agent processes an orthogonal carrier set to compute the 2×2 SVD per carrier, each of the SVD Agents is used to compute a pseudo-inverse for open loop systems, or supply matrices per carrier for beam forming, wherein code in each SVD Agent is replaced with code for computing the MIMO equalization of the receive chains using complex matrix multiply and to support Pilot Tracking and carrier operations comprising receiving, transmitting, offset, modulation, clocking, power setting, and channel conditioning.

12. The Reconhgurable NoC MIMO OFDM ASIC of claim 1, further comprising one or more primitive Agents located near the one or more RISC Agents for SVD or FFT to minimize latency.

13. The Reconhgurable NoC MIMO OFDM ASIC of claim 1, further comprising a complex Static Random Access Memory (SRAM) Agent configured to support MIMO OFDM systems with 1024 carriers for very high throughput, wherein the complex SRAM Agent stores complex samples arranged as 32-bit words using 16-bit for the real part and 16-bit for the imaginary part, wherein the complex SRAM Agent is implemented as a 2048×32 Radiation Hardened SRAM having a state machine to interpret commands, and supports read and write to individual locations and specialized operations including high speed shifting of data.

14. The Reconhgurable NoC MIMO OFDM ASIC of claim 1, wherein key operations by the MIMO OFDM receiver are orthogonal, including:
 (i) operations in packet detection excluding Carrier Frequency Offset (CFO) correction and an FFT are orthogonal;
 (ii) computation of a MIMO equalization matrix W and of an equalization of the received streams are orthogonal;
 (iii) computation of an Equalizer matrix W and the FFT are orthogonal; and
 (iv) AGC operations are orthogonal with the FFT.

15. The Reconfigurable NoC MIMO OFDM ASIC of claim 1, wherein the one or more RISC Agents operate on a single cycle basis and control data processing flow through primitive computational blocks, and wherein primitive computational elements comprising FFT's Autocorrelators, Matched Filters, and Matrix inversion are reused between the primitive computational blocks, and wherein the primitive computational elements are connected to RISC controllers by a specific NoC architecture optimized for MIMO OFDM operation.

16. The Reconfigurable NoC MIMO OFDM ASIC of claim 1, wherein the NoC switch fabric includes grid networks formed by interconnecting compute Agents and digital controllers through 5-port routing switches, wherein each routing switch uses a 96-bit packet length and supports high precision for fixed point operations.

17. The Reconfigurable NoC MIMO OFDM ASIC of claim 1, further comprising a Radix 2 FFT implemented on the NoC switch fabric, a Rotation Coordinate Rotation Digital Computer (CORDIC) Agent configured to compute Twiddle factors based on the size of the Radix 2 FFT, a Complex Multiply Agent containing three multipliers and adders, and a complex RAM Agent configured to store the Twiddle factors, store a block of complex samples that are the input to the Radix 2 FFT, and store results comprising the Twiddle factors and a complex block of samples input to the Radix 2 FFT.

18. The Reconfigurable NoC MIMO OFDM ASIC of claim 1, further comprising requirements for the one or more RISC Agents for processing complex multiplication results or implementing two real FIR filters in a single Agent, comprising the following components in operative association:
  i. Dual 40 bit Accumulators with Clear for computing complex matrix Row×Columns, complex matched filter operations, and dual real FIR filtering I and Q channels;
  ii. 16-bit Arithmetic Logic Unit (ALU) operations;
  iii. Register File with 32 Registers each 32-bit wide and addressable as 16-bit real and 16-bit imaginary part;
  iv. Registers in Register file used as addresses for Complex RAM Agents;
  v. Programmable Demux of received packet fields into Registers in Register file or inputs to an Accumulator;
  vi. Dual Barrel Shifter;
  vii. Rounding unit per Accumulator;
  viii. Bit addressable logic;
  ix. Dual status registers for Dual/Quad ALU results;
  x. Bit Reverse Address Generation;
  xi. Modulo M Address Generation;
  xii. Programmable Routing of Registers in Register File or Accumulators to Output Packet Fields;
  xiii. Optimized for "C" Switch Case Statements;
  xiv. Support for Viterbi Compare, Select, and Store Unit (CSSU) for an Add/Compare Selection of a Viterbi Operator;
  xv. Specialized Hardware support for Interleaver and De-interlever algorithms;
  xvi. Reed Solomon Decoding Optimization Hardware; and
  xvii. Convolutional Turbo Coding Acceleration.

19. The Reconfigurable NoC MIMO OFDM ASIC of claim 1, further comprising Single Event Transient (SET) hardening using special Radiation Hardened By Design (RHBD) circuit techniques, comprising at least one of the following:
  (i) temporal sampling latch technology for accumulators, integrators, comb filters, and XY coordinates in routing switches associated with each of the at least two NoC clusters;
  (ii) conventional unhardened 4-transistor memory cells, placing each bit of a word in a separate memory block to achieve large separations, and using an inexpensive error detect and correct (EDAC) scheme, such as a Hamming code with periodic scrubbing, to reduce the error rate to an acceptable level;
  (iii) a radiation hardened standard cell library for hardening combinational logic; and
  (iv) periodic scrubbing of code in the one or more RISC Agents by the primary 32-bit RISC.

* * * * *